US008073831B2

(12) United States Patent
Mitsuhashi

(10) Patent No.: US 8,073,831 B2
(45) Date of Patent: Dec. 6, 2011

(54) ELECTRONIC SHOP PROVIDING METHOD, SITE SEARCH METHOD, AND BULLETIN BOARD PROVIDING METHOD FOR SEARCHING A PLURALITY OF CONTENT REGISTERED ONTO A WEBSITE

(75) Inventor: Setsu Mitsuhashi, Tokyo (JP)

(73) Assignees: Nikon Corporation, Tokyo (JP); Nikon Photo Products, Inc., Tokyo (JP); Nikon Systems, Inc., Yokohama (JP)

( * ) Notice: Subject to any disclaimer, the term of this patent is extended or adjusted under 35 U.S.C. 154(b) by 736 days.

(21) Appl. No.: 12/068,328

(22) Filed: Feb. 5, 2008

(65) Prior Publication Data
US 2008/0147680 A1 Jun. 19, 2008

Related U.S. Application Data

(60) Division of application No. 11/184,889, filed on Jul. 20, 2005, now abandoned, which is a division of application No. 10/713,097, filed on Nov. 17, 2003, now abandoned, which is a continuation of application No. PCT/JP02/04812, filed on May 17, 2002.

(30) Foreign Application Priority Data

| May 18, 2001 | (JP) | 2001-149927 |
| May 18, 2001 | (JP) | 2001-149935 |
| May 18, 2001 | (JP) | 2001-149948 |
| May 18, 2001 | (JP) | 2001-149958 |
| May 18, 2001 | (JP) | 2001-149969 |
| May 18, 2001 | (JP) | 2001-149978 |

(51) Int. Cl.
G06F 7/00 (2006.01)
G06F 17/30 (2006.01)

(52) U.S. Cl. .............. 707/706; 707/731
(58) Field of Classification Search .............. 707/705, 707/706, 707, 708, 722, 723, 731, 999.003
See application file for complete search history.

(56) References Cited

U.S. PATENT DOCUMENTS

| 5,706,507 A | 1/1998 | Schloss |
| 5,774,882 A | 6/1998 | Keen et al. |
| 5,864,845 A * | 1/1999 | Voorhees et al. .............. 707/5 |

(Continued)

FOREIGN PATENT DOCUMENTS
EP 1 028 386 A2 8/2000
(Continued)

OTHER PUBLICATIONS

Charlish, G., "Technology (Worth Watching): Point Made for Smaller Shops," Financial Times, p. 13, Oct. 15, 1887.

(Continued)

*Primary Examiner* — Marc Somers
(74) *Attorney, Agent, or Firm* — Oliff & Berridge PLC

(57) ABSTRACT

A method searches a plurality of content registered onto a website. The method includes searching for a search text or a search character string sent from a client on the plurality of content, classifying information indicative of a location where a retrieved text or character string is registered per each of content, rearranging information classified per each of the content, extracting a given number of information in high order per each of content with regard to rearranged information classified per each of the content, and transmitting extracted information to the client.

12 Claims, 67 Drawing Sheets

U.S. PATENT DOCUMENTS

| | | | |
|---|---|---|---|
| 5,873,080 A * | 2/1999 | Coden et al. | 707/3 |
| 5,960,411 A | 9/1999 | Hartman et al. | |
| 6,006,205 A | 12/1999 | Loeb et al. | |
| 6,058,373 A | 5/2000 | Blinn et al. | |
| 6,070,158 A * | 5/2000 | Kirsch et al. | 707/3 |
| 6,076,071 A | 6/2000 | Freeny, Jr. | |
| 6,097,389 A | 8/2000 | Morris et al. | |
| 6,104,334 A | 8/2000 | Allport | |
| 6,301,586 B1 | 10/2001 | Yang et al. | |
| 6,301,660 B1 | 10/2001 | Benson | |
| 6,374,241 B1 * | 4/2002 | Lamburt et al. | 707/6 |
| 6,381,637 B1 | 4/2002 | Kamada | |
| 6,415,262 B1 | 7/2002 | Walker et al. | |
| 6,438,632 B1 | 8/2002 | Kikugawa | |
| 6,446,045 B1 | 9/2002 | Stone et al. | |
| 6,573,927 B2 | 6/2003 | Parulski et al. | |
| 6,578,072 B2 | 6/2003 | Watanabe et al. | |
| 6,611,881 B1 | 8/2003 | Gottfurcht et al. | |
| 6,636,249 B1 | 10/2003 | Rekimoto | |
| 6,678,694 B1 * | 1/2004 | Zimmermann et al. | 707/731 |
| 6,771,801 B1 | 8/2004 | Fisher et al. | |
| 6,785,661 B1 | 8/2004 | Mandler et al. | |
| 6,833,848 B1 | 12/2004 | Wolff et al. | |
| 6,868,397 B1 | 3/2005 | McCaslin | |
| 6,904,435 B2 | 6/2005 | Jenkins et al. | |
| 6,915,271 B1 | 7/2005 | Meyer et al. | |
| 6,933,832 B1 | 8/2005 | Simms et al. | |
| 6,968,362 B2 | 11/2005 | Koch et al. | |
| 6,980,962 B1 | 12/2005 | Arganbright et al. | |
| 6,999,637 B1 | 2/2006 | Anderson et al. | |
| 7,013,286 B1 | 3/2006 | Aggarwal et al. | |
| 7,076,444 B1 | 7/2006 | Baron et al. | |
| 7,114,124 B2 * | 9/2006 | Brindle | 715/253 |
| 7,225,144 B2 | 5/2007 | Hashimoto et al. | |
| 7,243,082 B1 | 7/2007 | Forlai | |
| 7,818,319 B2 * | 10/2010 | Henkin et al. | 707/726 |
| 2001/0032146 A1 | 10/2001 | Kutaragi et al. | |
| 2001/0032151 A1 | 10/2001 | Paul et al. | |
| 2001/0051905 A1 | 12/2001 | Lucas | |
| 2002/0004735 A1 * | 1/2002 | Gross | 705/14 |
| 2002/0007326 A1 | 1/2002 | Hashimoto et al. | |
| 2002/0038221 A1 | 3/2002 | Tiwary et al. | |
| 2002/0046086 A1 | 4/2002 | Pletz et al. | |
| 2002/0052778 A1 | 5/2002 | Murphy et al. | |
| 2002/0072986 A1 | 6/2002 | Aram | |
| 2002/0077937 A1 | 6/2002 | Lyons et al. | |
| 2002/0082954 A1 | 6/2002 | Dunston | |
| 2002/0087667 A1 * | 7/2002 | Andersen | 709/220 |
| 2002/0089534 A1 | 7/2002 | Siekmann | |
| 2002/0091590 A1 | 7/2002 | Edgar et al. | |
| 2002/0111874 A1 | 8/2002 | Al-Kazily | |
| 2002/0128918 A1 | 9/2002 | Chao et al. | |
| 2002/0138786 A1 | 9/2002 | Chefalas et al. | |
| 2002/0147633 A1 | 10/2002 | Rafizadeh | |
| 2002/0152200 A1 | 10/2002 | Krichilsky et al. | |
| 2002/0169681 A1 | 11/2002 | Vincent et al. | |
| 2002/0178223 A1 * | 11/2002 | Bushkin | 709/213 |
| 2002/0188530 A1 | 12/2002 | Wojcik et al. | |
| 2003/0033205 A1 | 2/2003 | Nowers et al. | |
| 2003/0074349 A1 | 4/2003 | Gupta et al. | |
| 2004/0098320 A1 | 5/2004 | Mitsuhashi et al. | |
| 2004/0102993 A1 | 5/2004 | Yoshida et al. | |
| 2004/0128282 A1 * | 7/2004 | Kleinberger et al. | 707/3 |
| 2004/0230503 A1 | 11/2004 | Lucas | |
| 2004/0260722 A1 | 12/2004 | Allen et al. | |
| 2007/0050459 A1 | 3/2007 | Kikugawa | |

FOREIGN PATENT DOCUMENTS

| | | |
|---|---|---|
| EP | 1 134 686 A1 | 9/2001 |
| GB | 2 329 489 A | 3/1999 |
| JP | A-63-30943 | 2/1988 |
| JP | A-H08-077255 | 3/1996 |
| JP | A-9-330355 | 12/1997 |
| JP | A-10-063672 | 3/1998 |
| JP | A-10-124574 | 5/1998 |
| JP | A-10-165612 | 6/1998 |
| JP | A-10-302015 | 11/1998 |
| JP | A-11-3372 | 1/1999 |
| JP | A-11-009806 | 1/1999 |
| JP | A-11-66035 | 3/1999 |
| JP | A-11-085578 | 3/1999 |
| JP | A-11-203359 | 7/1999 |
| JP | A-11-249943 | 9/1999 |
| JP | A-11-328216 | 11/1999 |
| JP | A-2000-20368 | 1/2000 |
| JP | A-2000-99585 | 4/2000 |
| JP | A-2000-113031 | 4/2000 |
| JP | A-2000-163480 | 6/2000 |
| JP | A-2000-187683 | 7/2000 |
| JP | A 2000-242666 | 9/2000 |
| JP | A-2000-259859 | 9/2000 |
| JP | A-2000-305617 | 11/2000 |
| JP | A-2000-341644 | 12/2000 |
| JP | A-2000-347971 | 12/2000 |
| JP | A 2001-052023 | 2/2001 |
| JP | A-2001-84302 | 3/2001 |
| JP | A-2001-109804 | 4/2001 |
| JP | A-2001-117847 | 4/2001 |
| JP | A-2001-125976 | 5/2001 |
| JP | A 2001-134517 | 5/2001 |
| WO | WO 99/14695 | 3/1999 |
| WO | WO 00/25243 | 5/2000 |

OTHER PUBLICATIONS

Butler, B., et al., "Gupta SQLBase Server for NetWare," PC Magazine, vol. 12, No. 17, p. 310, Oct. 12, 1993.

Bontempo, R., "Computer Tool Control System Offers Many Advantages" (Abstract only), Assembly Engineering, vol. 12, No. 3, Mar. 1977.

Anon., "NCR Wins Praise for On-Site Inventory Management Program," M2 Presswire, May 28, 1998.

King, J., "Christmas in July: . . . Lessons Learned from the Past Year . . . ," Computerworld, vol. 34, No. 28, p. 38, Jul. 10, 2000.

Anon., "Actinic Software Launches Major Upgrade to Actinic Catalog E-Commerce Software for Small-to Medium-Sized Businesses," PR Newswire, Sep. 18, 2000.

Mikolajczyk, S.J., "Tire Makers, Suppliers Step into Electronic Age," Tire Business, vol. 18, No. 13, p. 10, Sep. 25, 2000.

Aichimayr, M., "From Data to Delivery: Finding Fulfillment in E-Business," Transportation and Distribution, vol. 41, No. 11, p. S, Nov. 2000.

Sam, S., "Web-Based Systems Help Clients Manage Money," South China Morning Post, p. 3, Nov. 30, 2000.

Slatella, M., "Hard to Tell When a Virtual Shelf is Bare," New York Times, (Late Edition, East Coast), p. G.4, Dec. 21, 2000.

Cross, D.J., et al., "Multi-Stage Transportation Consolidation Analysis Using Dynamic Simulation" (Abstract only), International Journal of Physical Distribution and Materials Management, vol. 17, No. 3, pp. 28-45, 1987.

Gonsalves, A., et al., "E-Markets Tool up for Business," PC Week, May 1, 2000.

Boyer, K.K., "E-Operations: A Guide to Streamlining with the Internet," Business Horizons, vol. 44, No. 1, p. 47, Jan. 2001.

Wholey et al., "What's Quicker than Amazon.com," Business Week, No. 3611, p. 11, Jan. 11, 1999.

Barrett, C., "Combining Bills of Lading," Traffic World, vol. 257, No. 5, p. 54, Feb. 1999.

Greensberg, S., "Tales about E-Tailers," New York Times, Late Edition, Final Edition, p. 4, col. 6, Jan. 4, 2001.

Office Action issued in U.S. Appl. No. 12/289,592; mailed Jun. 22, 2010.

Nov. 26, 2008 Office Action in U.S. Appl. No. 10/713,301.
Oct. 14, 2009 Office Action in U.S. Appl. No. 10/713,301.
Apr. 21, 2005 Office Action in U.S. Appl. No. 10/713,097.
Nov. 23, 2004 Office Action in U.S. Appl. No. 10/713,097.
Sep. 5, 2007 Office Action in U.S. Appl. No. 11/184,889.
Feb. 12, 2007 Office Action in U.S. Appl. No. 11/184,889.
Oct. 11, 2006 Office Action in U.S. Appl. No. 11/184,889.
Mar. 29, 2006 Office Action in U.S. Appl. No. 11/184,889.
Robinson, "My Twins Days 1999 Photo Album", http://charles.robinsontwins.org/twinsdays/99/, pp. 1-22, 1999.

Kopp et al. Developments in Copyright Policy and Network Technologies, Fall 1998, Journal of Public Policy & Marketing, vol. 17, No. 2, pp. 303-312.
Dec. 9, 2010 Office Action issued in U.S. Appl. No. 10/713,301.
Nov. 22, 2010 Office Action issued in U.S. Appl. No. 12/289,592.
Dec. 21, 2010 Office Action issued in Japanese Patent Application No. 2001-149958 (with translation).
Notification of Reasons for Refusal issued in Japanese Patent Application No. 2001-149969; issued Aug. 17, 2010; with English-language translation.
Suzuki, Hisashi; "Access to paid information sites;" *IT Information Search Technique using Internet*, A.I. Publishing, Inc.; First edition, pp. 89-99; May 28, 2000.
"Get ahead of the trend with e-sekai!"; *Internet Ascii*; Ascii Corporation; vol. 4, No. 9, pp. 152-155; Sep. 1, 1999.
International Search Report issued in International Patent Application No. PCT/JP2002/004812; mailed Aug. 13, 2002.
International Search Report issued in International Patent Application No. PCT/JP2002/004813; mailed Aug. 20, 2002.
International Search Report issued in International Patent Application No. PCT/JP2002/004811; mailed Sep. 3, 2002.
"Kaimono Dairinin' ga Daiyakushin Kakaku Kosho de Ninki Atsumeru," Nikkei Information Strategy, vol. 7, No. 8, pp. 142-151, Aug. 24, 1998.
Hitoshi Sao; "Tada de Tsukutte Kashikoku Tsukau HTML no Technique, Suguni Tsukaeru Kijutsu-rei Tsuki"; Dai 2-kai.
Emiko Ogami; "Shikosei kara communication e Image Business Shijo ni Idomu, Digital Album Site Photo Highway Japan"; Nikkei Web Company; Depa Shinbushu; vol. 1, No. 1; Oct. 8, 2000' pp. 110-111.
Kabushiki Kaisha Hakuhodo Interactive Company et al., Zukaide Wakaru Internet Marketing, First Edition, JMA Management Center Inc., Feb. 1, 2000, pp. 80-81.
Hiroaki Nomura, Sony Clie Super Guide PEG-S500C/PEG-S300, First Edition, OHMSHA, Ltd., Nov. 30, 2000, p. 54.
Office Action issued in Japanese Patent Application No. 2001-149870 on Sep. 28, 2010 (w/English Translation).
Ozaki, "Easy Creation of 3D Title Animation," Ulead COOL 3D 2.5J Ulead Systems, Hello!PC, Softbank Publishing Inc., vol. 6, No. 9, p. 190, Jun. 8, 1999.
Senda, "Cheap Office Software, ThinkFree Office," Nikkei PC 21, Nikkei Business Publications, Inc., vol. 6, No. 9, pp. 258-260, May 1, 2001.
Web Design Super Technique Course vol. 1, Ascii Net J, Ascii Corporation, vol. 5, No. 57, pp. 106-107, Aug. 4, 2000.
Office Action issued in Japanese Patent Application No. 2001-149860 on Sep. 28, 2010 (w/English Translation).
Kanno, "CGI Web Management Technique for Beginners," Internet Magazine, Impress Inc., Japan, No. 76, pp. 186-207, May 1, 2001.
Office Action issued in Japanese Patent Application No. 2001-149911 on Oct. 5, 2010 (w/English Translation).
Office Action issued in Japanese Patent Application No. 2001-149958 on Sep. 14, 2010 (w/English Translation).
Notification of Reasons for Refusal issued in Japanese Patent Application No. 2001-149884; issued Jul. 13, 2010; with English-language translation.
Notification of Reasons for Refusal issued in Japanese Patent Application No. 2001-149837; issued Jul. 13, 2010; with English-language translation.
Anbiru, "Adobe ActiveShare, an Adobe Freeware Giving All Digital Camera Fans A New Fun," *Mac People*, Ascii Corporation; vol. 6; No. 11; pp. 100-101; Jun. 1, 2000.
Tomo, "Publish Your Digital Image Data With Web-Based Free Photo Storage Service!"; *Perfect Use of Digital Camera Image*; first edition; A.I. Publishing, Inc.; pp. 146-153; Oct. 1, 2000.
Office Action issued in U.S. Appl. No. 10/713,301; mailed Jun. 24, 2010.
Japanese Patent Office, Examiner's Decision of Refusal for Patent Application No. 2001-149969 (with English translation), Mar. 22, 2011, pp. 1-3 (pp. 1-4 for translation).
European Patent Office, Summons to Attend Oral Proceedings for EP 02 726 435.7, Feb. 18, 2011, pp. 1-6.

\* cited by examiner

FIG.6

MERCHANDISE INFO FORM

THE FIELDS INDICATED WITH AN ASTERISK(*) ARE
REQUIRED TO COMPLETE THIS TRANSACTION.

* MERCHANDISE NAME      [CLICK TO CHOOSE ▼]   6A

* MERCHANDISE ID        [            ]

* SERIAL #              [            ]  *PURCHASE Q'TY [1 ▼]

* PURCHASE CATEGORY     [CLICK TO CHOOSE ▼]

* PURCHASE SHOP         [                        ]

* PURCHASE DATE         [2001▼] Y [1▼] M [1▼] D

* PURCHASE PRICE        [                        ]

* PURCHASE SHOP INFO    [CLICK TO CHOOSE      ▼]

* REASONS OF PURCHASE (METHOD) [CLICK TO CHOOSE ▼]

VER.# IN USE OF DRIVER SOFT [            ]

6B
                              [ OK ]    [ BACK ]

FIG.7

THE FIELDS INDICATED WITH AN ASTERISK (*) ARE REQUIRED TO COMPLETE THIS TRANSACTION.

* PASSWORD      [_____] — 7A
* CONFIRM PASSWORD [_____]

[PASSWORD REQUIRED WHENEVER RENEWING CUSTOMER INFO FROM NOW ON. REMEMBER TO WRITE IT DOWN.]

* YOUR NAME    FIRST [_____]    LAST [_____]
* BIRTH DAY      [___] Y [___] M [___] D
* ZIP CODE       [_____]
* PREFECTURE      [CLICK TO CHOOSE ▼]
* CITY/WARD/TOWN/ETC [_____]
* STREET ETC      [_____]
   BUILDG/ROOM #/ETC [_____]
* PRIVATE PHONE    [____]-[____]-[____]
   PRIVATE FAX     [____]-[____]-[____]
* E-MAIL ADDRESS   [_____]
   GENDER        [CLICK TO CHOOSE ▼]
   MARRIED/UNMARRIED [CLICK TO CHOOSE ▼]
   A NUMBER OF A CHILD [CLICK TO CHOOSE ▼]
   AGE OF YOUR CHILD    ☐ 0 ~3 YRS UNDER
                            ☐ 3 YRS ABOVE ~ 6 YRS UNDER
                            ☐ 6 YRS ABOVE ~12 YRS UNDER
                            ☐ 12 YRS ABOVE ~18 YRS UNDER
                            ☐ 18 YRS ABOVE
   OCCUPATION     [CLICK TO CHOOSE ▼]
   BUSINESS FIELD   [CLICK TO CHOOSE ▼]
   INCOME        [CLICK TO CHOOSE ▼]

TRANSMIT INFO FROM NIKON IMAGE   ⊙ YES
                                      ○ NO

7B — [OK]   [BACK]

FIG.8

| | | |
|---|---|---|
| Q'NNAIRE # | XXXXXXX | |
| MERCHANDISE NAME | XXXXXXX | |
| DATE OF FILL-IN | XXXX/XX/XX | |

Q 1 [　　　　　　　　　　　] ~ 8A

Q 2 [　　　　　　　　　　　] ~ 8B

Q 3 [　　　　　　　　　　　] ~ 8C

Q 4 [　　　　　　　　　　　] ~ 8D

Q 5 [　　　　　　　　　　　] ~ 8E

Q 6 (ON MERCHANDISE 1) [　　　　　　　　　　　] ~ 8F

Q 7 (ON MERCHANDISE 2) [　　　　　　　　　　　] ~ 8G

[REGISTER] [BACK]
　　　8H

FIG.13
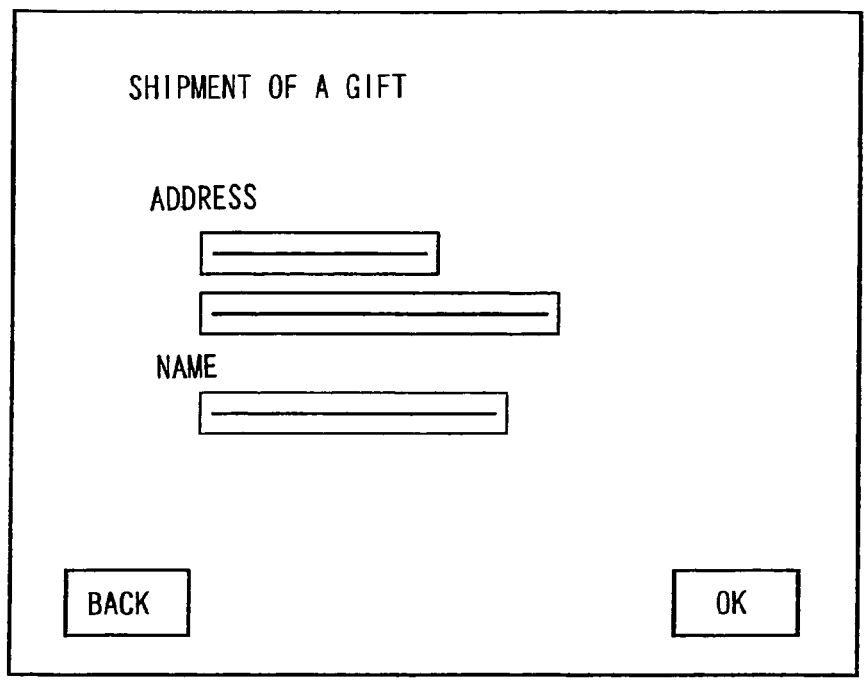
(a)
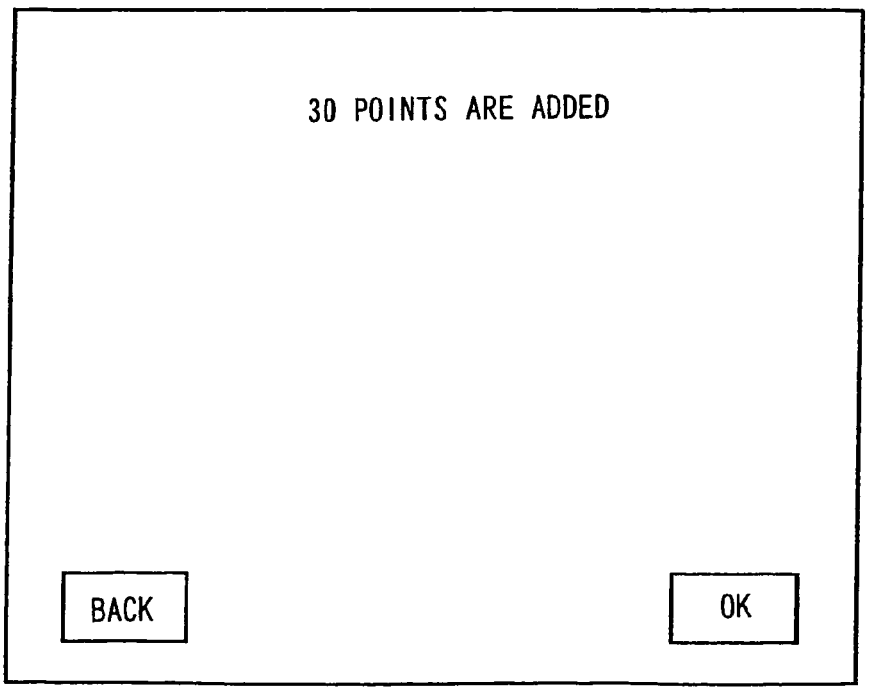
(b)

FIG.18

```
INFORMATION OF A WEB MEMBERSHIP WILL BE UPDATED IF YOU
UPDATE REGISTRATION INFORMATION.

THE FIELDS INDICATED WITH AN ASTERISK(*) ARE REQUIRED TO
COMPLETE THIS TRANSACTION.
```

* YOUR NAME       FIRST [TARO]        LAST [KOGAKU]
* BIRTH DAY       [19XX] Y [1] M [1] D
* ZIP CODE        [107]
* PREFECTURE      [TOKYO ▼]
* CITY/WARD/TOWN/ETC [AKASAKA MINATO-KU]
* STREET ETC      [○-○-○]
  BUILDG/ROOM #/ETC [○○BLDG.]
* PRIVATE PHONE   [03] - [  ] - [  ]
  PRIVATE FAX    [03] - [  ] - [  ]
* E-MAIL ADDRESS  [**@***]
  GENDER          [MALE ▼]
  MARRIED/UNMARRIED [MARRIED ▼]
  A NUMBER OF A CHILD [1 ▼]
  AGE OF YOUR CHILD  ☐ 0 ~ 3 YRS UNDER
                     ☐ 3 YRS ABOVE ~ 6 YRS UNDER
                     ☑ 6 YRS ABOVE ~ 12 YRS UNDER
                     ☐ 12 YRS ABOVE ~ 18 YRS UNDER
                     ☐ 18 YRS ABOVE
  OCCUPATION      [EXECUTIVE ▼]
  BUSINESS FIELD  [TRADING COMP. ▼]
  INCOME          [MORE THAN ¥10,000,000 ▼]

TRANSMIT INFO FROM NIKON IMAGE  ⊙ YES
                                        ○ NO

18B —[OK]    [BACK]

FIG.22

| CAMERA BODY | LENS | SPEEDLIGHT | OTHERS |
|---|---|---|---|
| F00 ▽ | ▽ | NO ▽ | NO ▽ |
| | 400F2.8 | | |
| | 400F3.5 | | |
| | 400F5.6 | | |
| | . | | |
| | . | | |
| | . | | |

OK

22B

25B

FIG.32
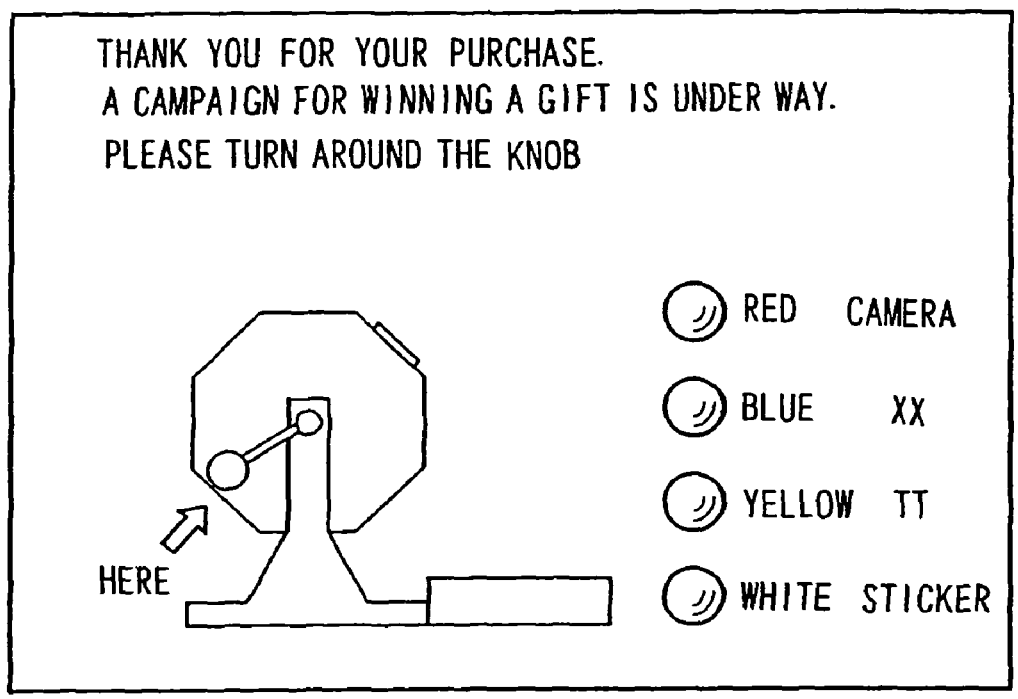
(a)
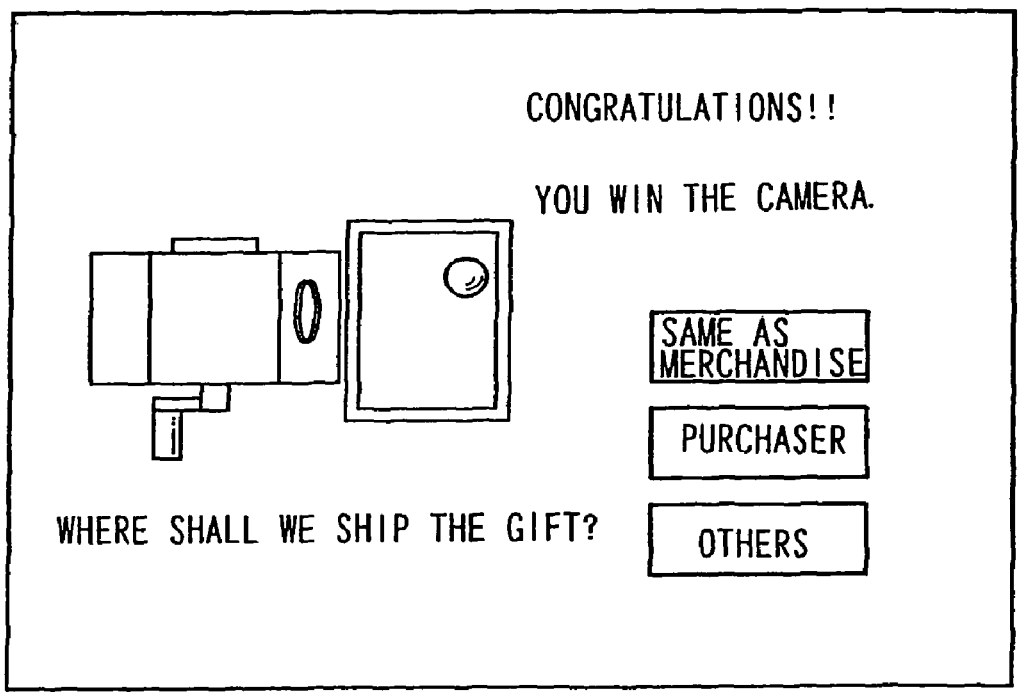
(b)

FIG.36

SORRY, NOW OUT OF STOCK.

MERCHANDISE IS SCHEDULED TO ARRIVE ON XXXX.

WITH RESERVATION,
YOU MAY BE PRIORITIZED TO GET IT.

| NO RESERVATION | RESERVE |

YOU PURCHASE;

YOU RESERVE;

YOUR RESERVED MERCHANDISE WILL
BE SHIPPED AROUND XXXX

SHALL YOUR MERCHANDISE SHIPMENT
BE COMBINED WITH YOUR RESERVED ONE?

BACK    YES    NO
         |      |
        38B    38C

FIG.39

ORDER: ①SHIP TO ②PAYMENT METHOD ③CONFIRM ④COMPLETE ORDER

ORDER DETAILS

| PRODUCT CODE | PRODUCT | UNIT PRICE | Q'TY | AMT | TAX |
|---|---|---|---|---|---|
| XXX-XXXX-XXX | ○○○○○○○○<br>COLOR:RED SIZE:LL | ¥1,000 | 18 | ¥289,000 | NON |
| XXX-XXXX-XXX | △△△△△△△ | ¥1,200 | 4 | ¥4,800 | INCLD |
| XXX-XXXX-XXX | ********<br>MATERIAL:STAINLESS STEEL | ¥250 | 18 | ¥1,250 | W/O |
| | | | SUB TTL | ¥294,050 | |
| | | | SHIPPING COST | ¥1,500 | W/O |
| | | | C/O/D CHARGE | ¥90 | W/O |
| | | | CONSUMPTION TAX | ¥14,703 | |
| | | | G TTL | ¥310,343 | |

CUSTOMER

| NAME | ********** |
| ZIP CODE | ********** |
| ADDRESS | ********** |

*CONTINUED

FIG.49
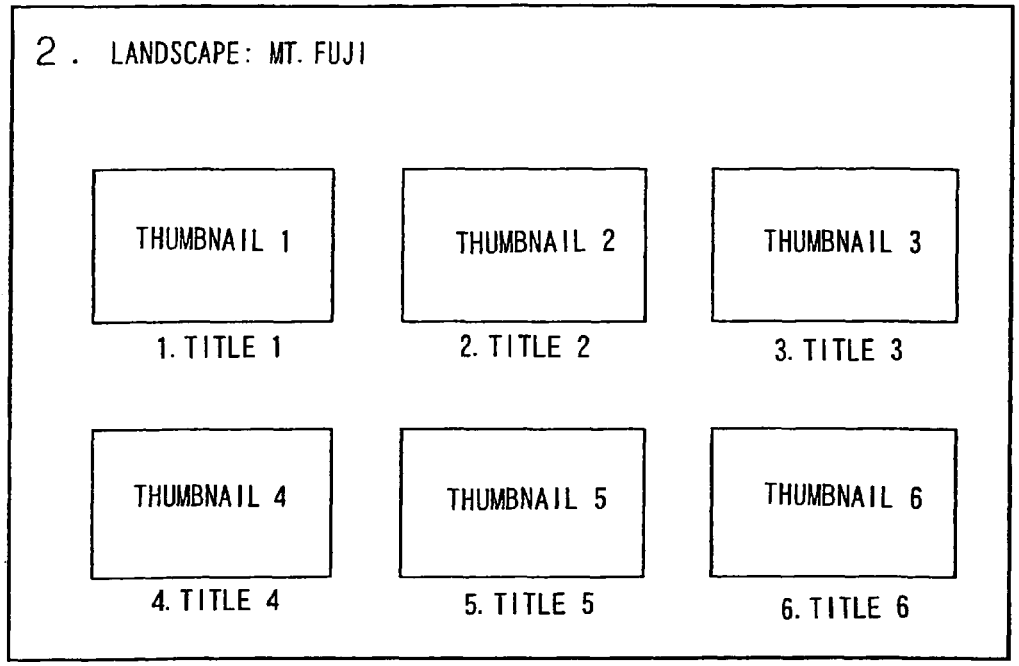
(a)
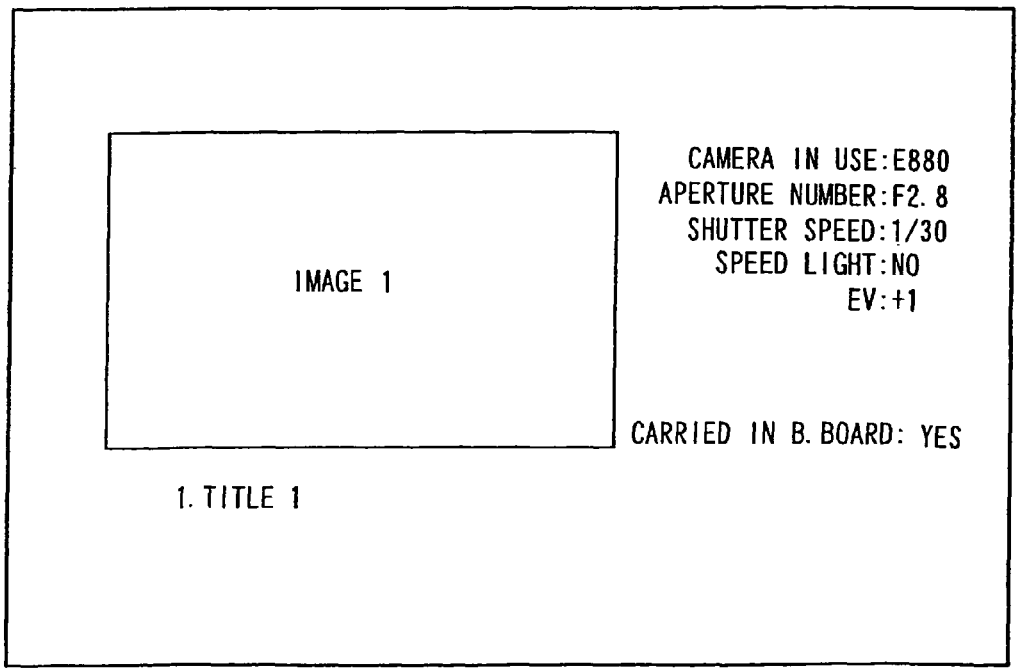
(b)

FIG.58

```
BULLETIN BOARD                                    ALBUM
                  SHOOTING : HOKKAIDO                 LANDSCAPE
SHOOTING INFO     INFO                                    HOKKAIDO

TIME OF                                    NUMBER OF
  ├ HOKKAIDO      DAY     CATEGORY   Q'NER   TITLE  DESCRIPTION  ANSWERS

├ TOHOKU         ───    ───         ───     ───    ───          1

├ KANTO          ───    ───         ───     ───    ───          2

.
                                       .
                                       .
```

(a)

```
ALBUM                                             BULLETIN BOARD
                                                  SHOOTING INFO
                  LANDSCAPE : HOKKAIDO                  HOKKAIDO
LANDSCAPE

├ HOKKAIDO        ┌────┐   ┌────┐   ┌────┐
                    │    │   │    │   │    │
  ├ TOHOKU          └────┘   └────┘   └────┘

├ KANTO           ┌────┐   ┌────┐   ┌────┐
                    │    │   │    │   │    │
                    └────┘   └────┘   └────┘
```

```
SEARCH RESULT
PRODUCT/NEW ARRIVAL      0

SUPPORT SERVICE          8         ┌─────────────┐
    1. ─────                        │ DISPLAY ALL │
    2. ─────                        └─────────────┘
    3. ─────                               │
    4. ─────                              62A
    5. ─────
COMMUNITY ARTICLE        1
    1. ─────
COMMUNITY Q&A            3
```

(a)

```
SEARCH RESULT
SUPPORT SERVICE         15
    1. ─────
    2. ─────
    3. ─────
    4. ─────
    5. ─────
    6. ─────
       .
       .
       .
       .
```

EXPERT INFORMATION

SELF-INTRODUCTION   NICKNAME○△×

RATING ☆☆☆

SEARCH RELATED EXPERTS

SHOOTING CAREER    5 YEARS

CAMERAS    F△, F☐

SEARCH RELATED EXPERT

ALBUM

63A

ELECTRONIC SHOP PROVIDING METHOD, SITE SEARCH METHOD, AND BULLETIN BOARD PROVIDING METHOD FOR SEARCHING A PLURALITY OF CONTENT REGISTERED ONTO A WEBSITE

This is a Division of U.S. patent application Ser. No. 11/184,889 filed Jul. 20, 2005, which in turn is a Division of U.S. patent application Ser. No. 10/713,097 filed Nov. 17, 2003 (now abandoned), which in turn is a Continuation of Application No. PCT/JP02/04812 filed May 17, 2002. The entire disclosure of each of the prior applications is hereby incorporated by reference herein in its entirety.

INCORPORATION BY REFERENCE

This application is based upon the following Japanese Patent applications, the content being incorporated herein by reference.
Application No: 2001-149927 (filed on May 18, 2001)
Application No: 2001-149935 (filed on May 18, 2001)
Application No: 2001-149948 (filed on May 18, 2001)
Application No: 2001-149958 (filed on May 18, 2001)
Application No: 2001-149969 (filed on May 18, 2001)
Application No: 2001-149978 (filed on May 18, 2001)

BACKGROUND OF THE INVENTION

1. Field of the Invention
This invention relates to a customer service via a website.
2. Description of Related Art
A so-called web or an information search system that searches information on the Internet using a Hypertext is known. In this system, content is stored onto a web server with the Internet Protocol (IP) and the content stored onto the web server is searched at a terminal connected to the Internet, using a browsing program. A location registering the content is called a website. In the website, while content containing unique information is available at a website and provides information to users that search the website and utilize the content, information may be obtained from the users who are provided with information.

The inventors have come up an idea that if content describing product information is created, and information from the customers that purchase the product based upon information from the content is stored at the content, an all-new customer service will be established.

SUMMARY OF THE INVENTION

A method of providing an electronic shop using a network in accordance with this invention includes a step to transmit information to solicit a purchase will of merchandise to a terminal of a user via a network, a step to receive purchase information indicative of a purchase will of the merchandise sent from the terminal of the user, a step to calculate a quantity of stock of the commodity in response to received purchase information by a computer, and a step to transmit information about an out-of-stock of the merchandise to the terminal of the user having transmitted purchase information via a network when the stock of the merchandise is below a given stock.

According to the method, as distinct from a case where a status of an out-of-stock is judged at all times during a subsequent process such as a settlement process to be performed after purchase information of merchandise is transmitted from a terminal of a user, a stock will not become out of stock during a settlement process through a terminal, so an ease-of-use electronic shop can be provided for a user.

Purchase information indicative of the purchase will may be transmitted from a terminal of a user when putting the commodity into an electronic shopping cart.

A method of providing an electronic shop using a network in accordance with this invention includes a step to transmit information to solicit a purchase will of merchandise to a terminal of a user via a network, a step to receive purchase information indicative of a purchase will of the commodity sent from the terminal of the user via a network, a step to calculate a quantity of stock of the commodity in response to received purchase information by a computer, a step to detect whether or not a quantity of stock of the commodity becomes below a first given quantity by a computer and, when it is detected that a quantity of stock of the commodity becomes below the first given quantity for the first time since a given time, a step to transmit information indicating that a quantity of stock of the commodity becomes below the given quantity to a terminal of a stock manager of the merchandise via a network.

The method of providing the electronic shop may let a computer detect whether or not a quantity of stock of the commodity becomes below a second given quantity that is smaller than the first given quantity and every time it is detected that a quantity of stock becomes below the second given quantity, information that a quantity of stock of the commodity becomes below the second given quantity may be transmitted to the terminal of the stock manager of the merchandise.

Transmission to the terminal of the stock manager may be executed by an E-mail. The electronic shop may be run on a website.

A method of providing an electronic shop using a network in accordance with this invention includes a step to receive information demanding transmission of stock management information from a terminal of a stock manager of merchandise via the network, a step to transmit stock management information for entering a fluctuation in a quantity of stock for each commodity to a terminal of a stock manager via the network, a step to receive information about a fluctuation in the quantity of stock of the commodity from the terminal of the stock manager via a network and a step to calculate a quantity of stock of the commodity based upon received information about the fluctuation in the quantity of stock by a computer.

According to the method, a fluctuation in a quantity of stock can tell how many stocks are gained or reduced against a beginning stock and a stock can tell a surplus or a shortage, so an electronic shop with a ease-of-use stock management can be provided for a manager.

A stock can be calculated by adding the received fluctuation in a quantity of stock to a quantity of stock preceding the received fluctuation.

The method of providing the electronic shop further may check whether or not a stock becomes below a first given quantity and, when the stock becomes below the first given quantity for the first time since a given time, may transmit information indicative of a quantity of stock of the commodity being reduced to a terminal of a stock manager. The method of providing the electronic shop further may check whether or not a quantity of stock becomes below a smaller second given quantity than the first given quantity and every time the quantity of stock becomes below the second given quantity, information indicative of an out-of-stock of the commodity may be transmitted to the terminal of the stock manager. And also, when a stock is below the second given quantity, information indicative of an out-of-stock of the commodity may be transmitted to a terminal of a user in response to information about a purchase will of the commodity sent from the terminal of the user.

Further, the method of providing the electronic shop includes a step to calculate a quantity of stock per the given commodity and checks whether or not a quantity of stock becomes below 0 and (1) information about commodity may be transmitted to a terminal of a user in response to a demand for information about the commodity sent from the terminal of the user when a quantity of stock does not become below 0, and (2) transmission of information about the commodity may be halted when a quantity of stock becomes below 0.

A method of providing an electronic shop using a network in accordance with this invention includes a step to store merchandise information about a plurality of commodities and various kinds of measures to be executed by a computer onto a memory when a quantity of stock of commodity becomes below a given quantity, a step to set a measure for each commodity out of various kinds of measures, a step to store a measure set for each commodity onto a memory with linkage of the measure to merchandise, a step to detect a quantity of stock of commodity, and a step to execute a measure applied to the commodity by a computer when a quantity of stock of the commodity becomes below a given quantity.

According to the method, a measure in response to commodity is executed just like, for example, in a case of commodity that needs a time before it is re-supplied, an out-of-stock display is carried and in a case of a limited available number of merchandise, a sold-out display is carried, so an ease-of-use electronic shop for a user can be provided.

The measure may halt providing merchandise information. The measure may present information indicative of an out-of-stock together with merchandise information. The measure may put commodity out of a target commodity search.

A method of providing an electronic shop that manages merchandise based upon merchandise identifier information given per commodity in accordance with this invention includes a step to store different merchandise identifier information varying with a given measure to be taken to even identical commodity onto a memory and a step to manage identical commodity as different commodity based upon the merchandise identifier information by a computer. According to the method, for example, a separate management for wrapped commodity or commodity without a wrapping may eliminate a wasteful work like wrapping or unwrapping commodity. The measure may be to wrap commodity. The measure may be to describe a text on commodity.

A method of providing an electronic shop using a network in accordance with this invention includes a step to transmit information for soliciting a purchase will of commodity to a terminal of a user via a network, a step to receive purchase information indicative of a purchase will of the commodity sent from a terminal of a user via the network, a step to calculate a quantity of stock of the commodity in response to the received purchase information and, when the quantity of stock of the commodity is below a given quantity, a step to transmit information advising an advance order for the commodity to the terminal of the user via the network.

According to the method, a user can place an advance order readily for commodity even when commodity the user is willing to purchase is out of stock, so an ease-of-use electronic shop can be provided. And further this method may transmit information indicating an expected available date of the commodity to the terminal of the user.

A method of providing an electronic shop using a network in accordance with this invention includes a step to transmit information prompting more participation in a lottery for a winning prize on a network to a terminal of a user that purchases the commodity on the electronic shop, a step to receive participation information sent from the terminal of the user via the network, a step to carry out a lottery in response to the participation information by a computer and, when a prize is won, a step to instruct to deliver the commodity and the winning prize to the user at the same time by a computer.

According to the method, a combined delivery can reduce a delivery cost in comparison to a separate delivery.

A method of providing an electronic shop using a network in accordance with this invention includes a step to receive purchase information of purchasing a plurality of commodities from a same user from a terminal of a user via the network, a step to judge whether or not a deliverable date of the plurality of commodities varies with each commodity by a computer and, when the deliverable date of the plurality of commodities varies with each commodity, a step to transmit information asking if the plurality of commodities are delivered at a time or separately to the terminal of the user via the network.

According to the method, a combined delivery can reduce a delivery cost in comparison to a separate delivery.

A method of providing an electronic shop using a network in accordance with this invention includes a step to receive purchase information of purchasing a plurality of commodities from a same user from a terminal of a user via the network, a step to judge whether or not a deliverable date of the plurality of commodities varies with each commodity by a computer and, when the deliverable date of the plurality of commodities varies with each commodity, a step to transmit information asking if a payment of the plurality of commodities is made at a time or separately to the terminal of the user via the network.

A method of providing an electronic shop using a network in accordance with this invention includes a step to store 3-D image data corresponding to a plurality of commodities onto a memory, a step to receive information of selecting a first commodity and a second commodity different from the first commodity from a terminal of a user, a step to read out a first 3-D image data corresponding to the first commodity and a second 3-D image data corresponding to the second commodity out of the memory only when a combination of the first commodity and the second commodity is usable, a step to process the first 3-D image data and the second 3-D image data in an integrated manner so as to enable to use the combination of the first commodity and the second commodity and a step to transmit image data that was processed in the integrated manner to the terminal of the user.

According to the method, a user can look at, for instance, an image that an accessory is attached to a camera body before purchasing commodity. And also, an electronic shop provider can save work and time to produce an image that an accessory is actually attached to a camera body.

The method may perform a process to turn against image data that was processed in the integrated manner in response to information indicative of a turn instruction sent from the terminal of the user and transmit image data that was performed by the turn process to the terminal of the user.

A method of providing an electronic shop using a network in accordance with this invention includes a step to record information about related merchandise prepared every a plurality of commodities and registration information about a plurality of users onto a memory, a step to authenticate a user based upon authentication information sent from a terminal of a user via a network by a computer, a step to search for merchandise information owned by the user out of registration information of an authenticated user by a computer, a step to search for related merchandise in relation to merchandise the user owns by a computer and a step to transmit information about related merchandise in relation to merchandise the user owns to the terminal of the user via a network.

According to the method, there is no further purchase recommendation against merchandise a user has already owned and, on top of that, related merchandise such as an accessory is automatically introduced without a user's search, so a convenient electronic shop for a user can be provided. And further, the method may transmit information about related merchandise in relation to this merchandise in response to purchase information indicative of a purchase will of merchandise sent from the terminal of the user to the terminal of the user.

A method of searching a plurality of content registered on a website in accordance with this invention includes a step to search for a search text or a search character string sent from a client on a plurality of content respectively, a step to classify information indicative of a registration location of a retrieved text or character string for each of content, a step to rearrange information classified for each of the content, a step to extract a given number of information in high order for each of content with regard to rearranged information classified for each of the content and a step to transmit extracted information to the client.

According to the method, for instance, even when specific content has many hits, as a given number of hits are displayed, it does not occur that a display screen becomes full as a result of a search on specific content. Thus, full details of hits on all of content can be checked without a scroll. The given number may be determined for each of the content.

A method of searching a plurality of content registered onto a website in accordance with this invention includes a step to regard a text or a character string as a search text or a search character string when a text or a character string related to a provider of the content is included in information for creating a page screen to be sent to a client, a step to search for the search text or the search character string on the content respectively in response to information indicative of a search instruction, a step to classify information indicative of a registration location of a retrieved search text or character string for each of content, a step to rearrange information classified for each of the content, a step to extract a given number of information in high order for each of content with regard to rearranged information classified for each of the content and a step to transmit extracted information to the client.

According to the method, a client is not required to take the trouble to enter a search text or a search character string, so an ease-of-use website search for a client can be provided.

A method of searching a plurality of content registered onto a website in accordance with this invention includes a step to include information about a search text or a search character string in advance into information for creating a page screen to be transmitted to a client, a step to search for the search text and a step to transmit the search character string on each of a plurality of the content in response to information indicative of a search instruction from the client, a step to classify information indicative of a registration location of a retrieved text or character string for each of content, a step to rearrange information classified for each of the content, a step to extract a given number of information in high order for each of content with regard to rearranged information classified for each of the content and a step to transmit extracted information to the client.

According to the method, a client is not required to take the trouble to enter a search text or a search character string, so an ease-of-use website search for a client can be provided.

Information about the search text or the search character string may be created in relation to content of the page screen and included into information for creating the page screen.

A method of searching a plurality of content registered onto a website in accordance with this invention includes a step to search for a search text and a search character string sent from a user on each of a plurality of the content respectively, a step to classify information indicative of a registration location of a retrieved text or character string per each of content and a step to transmit the classified information to the user.

According to the method, a search result is classified per each of content, so information is more understand able in comparison to non-classified information. And further the method may select content to be searched for out of a plurality of the content. In this case, the method may determine a given number in response to a number of search content, extract and transmit a given number of information for each of selected content to the user.

A method of searching a plurality of pages in accordance with this invention includes a step to provide a start device to command a search on a given page, a step to receive a signal indicative of the start device being turned on by the user, a step to search for a page related to the given page in response to the signal reception and a step to transmit a search result to the user.

The method of searching a plurality of pages may set a text or a character string as a search keyword in advance in the given page. In this case, a given description may be performed in advance in the page so as to enable to specify a text or a character string of a search keyword.

And further, the page may be written in HTML and a text or a character string of a search keyword may be caught between given tags.

The method of searching a plurality of pages may search for a predetermined point in the given page as a search keyword. The predetermined point may be a title in the given page. The given page may be written in HTML and a text or a character string in the given page may be caught between given tags.

A method of providing an electronic bulletin board carrying an article sent from a user in accordance with this invention includes a step to make an article in the electronic bulletin board classifiable for a plurality of categories in order to enable an article to be browsed for a category and a step store the classifiable article for the plurality of categories onto a memory, a step to make image data in an electronic album classifiable for a plurality of same categories as those in the electronic bulletin board in order to enable image data to be browsed for a category and a step to store the classifiable image data onto a memory, a step to receive an instruction to browse an article falling under the given category in the electronic bulletin board sent from a terminal of a use via a network and a step to transmit bulletin board information added by article information classified into a category as instructed and album information in order to enable image data in a same category as instructed to be browsed to a terminal of a user via a network.

According to the method, for instance, when a user wants to know about an image in an electronic album, a bulletin board carrying an article related to this image can be found out soon, a convenient electronic bulletin board can be provided. The category may classify the article and the image data per an area on a map.

BRIEF DESCRIPTION OF THE DRAWINGS

FIG. 6 represents an input screen for product information.
FIG. 7 represents an input screen for customer information.
FIG. 8 represents a screen for filling in a questionnaire.
FIG. 13(a) represents a screen notifying delivery location.
FIG. 13(b) represents a screen notifying addition of a point.
FIG. 18 represents a screen for a customer information update.
FIG. 22 represents an item selection screen.
FIG. 32(a) represents a lottery screen.
FIG. 32(b) represents a display screen of announcing a lottery winning of a camera and displaying a delivery location selection button.
FIG. 36 represents a reservation screen.
FIG. 38 represents a selection screen of a delivery method.
FIG. 39 represents a page screen of a bill.
FIG. 43 represents a screen on which an on-line album category is logged in.
FIG. 49(a) represents a screen showing thumbnail images.
FIG. 49(b) represents a screen showing a larger image than a thumbnail one.
FIG. 52 represents a screen where a community category is logged in.
FIG. 58(a) represents a display screen of an image classified into [shooting information]-[Hokkaido] in a board.
FIG. 58(b) represents a screen of an image classified into [landscape]-[Hokkaido] in an album.
FIG. 62(a) represents a display screen showing a search result of a plurality of content.
FIG. 62(b) represents a display screen showing a search result of a single content.
FIG. 63 represents an introduction screen of an expert.

DETAILED DESCRIPTION OF THE PREFERRED EMBODIMENT

By referring to the accompanying drawings, embodiments of this invention will be explained as follows.

According to an embodiment of this invention, a web service provider provides a service user with a service or information about a product via content for a website.

Figure 1:
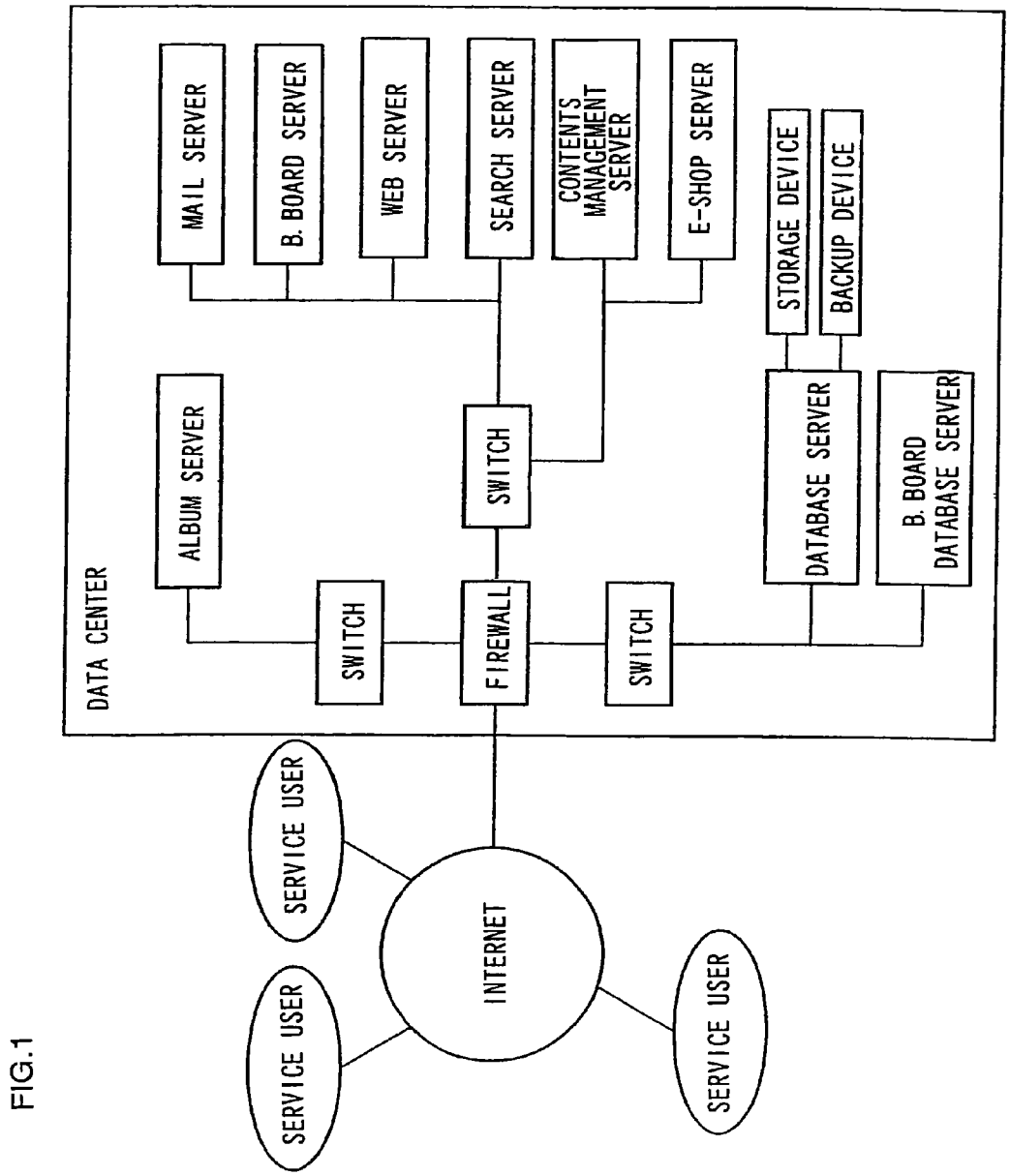
FIG. 1 represents an overall configuration of a website registering content for use at the website.

FIG. 1 represents an example of an overall configuration of a website where content for a website is registered. In FIG. 1, a service provider places a server at a data center and a service user searches a website via a terminal connected to the Internet. A service user specifies URL (Uniform Resource Locator) via a terminal connectable to the Internet, then content data stored onto the server is read out and sent to the service user. This embodiment of this invention refers to a camera as a product and provides information about a camera and a camera-related matter or a service to a service user. As shown in a site map of FIG. 2, content of this invention has seven categories.

1. membership registration
2. all-new information
3. product information
4. service support
5. on-line album
6. on-line shop
7. community Membership registration 1 is a page for registering a web service user. All-new information 2 is a page for introducing to a service user information such as new content newly registered onto a website. Product information 3 is a page for introducing a product such as a camera to a service user. Service support 4 is a page for introducing to a service user questions and answers to and from product users. On-line album 5 is a page that provides a service user with a service dealing with electronic image data. For example, this on-line album 5 provides a service in such a way that image data of a service user can be stored up to a certain capacity free of charge and a high definition hard copy of selected image data that will be made out of stored image data can be delivered. On-line shop 6 is a virtual shop selling merchandise to a service user. Community 7 is a page that provides a place for communication among service users.

For example, community 7 provides a function like a bulletin board carrying a question posed by a user and an answer that another user knows to the question.

Figure 3:
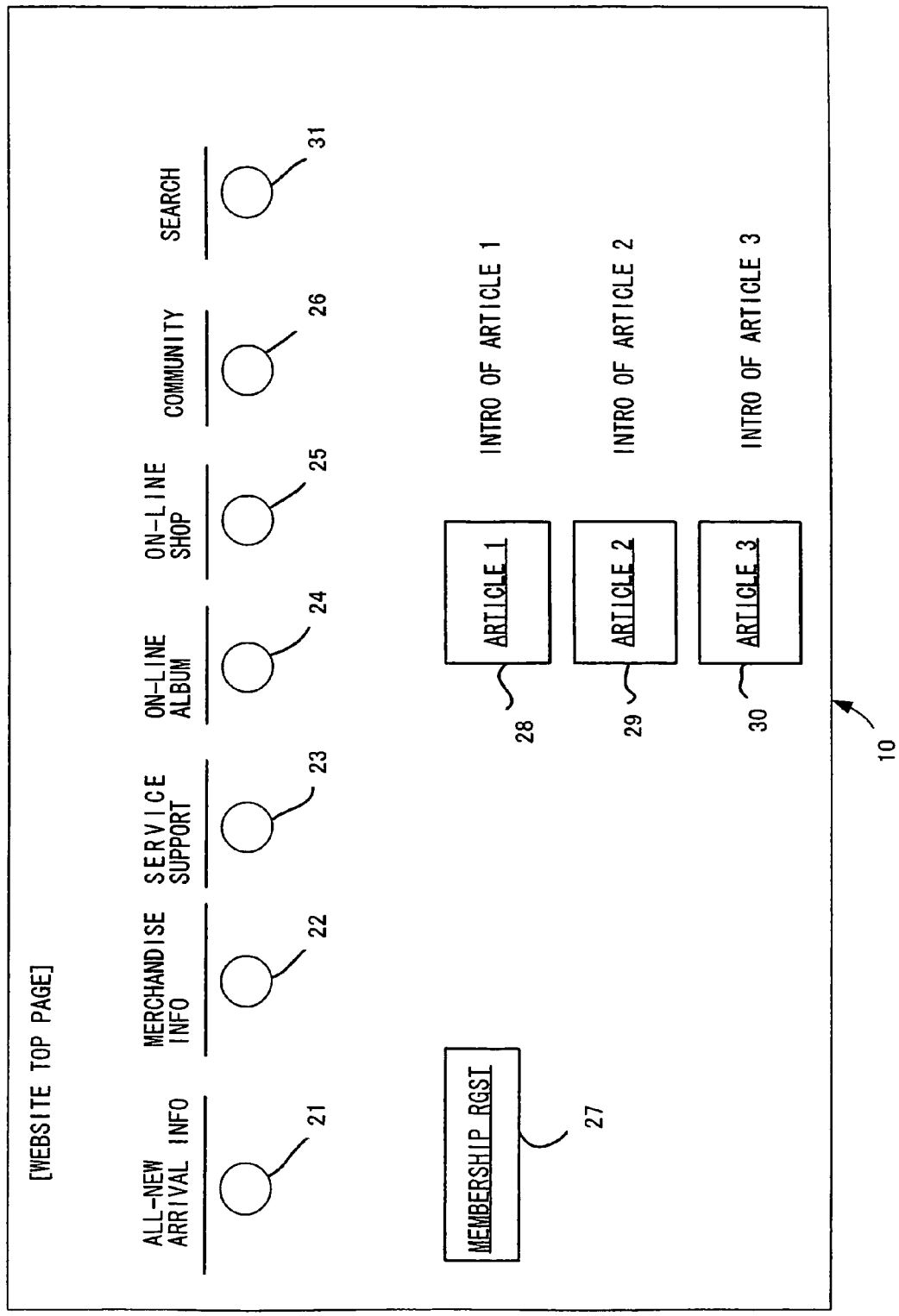
FIG. 3 represents a top page screen of a web.

FIG. 3 represents an example of a web top page 10 screen viewed on a monitor at a user's terminal. This screen is displayed on a monitor of a user's terminal by a browsing program loaded onto the terminal based upon data stored at URL specified by the web user via the terminal. In this FIG. 3, link buttons 21~27 linking to the seven each category are displayed. Further, link button 28 linking to article 1, link button 29 with a link with article 2, link button 30 linked to article 3 and link button 31 with a link with a search page to be later explained are also displayed.

A web user clicks on a link button with a pointing device provide with a terminal (not shown), information of a link embedded corresponding to each link button, namely, URL is specified. In this way, data stored inside this URL is sent to the terminal and a screen created by this data is viewed on the terminal monitor. For example, a web user clicks on link button 21 linking with all-new information 2, and then a top page screen of a category of all-new information 2 represented by FIG. 4 is displayed on the terminal monitor.

Figure 2:
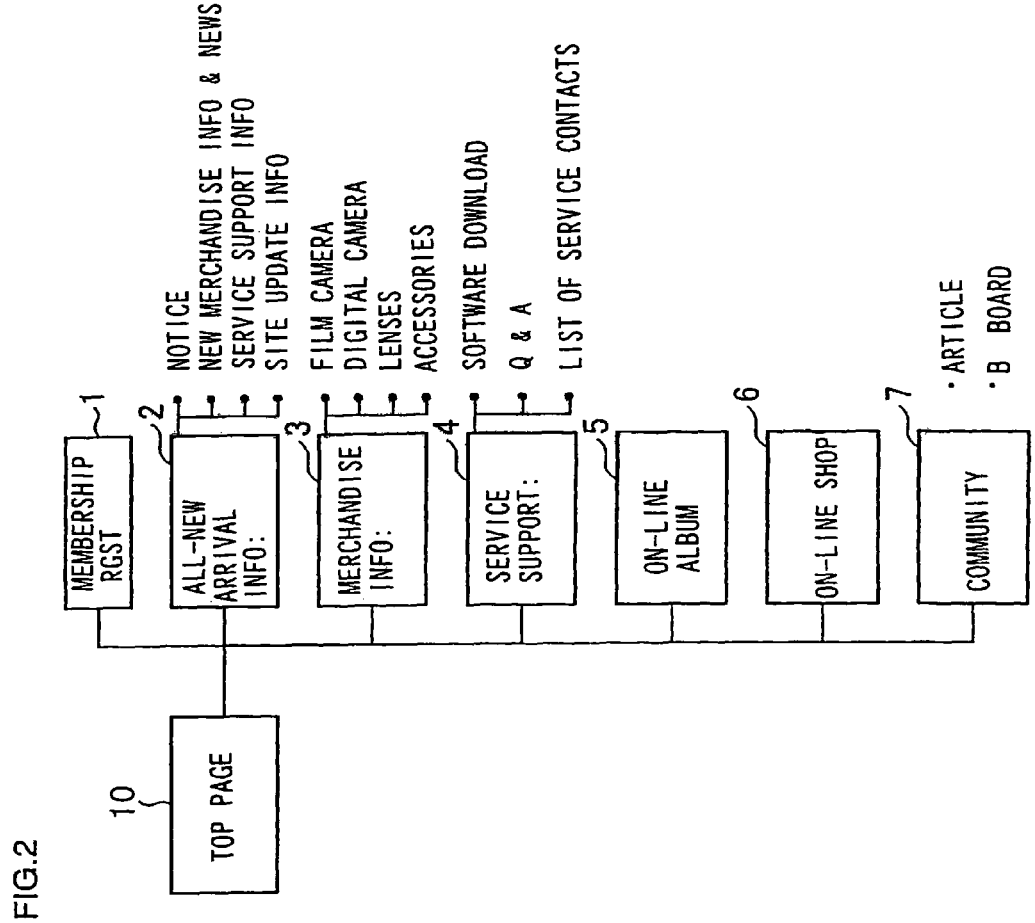
FIG. 2 represents a site map.
Figure 4:
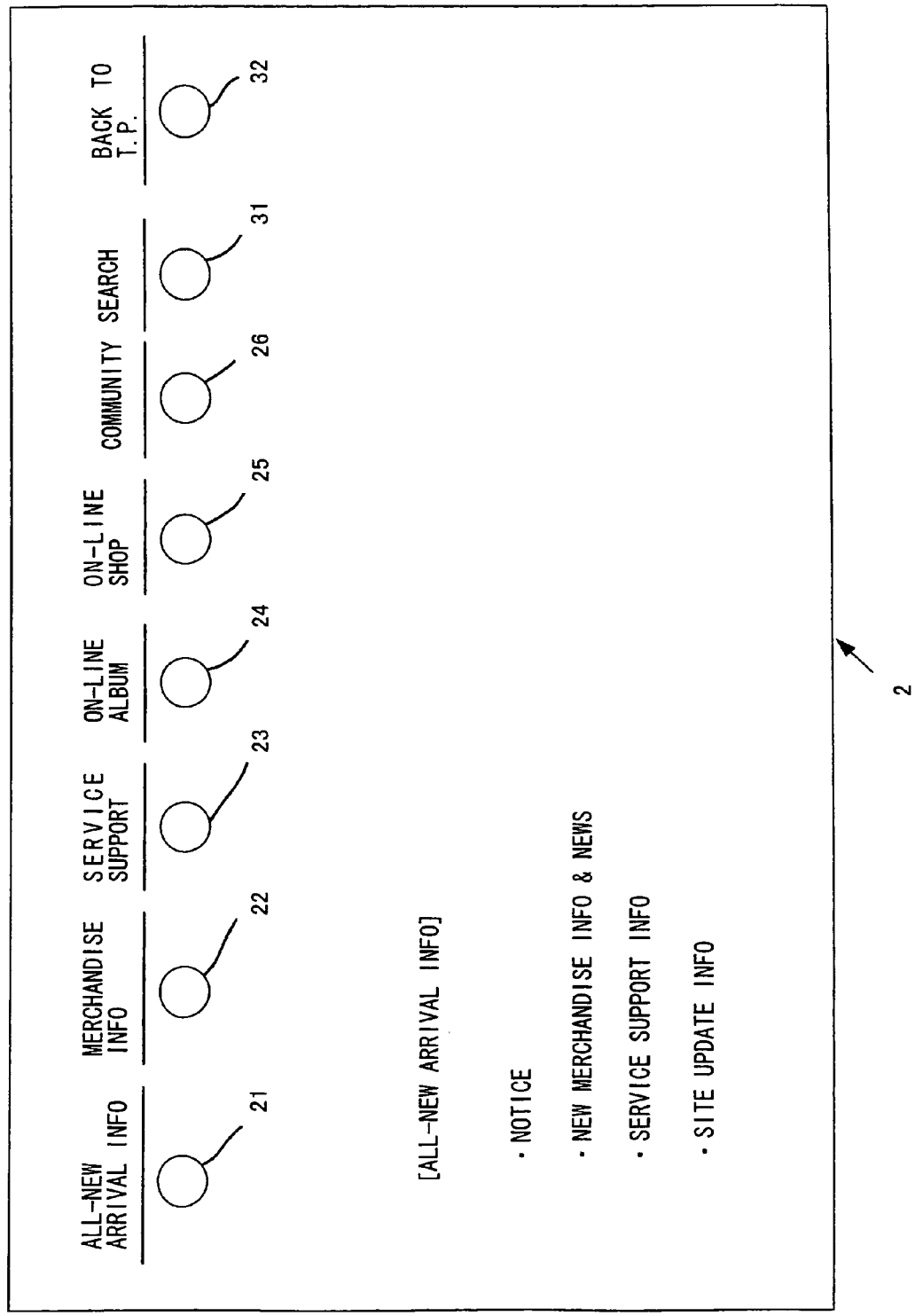
FIG. 4 represents a top page screen of a category of all-new information.

Referring to FIG. 4, the page screen of a category of all-new information 2 has "Information", "New product information-News", "Service support information" and "Site update information" on a site map of FIG. 2 displayed respectively. Content of these displays may be displayed on a page screen different from a page screen of FIG. 4 by providing a link button in the page screen of FIG. 4. Further the screen of FIG. 4 has link buttons 21~26 to jump to another category, link button 31 linking to a "search" page and link button 32 to get "Back to a top page" displayed. When each of these link buttons is clicked on, a page corresponding to each link button is displayed on a terminal monitor. When link button 21 linked to a category of "all-new information" is clicked on with a page screen of FIG. 4 on display, the page screen of FIG. 4 remains as it is.

Figure 5:
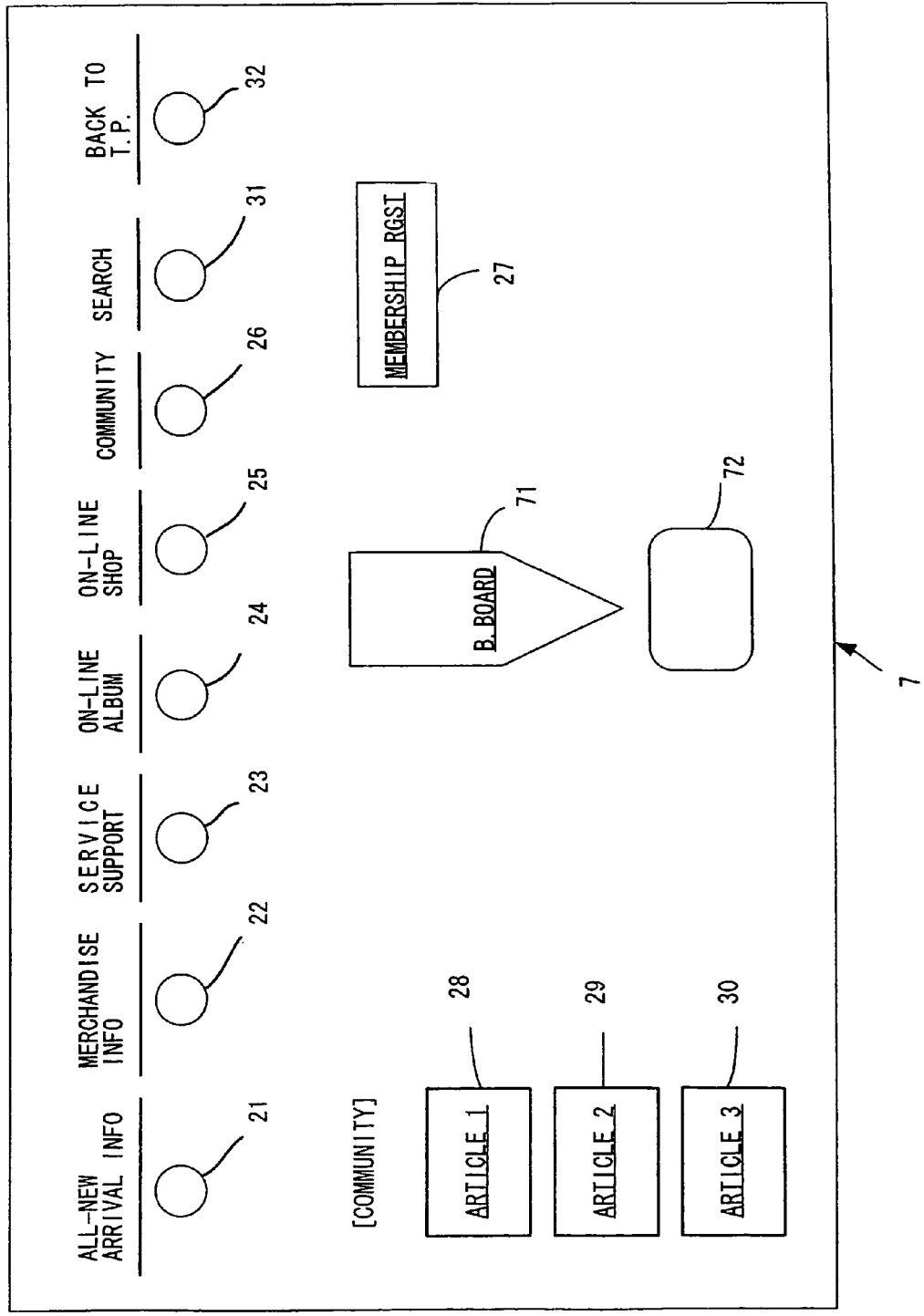
FIG. 5 represents a top page screen of a category of a community.

Referring to FIG. 3, link button 26 linked to "community" is clicked on and then a top page of a category of community 7 as shown in FIG. 5 comes up. In FIG. 5, a page screen of a category of community 7 has link buttons 28, 29 and 30 corresponding to articles carried in a site map of FIG. 2, link button 71 linking to a bulletin page, link button 72 linking to a page for downloading an image data and link button 27 linking to a page of registering a membership displayed. Content of these displays may be displayed in a page of FIG. 5 without providing a link button.

The screen of FIG. 5, just like the screen of FIG. 4, further has link buttons 21~26 for jumping into another category pages, link button 31 linking to a "search" page and link button 32 to get "Back to a top page" displayed. When link button 26 linked to a category page of a community is clicked on with a page screen of FIG. 5 on display, the page screen of FIG. 5 remains as it is.

In each page of FIGS. 3, 4 and 5, for example, the page has a link button available common on each page such as link buttons 21~26. And like link buttons 28~30, there is a link button in common provided on a given page. By providing a link button in common among different pages, a page screen can be changed among each category page without getting back to top page 10 every time when changing a display of each page shown in a site map of FIG. 2. A link button provided in common among each page would readily attract interest of a web user. As a result, a web user becomes induced to view a page corresponding to a link button.

This embodiment has features in, especially, a membership registration, an on-line shop, an on-line album and a bulletin board among categories, so these categories will be mainly explained.

—Membership Registration—

To provide a service to a registered user, a service provider asks a web user to register a user name of a service.

A page of the membership registration, in addition to the membership registration of a web service use, is used also for a customer registration such as customer information to be registered by a user purchasing merchandise released from a service provider. Instead of sending back customer information written in a postcard and so such as a called customer registration card, a user transmits customer information to a service provider through an on-line membership registration page. A web user clicks on link button 27 linking to a "membership registration" in a page screen of FIG. 3, and then a selection screen for registering a membership (not shown) is displayed on a monitor of a terminal. This selection screen is to select any of four input screens 1. A web user who has not yet registered a membership of a web service use newly performs a customer registration.
2. A web user who has already registered a membership of a web service use newly performs a customer registration.
3. Register a membership of a web service use.

4. A user who has already registered a customer (or a membership) changes content of the registration.

—When Non-Member of a Web Service Use Performs a Customer Registration—

In the foregoing selection screen, a service user clicks on a link button (not shown) corresponding to "A web user who has not yet registered a membership of a web service use newly performs a customer registration", then a website server, that is, a server of a service provider transmits display data to a terminal of a service user and displays an input screen for product information as shown in FIG. 6 on the terminal monitor. As shown in FIG. 1, generally a web server includes a plurality of servers such as a web server, content management server, mail server, bulletin board server and shop server. A web server stores web screen data and content management server is responsible for content management respectively. Also, a mail server stores mail data, a bulletin board server stores data written in a bulletin board and a shop server stores shop data. In this explanation, these plural servers are collectively called a server.

When an input screen for product information is displayed on a monitor of a terminal, a service user fills in the input screen according to content of the display. Referring to FIG. 6, a pull-down menu is provided in a frame displayed with a downward triangle. A service user selects an appropriate thing out of menu prewritten by a service provider.

For example, a service user clicks on pull-down menu button 6A displayed in a frame of a merchandise name, a merchandise-name such as merchandise 1, merchandise 2, merchandise 3 and so is displayed. A service user selects merchandise that the user purchased from the menu. In the event that there is no appropriate merchandise name in the pull-down menu or a pull-down menu is not available in a frame, a service user writes content of a registration using a terminal keyboard (not shown). A service user clicks on OK button 6B, and then registration data of product information is transmitted toward a server of a service provider.

The server of the service provider receives the registration data of product information sent from the service user and then transmits display data to the terminal of the user and has an input screen for customer information as represented in FIG. 7 displayed on a monitor of the terminal. A service user fills in content of a registration inside a frame of a display screen in accordance with displayed content. In FIG. 7, a service user enters a password in password frame 7A. When a service user modifies content of a registration afterward, modification can be made with an input of a password. A password to be entered via an input screen for customer information is also used for a membership registration of a service use as a common password.

A frame displayed with a downward triangle is provided with a pull-down menu. If there is no appropriate thing in the pull-down menu or a frame is not provided with a pull-down menu, a service user fills in content of a registration inside a frame of a display screen through a terminal keyboard (not shown). A way of displaying a password inside password frame 7A makes letters or numerals a user enters as a password shown just like **** and they are not displayed as it is. When the service user clicks on OK button 7B at the completion of content of the registration, registration data of customer information is sent to the server of the service provider.

Figure 9:
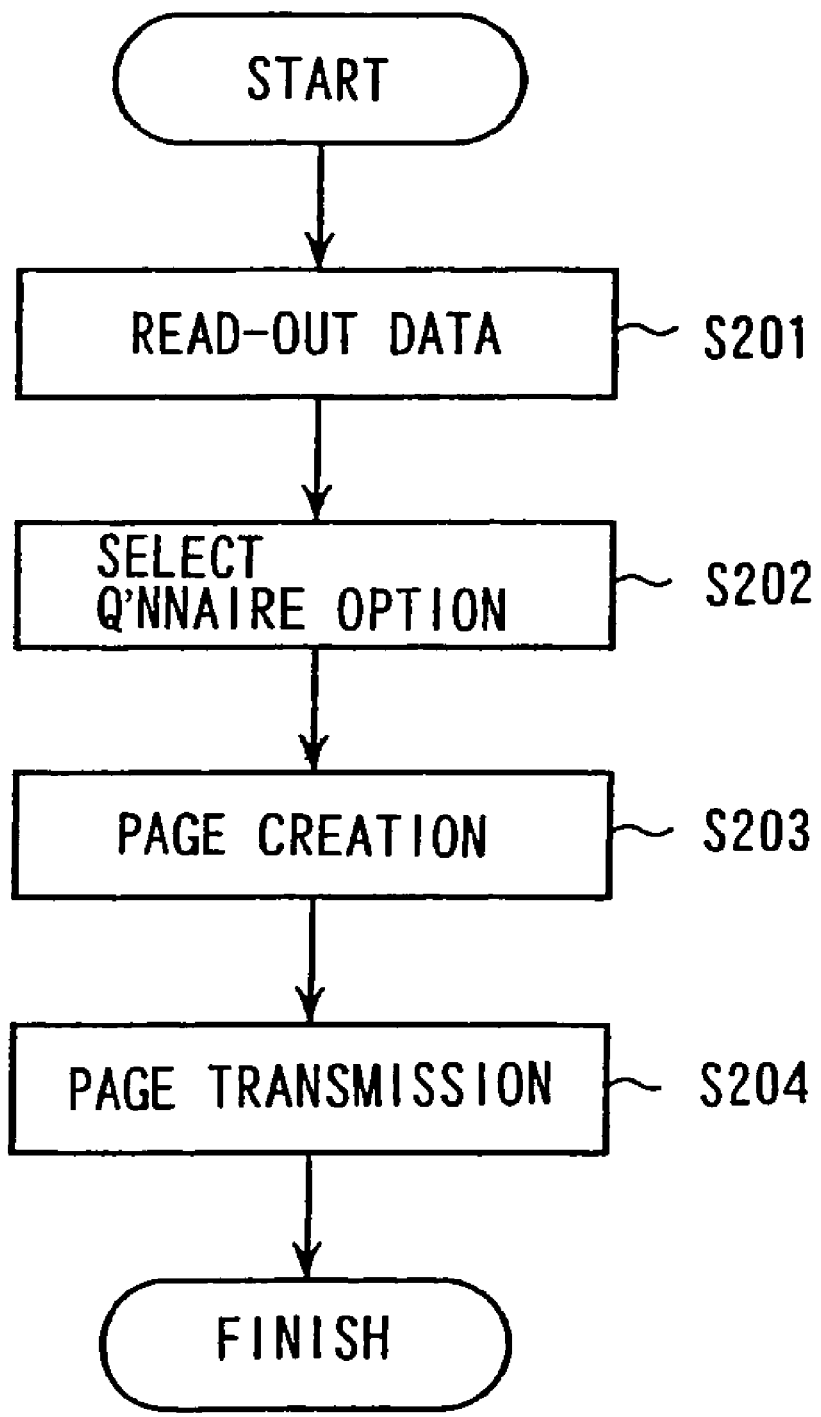
FIG. 9 represents a flow chart explaining how a questionnaire is processed.

The server of the service provider receives registration data of customer information sent from the service user, and transmits display data to a terminal of the service user and has a screen for answering a questionnaire as shown in FIG. 8 displayed on a terminal monitor. The service user fills in content of a registration in a box of a display screen in accordance with displayed content. A processing of a questionnaire is determined as follows. FIG. 9 represents a flow chart explaining how a server of a service provider processes a questionnaire. A processing of FIG. 9 starts up when registration data of customer information is received.

In step S201, a server reads out merchandise information falling under a merchandise name registered by a service user through an input screen for merchandise information from a given database inside the server and proceeds to step S202. In step S202, the server selects a question in accordance with a registered merchandise name and proceeds to step S203 where each question corresponding to all merchandise is prepared in advance and these questions are stored onto a database inside the server. Each question stored onto the database is managed so that the server can tell a question in common with a plurality of merchandise from one particular to merchandise. In accordance with registered merchandise name, the server selects a question corresponding to merchandise. When a service user purchases a plurality of merchandise, a question corresponding to each of a plurality of merchandise is selected respectively. In the event that there are same questions among the selected questions, the server leaves only any one of the same questions and deletes the rest so that the same questions are not be sent to the terminal of the service user. In step S203, the server creates a database for displaying an input screen of a questionnaire as shown in FIG. 8 and proceeds to step S204. In step S204, the server transmits data necessary to display the created input screen of the questionnaire to the terminal of the service user and a processing of FIG. 9 is finished. Accordingly, for example, question boxes 1~5 of FIG. 8 display questions in common with each of merchandise 1 and 2. In question box 6, a question related to merchandise 1 is displayed and in question box 7, a question in relation to merchandise 2 is displayed respectively. A service user can answer a question related to a plurality of merchandise on a single input screen of a questionnaire even when purchasing a plurality of merchandise.

Figure 10:
FIG. 10 represents a screen for a gift selection.

A service user clicks on register button 8H after writing answers to each question into each answer box 8A~8G on a screen of FIG. 8, and then registration data of a questionnaire is transmitted to the server of the service provider. The server of the service provider receives registration data sent from the service user, and then transmits display data to the terminal of the service user and has a gift selection screen shown in FIG. 10 displayed on a monitor of the terminal. FIG. 10(a) represents an example of a page screen for an individual registration and FIG. 10(b) indicates an example of a page screen for a corporate registration.

Figure 11:
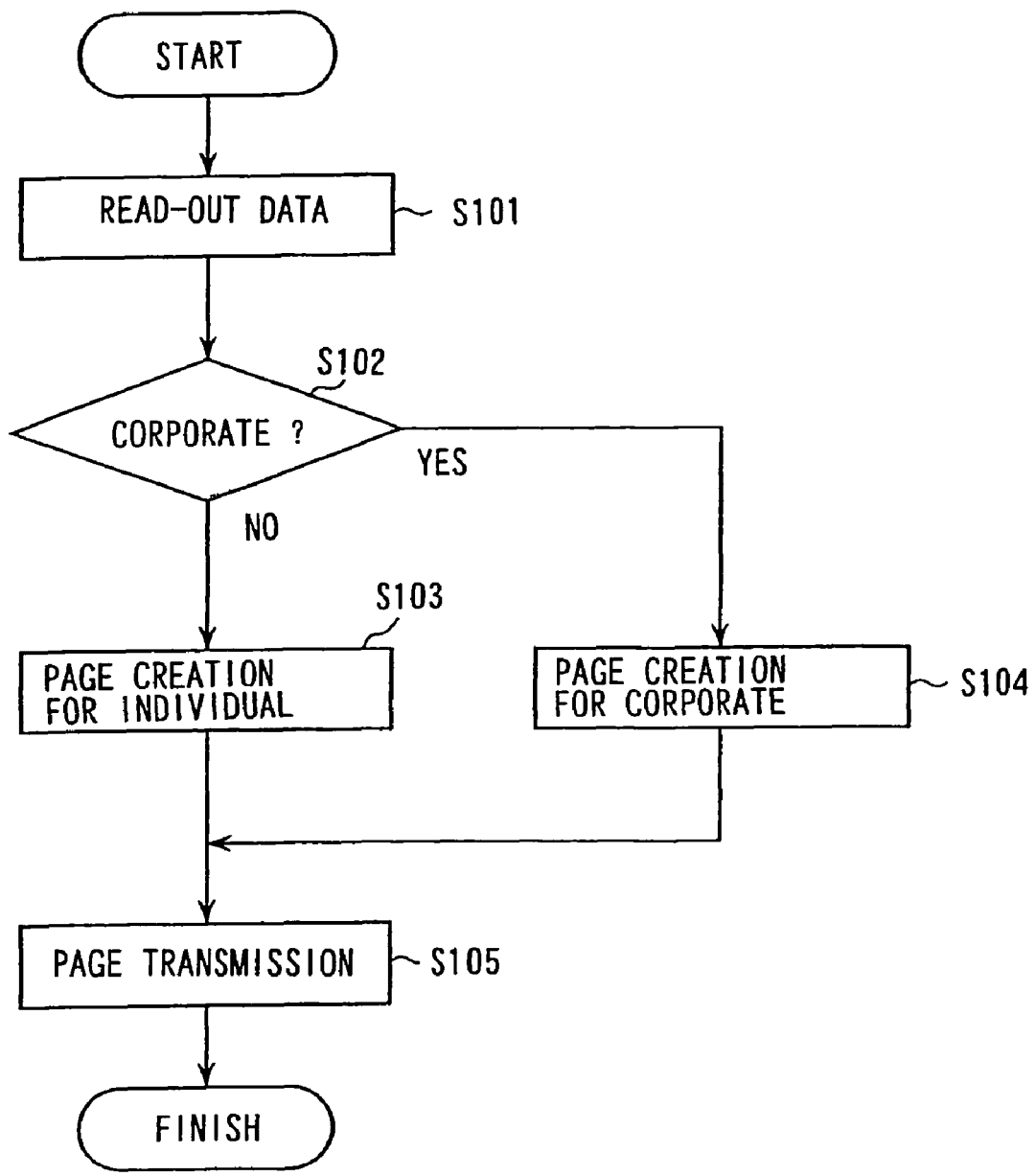
FIG. 11 represents a flow chart explaining how a screen creation of a gift selection is processed.

A service user selects a gift the user wants in accordance with displayed content. A gift selection screen is decided as follows. FIG. 11 represents a flow chart explaining how a creation of a gift selection screen is processed by the server of the service provider. A processing of FIG. 11 starts up at the reception of registration data of a questionnaire. In step S101, the server reads out a name of merchandise, a purchase profile (individual or corporate), a purchase quantity and information such as a name and address of a purchaser typed through an input screen of customer information as shown in FIG. 7 from a given database inside the server and proceeds to step S102. In step S102, the server judges whether a purchase profile is an individual or a corporate. The server proceeds to step S104 after giving a positive judgment to step S102 in a case of a corporate and when the profile is an individual, the server gives a negative judgment to step S102 and proceeds to step S103. In step S103, the server prepares data for a page screen intended for an individual as shown in FIG. 10(a). FIG. 10(a) introduces a gift for a purchaser who buys a single unit of a SLR camera and represents a screen for selecting any of a flyer describing information about a picture taking, a camera neck strap or a point usable in a web service. The point is a gift available only for an individual customer, not for a corporate. And as a gift corresponding to purchased merchandise, namely here, a compact camera, a case is available. The server proceeds to step S105, creating data for a page screen.

The point is usable in a shopping at on-line shop 6 of FIG. 2 and merchandise can be bought at a deducted price in accordance with the points. On-line album service 5 can increase a memory capacity capable of storing image data from a normal level or provide a free-of-charge printout service in accordance with the points. In community 7, there is another use of a point, for instance, a service user posing a question gives a point to a service user that answers the posed question as remuneration.

In step S104, the server prepares data for a page screen intended for a corporate as shown in FIG. 10(b). FIG. 10(b) introduces a gift to a corporate purchasing three units of a SLR camera and represents a screen for selecting up to total three items of any of a flyer describing information about a picture taking, a camera neck strap or a compact camera case. On the contrary to an individual customer, the point is not available for a corporate as a gift. The server proceeds to step S105, creating data for a page screen.

Figure 12:
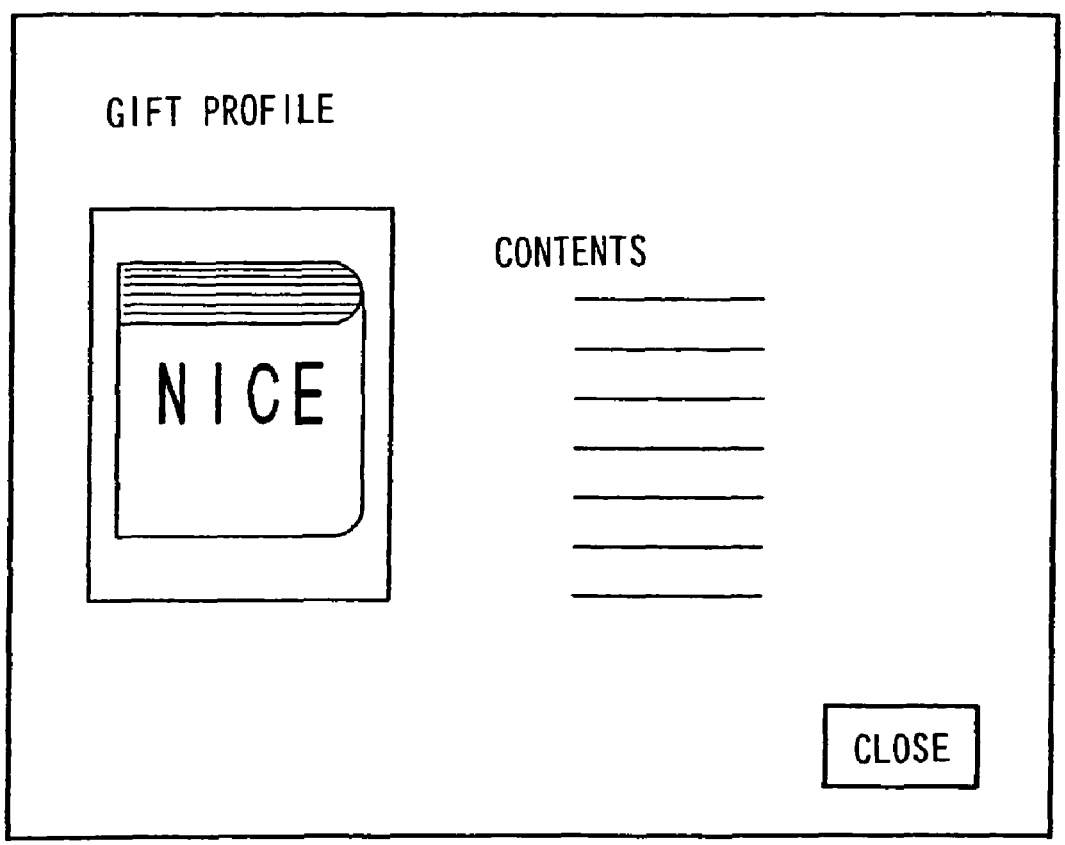
FIG. 12 represents a screen introducing a flyer.

In step S105, the server transmits data to the terminal of the service user and a processing of FIG. 11 is finished. Accordingly, the screen of FIG. 10(a) or (b) is viewed on the monitor of the service user's terminal. The service user checks out a gift on any of the screen in FIG. 10(a) or 10(b) and then clicks on OK button 10B. In the event that a plurality of gifts are selectable like FIG. 10(b), quantity box 10C appears, so the service user opens a pull-down menu and selects a quantity the user wants. In FIGS. 10(a) and 10(b), an explanation of the gift sitting next to gift image 10A is displayed. Image 10A acts as a link button, so the service user clicks on this button and then new data is transmitted to the terminal from the server and a page screen introducing the gift in detail is viewed on the monitor of the service user's terminal. FIG. 12 represents an example of a screen introducing a flyer.

In FIGS. 10(a) and 10(b), the service user clicks on OK button 10B, then selection data is transmitted to the server of the service provider. The server of the service provider receives selection data sent from the service user, and then data of a page screen corresponding to a gift is transmitted to the terminal of the service user. Accordingly, when a gift is required to be delivered to a service user, a screen that notifies a delivery location as shown in FIG. 13(a) is displayed on the monitor of the service user's terminal. And, in a case of a point gift that does not require a delivery, a screen that notifies a point gain shown in FIG. 13(b) is displayed on the monitor of the service user's terminal.

The service user clicks on OK button 10B on screens of FIGS. 13(a) and 13(b), and then a customer registration by a user who has not yet recorded a membership registration of a web service use is finished. In this case, when a purchase profile is an individual, the server successively induces a user to a page of a membership registration of a web service use.

Figure 14:
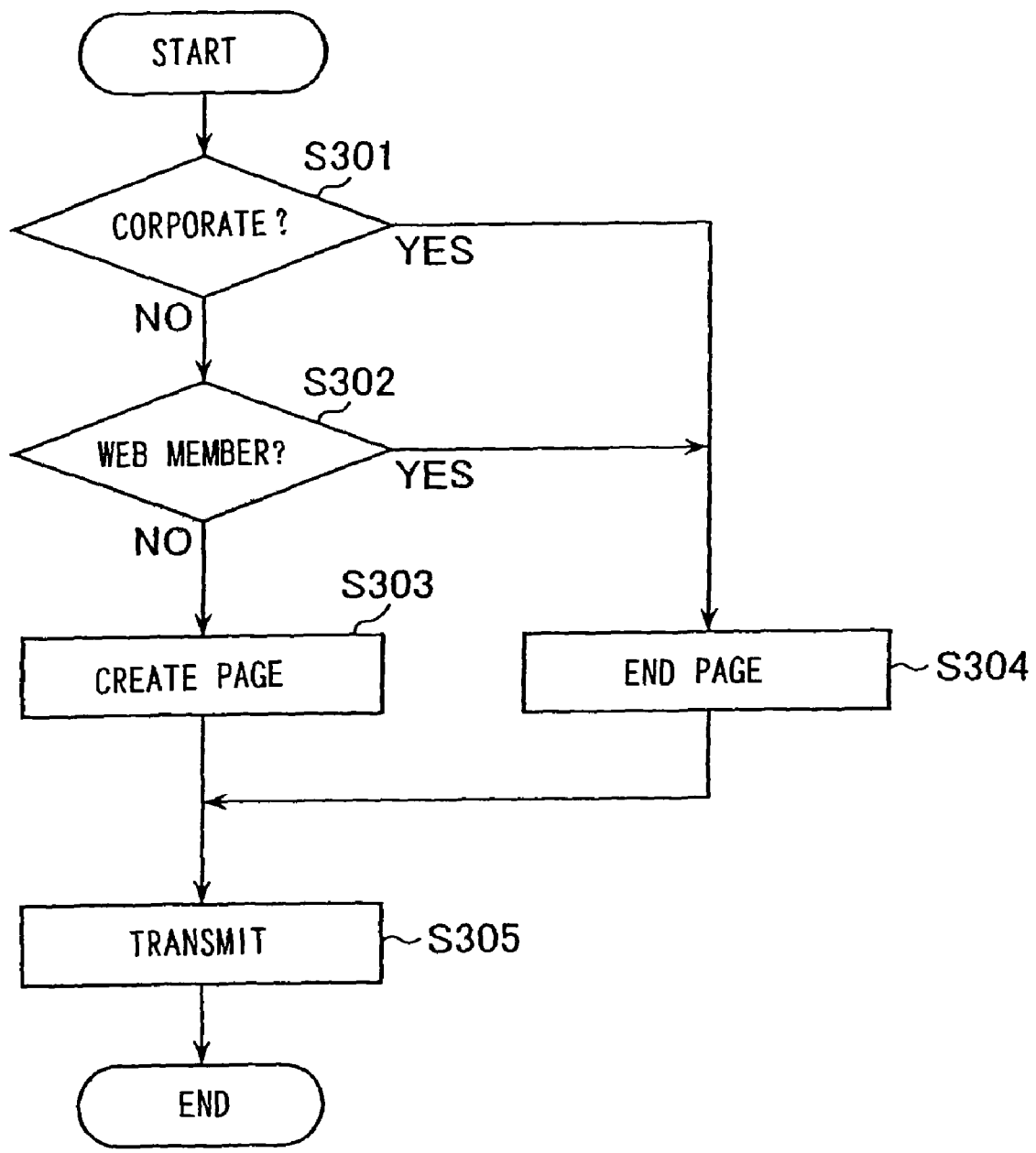
FIG. 14 represents a flow chart explaining how a screen creation for inducing a membership registration is processed.
Figure 15:
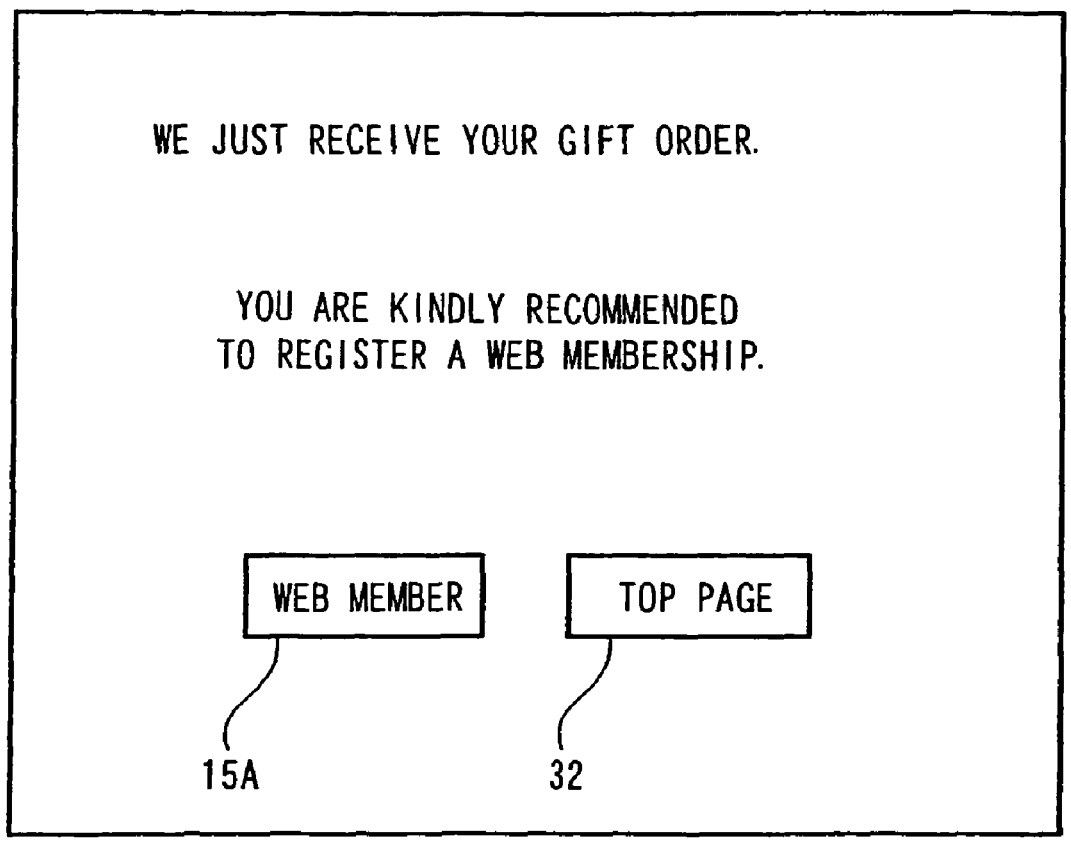
FIG. 15 represents a screen notifying a reception of a gift order and displaying a message to induce a membership registration.

FIG. 14 represents a flow chart explaining how a screen creation of inducing a membership registration is processed. A processing of FIG. 14 starts up at the completion of a customer registration. In step S301, the server judges whether or not a purchase profile is a corporate. The server gives a positive judgment to step S302 in a case of a corporate and proceeds to step S304. In a case of an individual, the server gives a negative judgment to step S301 and proceeds to step S302. In step S302, the server judges whether a service user is a registered member or not. The server gives a positive judgment to step S302 in a case of a registered member and proceeds to step S304. In a case of non-registered member, the server gives a negative judgment to step S302 and proceeds to step S303. Information about whether a registered customer is a member of a web service use or not is sent to the server through a clicked link button at the start of a customer registration. That is, when an "A web user who has not yet registered a membership of a web service use newly records a customer registration" button has been clicked on, a user is assumed to be non-registered member and when an "A web user who has already registered a membership of a web service use newly records a customer registration" button is clicked on, then a user is assumed to be a member. In step S303, the server creates data to display a page screen as shown in FIG. 15. FIG. 15 represents an example of a screen that notifies a gift order receipt indicative of a completion of a customer registration and induces a user to proceed to a page for a membership registration of a web service use. The server prepares data for a page screen and proceeds to step S305. In step S305, the server transmits data to the terminal of the service user and a processing of FIG. 14 is finished. Accordingly, a screen of FIG. 15 is displayed on the monitor of the service user. When a service user clicks on link button 15A to register a membership of a web service use, the server transmits data necessary to display a membership registration screen to the terminal of the service user. A membership registration of a web service use will be explained later. A service user clicks on "Get back to a top page" link button 32, then the server transmits to the terminal of the service user necessary data to display top page 10 of FIG. 3.

The server does not recommend a membership registration of a web service use when proceeding to step S304. The reason is that a corporate is not eligible for a membership of a web service use and a registered member is refrained from registering a multiple membership. In step S304, the server displays a notification of a gift order receipt and also creates date of a page screen indicative of a completion of a customer registration and then proceeds to step S305. Accordingly, a screen indicative of a completion of a customer registration (not shown) is displayed on the monitor of the service user. When the service user clicks on a "Get back to a top page" link button, the server transmits data necessary to display top page 10 of FIG. 3 to the terminal of the service user.

—In a Case where a Member of a Web Service Use Records a Customer Registration—

Figure 16:
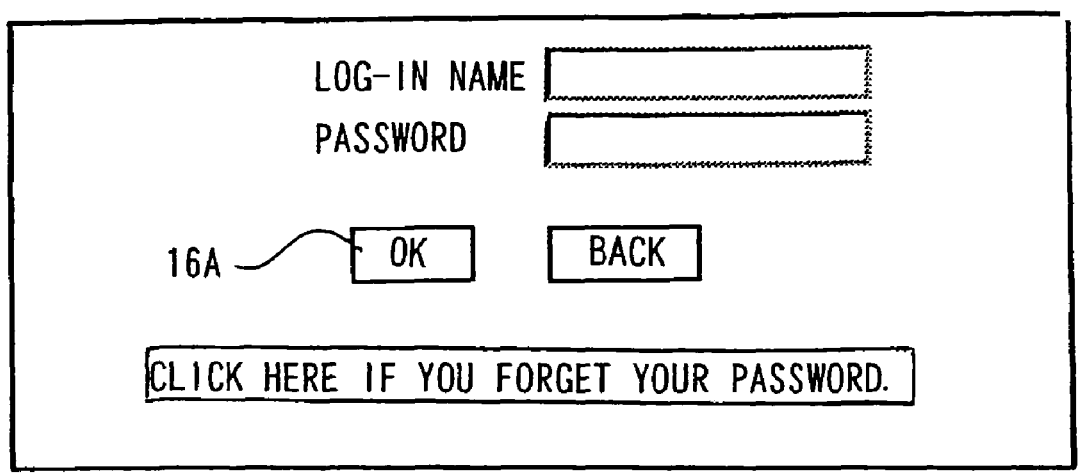
FIG. 16 represents a screen for a membership authentication.
Figure 17:
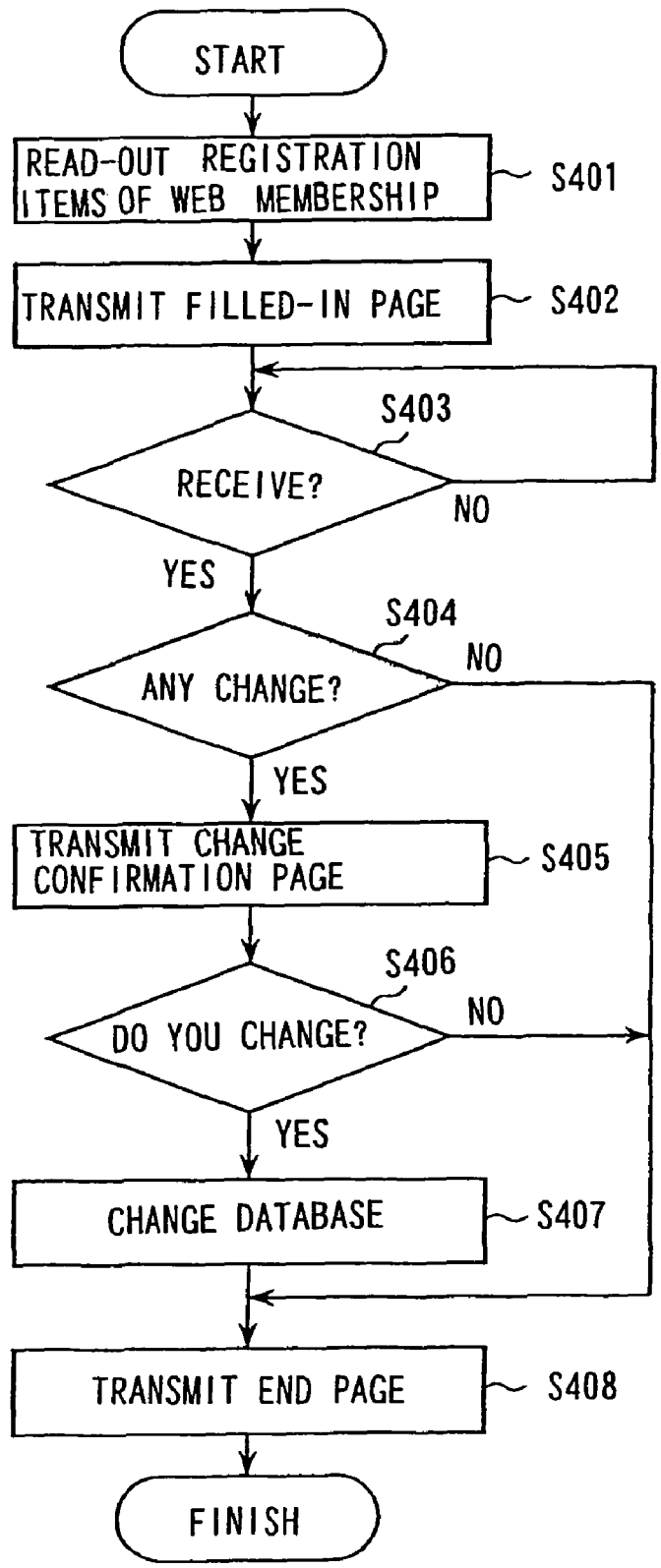
FIG. 17 represents a flow chart explaining how a registration renewal is processed.

In a selection screen for a membership registration corresponding to link button 27, when a service user clicks on a link button (not shown) corresponding to a "A web user who has already registered a membership of a web service use newly records a customer registration" button is clicked on, then the server of the service provider transmits to a terminal of the service user display data and has a screen for a membership authentication of a web service use as shown in FIG. 16 displayed on a monitor of the terminal. The service user enters a registered login name and password and clicks on OK button 16A. Accordingly, the login name and password are transmitted to the server of the service provider. When the transmitted login name and password agree with those recorded onto a database inside the server of the service provider, the server will perform a following processing. With respect to a filed in common with registered information at the registrations of a web membership and customer, the field is overwritten (updated) with latest content if there is a discrepancy between information. FIG. 17 represents a flow chart explaining how a registration content update is processed. A processing of FIG. 17 starts up when the login name and password sent from the service user agree with those stored onto a database.

In judgment, the server reads out item data in common with item data of a customer registration out of data of the registered web membership from a database and proceeds to step S402. In step S402, the server prepares page data to display an input screen for product information as shown in FIG. 6 and transmits it to a terminal. A service user fills in a box on a display screen in accordance with displayed content in the same way as non-member of a web service user records a customer registration. A service user clicks on OK button 6B and then registration data is transmitted to the server of the service provider.

The server of the service provider receives registration data of product information sent from the service user, and then prepares page data to display a screen for updating customer information and transits it to the terminal and proceeds to step S403. Accordingly, the terminal monitor of the service user displays a screen as shown in FIG. 18. In FIG. 18, content at the registration of a web membership is displayed in a box of an item in common with items of a web membership registration and a web customer registration. The service user checks out content displayed on a monitor and may update a necessary item only, if necessary to modify. The service user clicks on OK button 18B after writing modified content and then, modified data is transmitted to the server of the service provider.

In step S403, the server judges whether or not it received modified data. In a case of modified data having been received, the server gives a positive judgment to step S403 and proceeds to step S404, but in a case of modified data having not been received, the server gives a negative judgment to step S403 and repeats a judgment processing. In step S404, the server compares received data with data recorded at the registration of a membership and judges whether or not there is a modified part. The server gives a positive judgment to step S404 when there is a modified part and proceeds to step S405, but in a case where there is no modified part, it gives a negative judgment to step S404 and proceeds to step S408.

In step S405, the server modifies a page screen of FIG. 18 with content in accordance with modified data sent from the service user and creates a page screen (not shown). The server further transmits data of the created page screen with message data something like, for example, "Update with this content?" to the terminal of the service user and proceeds to step S406. In step S406, the server judges whether or not a database is to be modified. When the service user clicks on an OK button (not shown) on the monitor, a modification instruction is transmitted to the server from the terminal. The server gives a positive judgment to step S406 when receiving the modification instruction and proceeds to step S407, but gives a negative judgment to step S406 in a case of the modification instruction being not received and proceeds to step S408.

In step S407, the server overwrites content of a database with modified data and proceeds to step S408. In step S408, the server registers onto a database item data not in common with item data at the registration of a web membership. The server further transmits to the terminal of the service user message data indicative of a completion of a registration and a processing of FIG. 17 is finished. When modified data is blank data, namely, the service user transmits modified data with a blank box, the server does not overwrite a database with blank data. In this case, the server creates message data notifying that content of a modification has not been filled in and transmits it to the server of the service user.

Subsequently, the server transmits display data to the terminal of the service user and has an answer screen for a questionnaire as shown in FIG. 7 displayed on the terminal monitor. As successive flows afterward are the same with those at a registration of a customer by non-registered member of the web service use, an explanation is omitted. But, at the completion of a customer registration, a membership registration of a web service is not recommended. More specifically, in step S302, the server gives a positive judgment since the service user has been already a web member. As a result, what is displayed on the terminal monitor is only a screen (not shown) notifying a completion of a membership registration and there is no recommendation about the membership registration.

—In a Case where a Membership Registration of a Web Service Use is Recorded—

Of seven categories of content registered at a website, each service of pages of on-line album 5, on-line shop 6 and community 7 is provided to a registered member of a web service user. Namely, a service user is required to register a membership in order to use these services of the three categories. Once a membership is registered, the member is permitted to log in for using these three services.

In a selection screen for a membership registration corresponding to link button 27, a service user clicks on a link button (not shown) corresponding to "Register a membership of a web service use", the server of the service provider transmits display data to the terminal of the service user and has a screen (not shown) carrying a code of practice for a membership of the web service use displayed on the terminal monitor. The service user clicks on an OK button (not shown) when agreeing to the code. The server of the service provider receives agreement data sent by the service user, then transmits display data to the terminal of the service user and has an input screen (not shown) for a login name, password and nickname displayed on the terminal monitor. The service user fills in a box on a display screen in accordance with content displayed on the monitor. A login name represents a user name to be registered in order for a service user to use a service. A password is used for authentication. A nickname is required when using a bulletin board included in a community category. When a service user writes a login name, password and nickname through a keyboard of a terminal and then clicks on an OK button (not shown), registered data is transmitted to the server of the service provider. The server of the service provider receives registration data sent from the service user, then transmits display data to the terminal of the service user and has an input screen for the same web membership registration as in FIG. 7 displayed on the terminal monitor. The service user fills in a box on a display screen in accordance with content displayed on the monitor. But, the password is omitted since it was already sent. The service user clicks on OK button 7B at the completion of writing content of the registration, registration data of membership information is transmitted to the server of the service provider.

Accordingly, a message notifying the completion of a web membership registration is displayed on the terminal monitor of the service user.

The foregoing explanation has referred to the case where non-registered customer records a membership registration of a web service use, but a user who already recorded a customer registration may register a web membership. In this case, the server has a screen for customer authentication displayed on the terminal monitor. The service user enters ID and a password registered at a registration of customer information and clicks on OK button 19A. Accordingly, ID and the password are transmitted to the server of the service provider.

The server of the service provider, when the transmitted ID and password agree with those recorded onto a database in the server, performs a following process.

With respect to a field in common with registered information at the registrations of a web membership and a customer, the field is overwritten (updated) with latest content if there is a discrepancy between information.

This process is just the same as, when a web member records a customer registration as explained before, a common field among information recorded at the registrations of a web customer n and a web membership is overwritten with latest content The server of the service provider checks out that ID and a password sent are in agreement with those stored onto a database in the server, and then prepares page data to display a screen for updating same web membership information as that of FIG. 18 and transmits it to the terminal. Accordingly, the monitor of the service user's terminal displays the same page screen as that of FIG. 18 and data at a registration of a customer are displayed in a box of a common filed with that at a registration of a customer. The service user may check out displayed content on the monitor and write only a portion to be modified, if necessary. The service user clicks on OK button 18B at the completion of an overwriting and then modified data is transmitted to the server of the service provider. Accordingly, only information different from that recorded at a registration of a customer is written and the service user can perform a membership registration of the web service use without duplicating the same registration as that performed at a registration of a customer.

—A Case that a Registered Customer (a Registered Member of a Web Service) Will Modify Content of a Registration—

Figure 19:
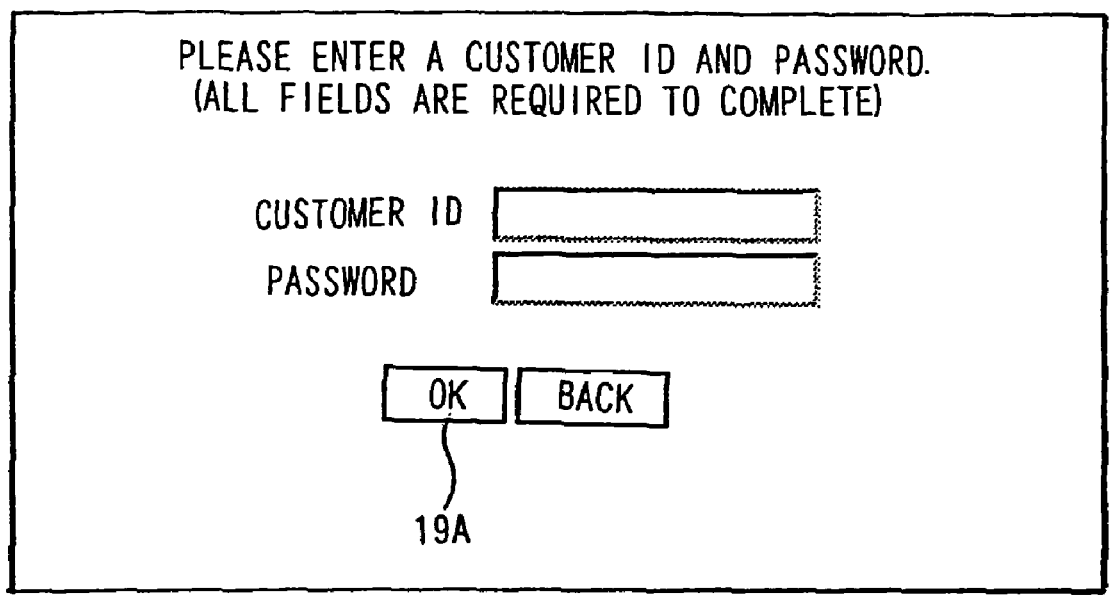
FIG. 19 represents a screen for a customer authentication.

In a selection screen for a member registration corresponding to link button 27, the service user clicks on a link button (not shown) corresponding to a "registered customer (a registered member of a web service) will modify content of a registration" and then the server of the service provider transmits display data to the terminal of the service user and has an authentication screen for a customer member as shown in FIG. 19 displayed on the terminal monitor. When a registered member of a web service will modify content of a registration, a screen for web member authentication as shown in FIG. 16 is displayed on the monitor of the terminal. A service user as a registered customer enters a password and ID registered at a registration of a customer and clicks on OK button 19A. Accordingly, ID and a password are transmitted to the server of the service provider. When a service user with a web registered membership enters a password and login name registered at a registration of a membership and clicks on OK button 16A. Then, the login name and password are transmitted to the server of the service provider.

When the server of the service provider checks out that a transmitted ID and password are in agreement with those registered onto a database in the server, the server prepares page data to display a screen for a customer information update and transmits it to the terminal. Also, when the server of the service provider checks out that a transmitted login name and password are in agreement with those registered onto a database in the server, the server prepares page data to display a screen for a web member information update and transmits it to the terminal. Accordingly, the same page screen as that of FIG. 18 is displayed on the monitor of the service user's terminal. In FIG. 18, data at the registration is displayed in a box of a field. The service user checks out displayed content on the monitor and may overwrite a modification only. When the service user overwrites the modification and clicks on OK button 18B, modified data is transmitted to the server of the service provider. Processes thereafter are just the same as those in steps thereafter step S403 of FIG. 17, so an explanation will be omitted. Namely, the server of the service provider overwrites and modifies data only with modified data transmitted from the service user out of registered data recorded on a database.

In the foregoing membership registration, a case where a service user registers a single password for a customer registration and a web membership registration so as to make the password valid for a web customer service and a member service has been explained. On the contrary, the service user may register different passwords password for a customer registration and a web membership registration. In this case, a customer registration is performed independently from a web membership registration.

Namely, even when there is a filed in common with a customer registration and a web membership registration, field data registered for one registration is not used for another registration.

When a purchaser performs an on-line customer registration onto the server of the service provider from the purchaser's terminal, the service provider awards an incentive of extending a merchandise warranty period in comparison to a case of a customer registration by a postcard.

An extension of a merchandise warranty period is available only when merchandise is purchased at an on-line shop (will be explained later) and a customer registration of merchandise is performed on-line.

Figure 20:
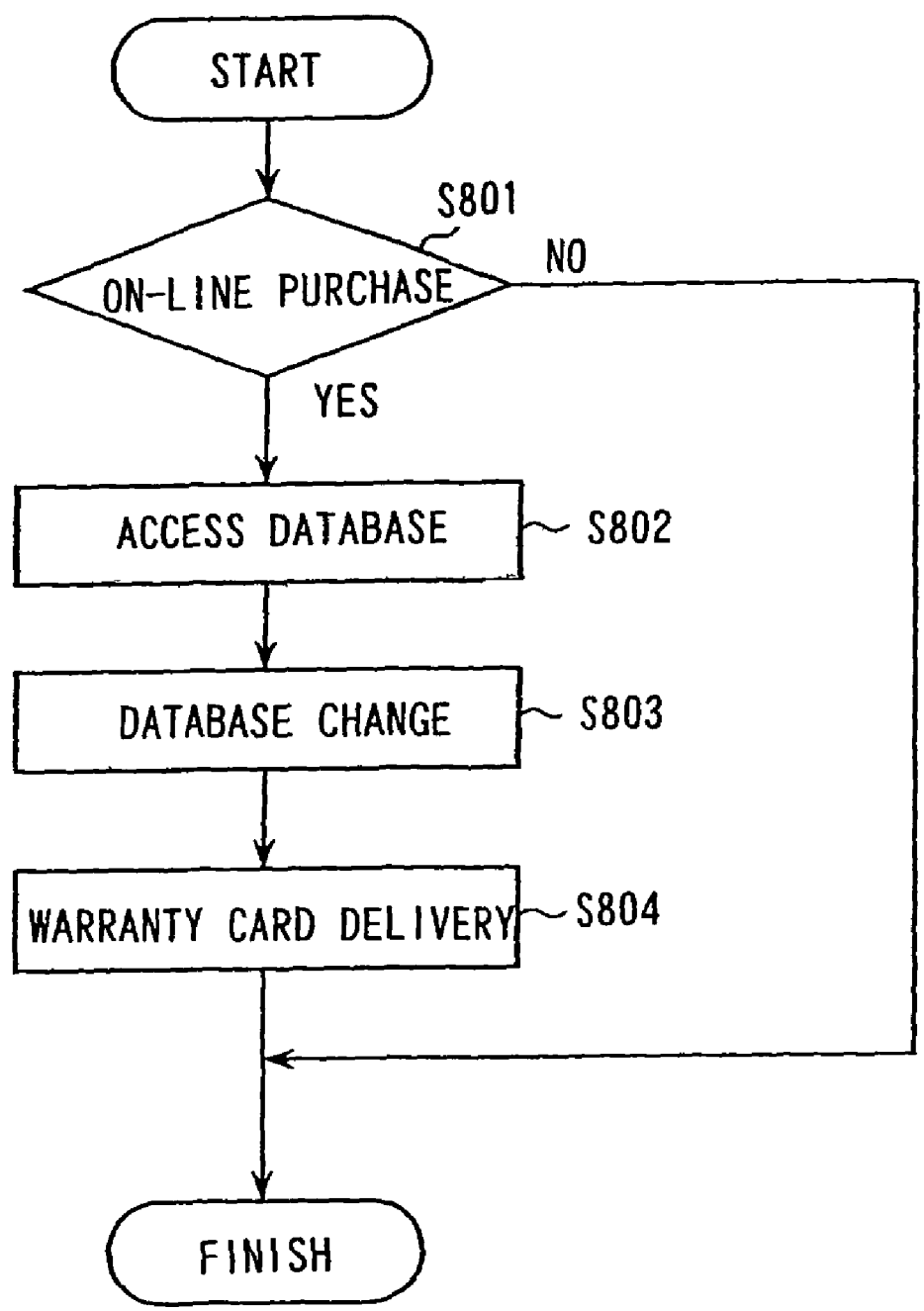
FIG. 20 represents a flow chart explaining how an extension of a warranty period is processed.

FIG. 20 represents a flow chart explaining how an extension of a warranty period is processed by the server of the service provider. A process of FIG. 20 starts up at the completion of a customer registration. In step S801, the server judges from registered data of a customer registration whether or not the merchandise was purchased through an on-line shop. The server, when the merchandise was purchased through an on-line shop, gives a positive judgment to step S801 and proceeds to step S802. In a case where the merchandise was not purchased through an on-line shop, the server gives a negative judgment to step S801 and a process of FIG. 20 is finished. In this case, an extension of a warranty period is not performed.

In step S802, the server accesses a given database related to customer information and reads out support information such as a warranty period of the merchandise and then proceeds to step S803. In step S803, of read-out support information, the server extends a warranty period to, for example, a six-month period and then modifies data in the database. The server proceeds to step S804, modifying the database. In step S804, the server performs a process that enables a new warranty card with an extended warranty period to be mailed out and a process of FIG. 20 is finished.

As an incentive for an on-line customer registration of a web service use, a case of extending a warranty period has been explained, but, for example, a point usable in a web service may be given.

In accordance with a member registration via content of the embodiment of this invention as explained so far, a following effect will be obtained.

(1) In a screen to select a gift (FIGS. 10(*a*) and (*b*)), let gift image 10A act as a link button and when a service user clicks on image 9A, let a page screen introducing the gift (FIG. 12) in detail be further displayed. Therefore, a service user can obtain detailed information about this gift without taking the trouble to search a page screen introducing the gift.

(2) A point usable in a web service as a gift is prepared. Because of this point, an incentive can be offered to a service user for inducing the user to utilize a web service after registering a customer registration.

(3) A password at a registration of customer information and a password at a registration of a membership of a web service use are made usable as a common password. As a result, when compared to the multiple uses of a plurality of passwords, an input error of a password by a service user becomes reduced and then a workload of a service user can be cut down.

(4) With respect to a common field in information registered at a registration of a web membership and at a registration of a customer, the common field is overwritten (updated) with latest content if there is a discrepancy between contents. Thus, registered data of the same service user can be managed in a unified way. And as blank data is not able to overwrite, previous or proceeding information is not lost.

(5) Questions of each questionnaire corresponding to all the merchandise are prepared and these questions are managed in such a way that a question in common with a plurality of merchandise can be distinguished from a question peculiar to certain merchandise. The server selects a question corresponding to registered merchandise name and transmits the question to a terminal of a service user. In accordance with this management, even when a service user registers a plurality of merchandise, a same question is not sent and on top of that, a service user can ask a question as to a plurality of merchandise on a single questionnaire input screen.

(6) Successively a service user is induced to a membership registration after the completion of a customer registration, so a number of a web membership can be gained in comparison to no induction to a membership registration. As a result, a number of a web service user can be increased.

(7) When a customer purchasing merchandise performs an on-line customer registration onto the server from a terminal, a service provider extends a merchandise warranty period. Therefore, as compared to a registration by a postcard and the like, an on-line registration with a less workload on a service provider has an effect that urges a purchaser to perform the on-line registration.

In the foregoing explanation, as a gift to a person who has completed a customer registration, not only a hard product such as a flyer and neck strap but also a soft product, that is, a point usable in a web service are prepared. In place of a point, in an album printout service to be later explained, a memory size and valid period of an album data storage area that a service provider provides to a service user may be preferably larger and longer than in a normal occasion.

—On-Line Shop—

Figure 21:
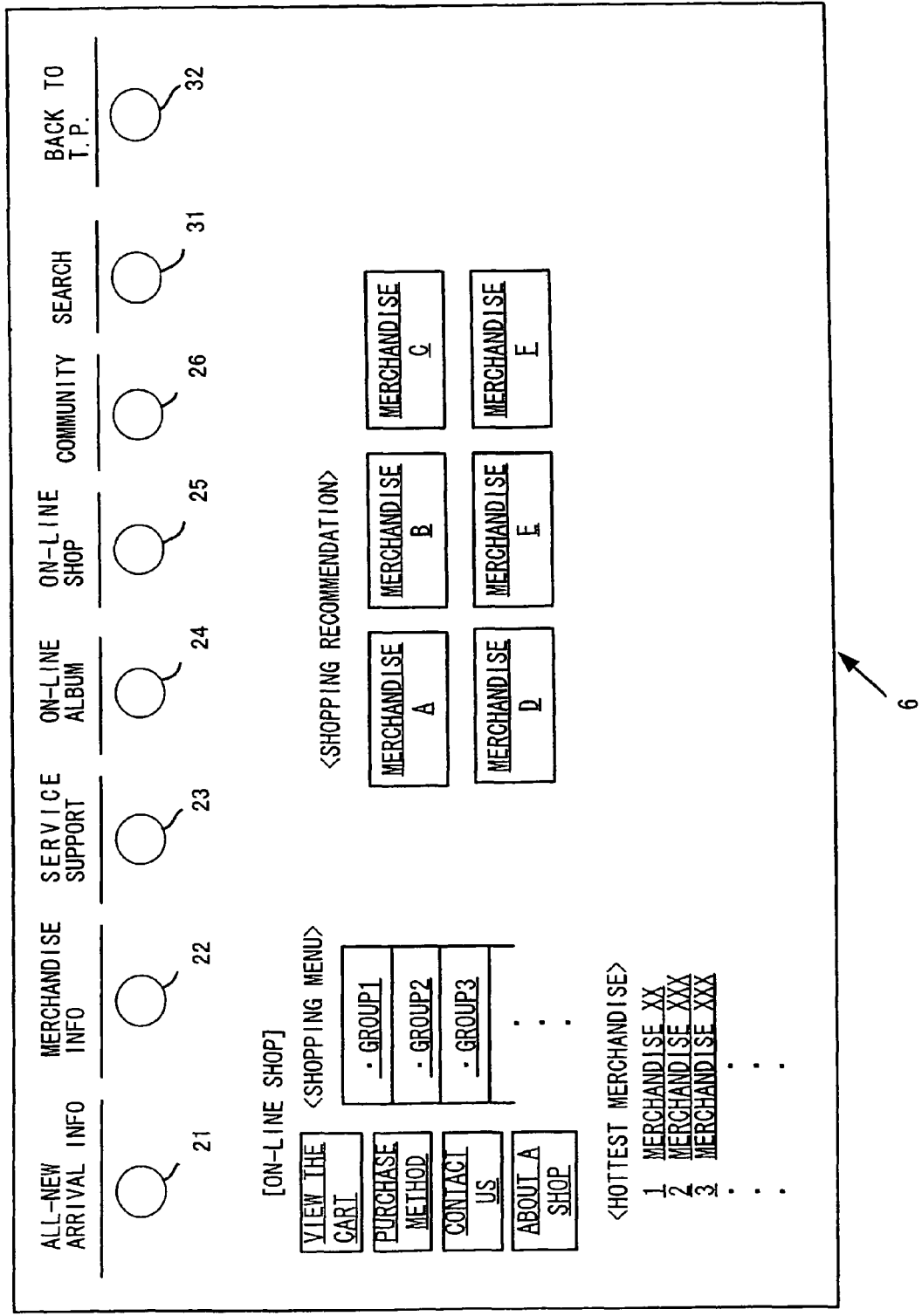
FIG. 21 represents a top page screen of an on-line shop category.

A category of on-line shop 6 will be explained. An on-line shop is also called an electronic shop. A web service user clicks on "on-line shop" link button 25 on a screen of top page 10 as shown in FIG. 3 and then, a top page screen of an on-line shop category as shown in FIG. 21 is displayed on a monitor of the terminal. A service use of on-line shop 6 becomes available after a service user having completed a membership registration of a web service use logs in by entering a login name and password.

In FIG. 21, recommended merchandise A~F are introduced with an image (not shown) and explanation (not shown) respectively. In each display position of merchandise A F, information about each link is embedded and when any of an image or letter of "Merchandise A" "Merchandise F" is clicked on by use of a pointing device (not shown), a page screen explaining this merchandise in detail further appears. Like this, a location where information about each link is embedded is indicated by drawing an underline. As a shop menu, merchandise group 1, merchandise group 2, merchandise group 3 and so on by a classification are displayed. Merchandise group 1 is such as a film camera, merchandise group 2 as an accessory for a single reflex camera. In this case, when an underlined letter "Merchandise group 1" is clicked on, a page screen introducing a film camera in detail further appears. When an underlined letter "Merchandise group 2" is clicked on, a page screen introducing an accessory for a single reflex camera in detail also appears. A hot-selling rank is for introducing hot-selling merchandise at an on-line shop with its sales rank such as $1^{st}$, $2^{nd}$ and so on. This ranking display or merchandise name is also embedded with link information. Therefore, an underlined rank or letter is clicked on, and a page screen explaining the merchandise in detail further appears. At an upper part of a screen of FIG. 21, as with a top page of other category, a link button to jump to another category different from a current category is provided.

A flow of purchasing merchandise at an on-line shop is:

1. A purchaser logs in an on-line shop of a service provider,
2. The purchaser selects merchandise from a shop menu,
3. The purchaser checks out what is all about the merchandise through a page screen introducing it in detail,
4. The purchaser puts the merchandise into a virtual shopping cart,
5. The purchaser checks out a total amount, away of payment and a delivery location of the merchandise,
6. The purchase places an order,
7. A service provider performs a settlement process and
8. The service provider delivers the merchandise.

According to an on-line shopping service of this invention, a service provider provides a following service to a service user. In an explanation of an on-line shop, a web service user is referred to as a purchaser thereafter. An actual shop operation may be performed by a service provider or outsourced to a third party.

—Providing an Image of an Accessory being Attached to Merchandise—

A purchaser can check out a state of an accessory being attached to merchandise, for example, an image of an accessory being attached to a camera body. A service provider prepares a polygon image of a camera body and other polygon image of each accessory such as an interchangeable lens and a speed light respectively. These polygon images are configured in such a way that images of a camera body and each accessory meet an actual size proportion of each of merchandise. Thus, when these images of a camera body and an accessory are processed to create an image of a camera body being attached with an accessory, the created image looks like a camera body is actually attached with an interchangeable lens or a speed light. A composite image that combines an image of a camera body with an image of an accessory can be rotated or moved around on a display screen as a unified image. These polygon images are stored in advance onto a given database in a server of a service provider.

A purchaser clicks on a link button (not shown) corresponding to "confirm a state of an accessory being attached to a body" on a screen of a purchaser's terminal (not shown), and the server of the service provider transmits display data to the purchaser's terminal and has an item selection screen as shown in FIG. 22 displayed on a monitor of the terminal. In FIG. 22, the purchaser fills in a box of a display screen in accordance with displayed content when an item selection screen is viewed on the monitor. As shown in FIG. 22, a box with a downward triangle is provided with a pull-down menu and a purchaser selects an item from the pull-down menu. An example of FIG. 22 represents a screen that an interchangeable lens to be loaded to camera body F00 is being selected.

Figure 23:
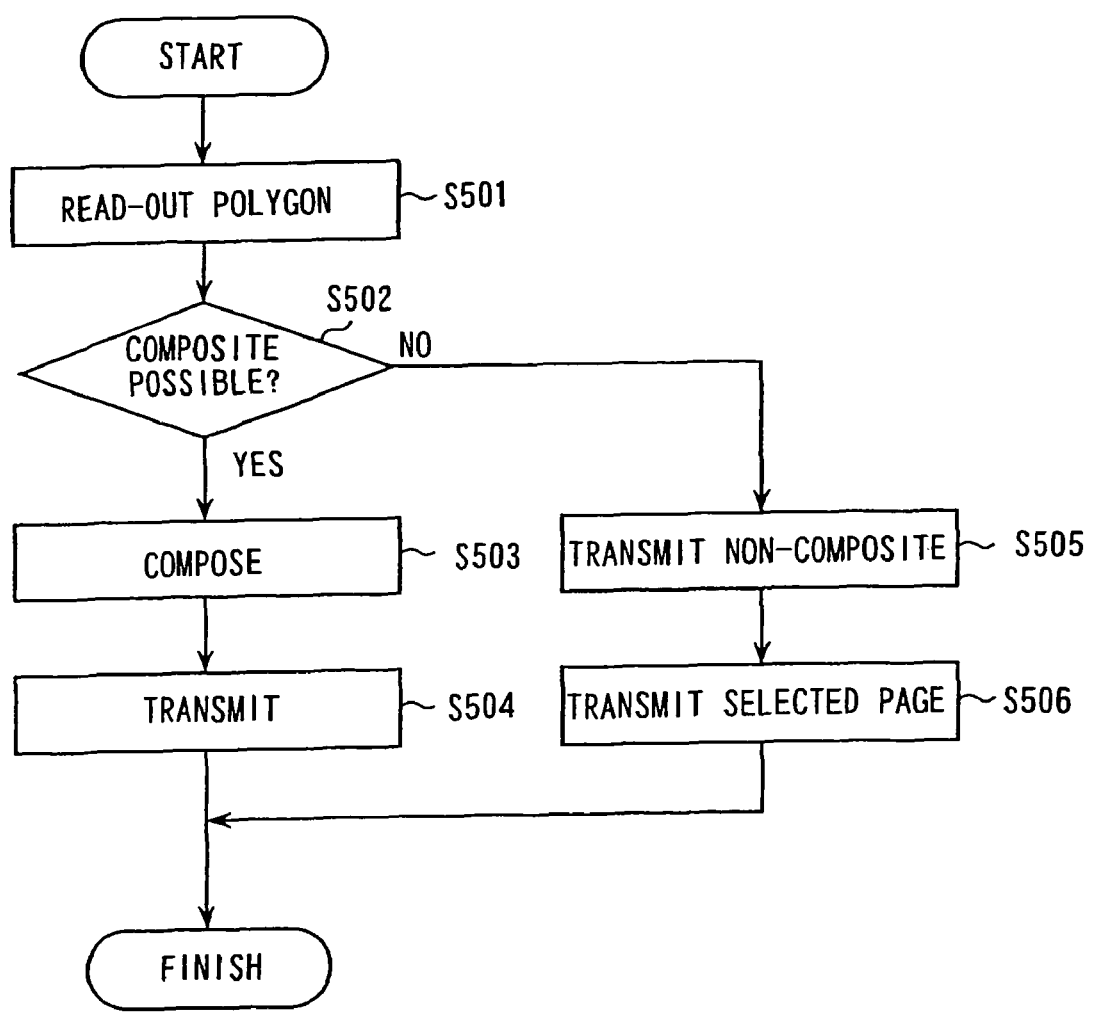
FIG. 23 represents a flowchart explaining how a polygon image is processed.

The purchaser clicks on OK button 22B, and data of the selected item is transmitted to the server of the service provider. FIG. 23 represents a flow chart explaining how a polygon image is processed. A process of FIG. 23 starts up when the server receives data of the selected item. In step S501, the server reads out a polygon image corresponding to the selected item and information accompanying the polygon image from a database and proceeds to step S502. In step S502, the server judges whether or not an image of the selected item is capable of being combined. More correctly, "be capable of being combined" means that it is possible to attach an accessory to a camera body by way of an image. The server gives a positive judgment to step S502 when the image is capable of being combined and proceeds to step S503, but proceeds to step S505 after giving a negative judgment to step S502 when it is not.

Figure 24:
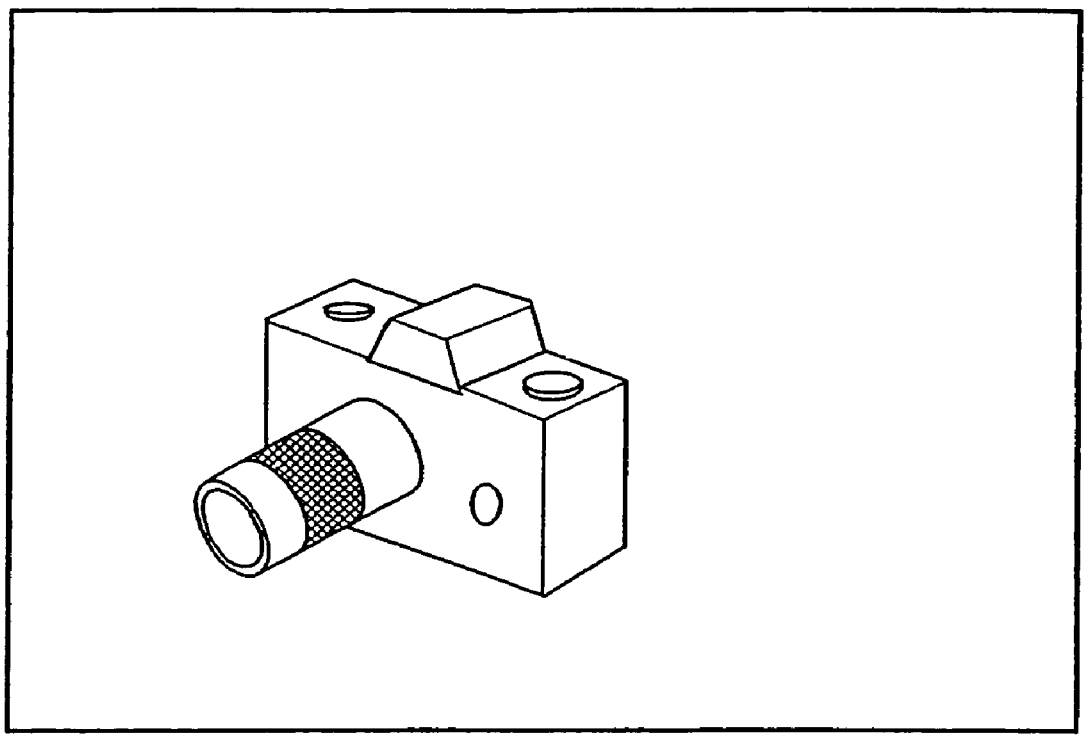
FIG. 24 represents a composite image of a camera body and an interchangeable lens.

In step S503, the server combines the selected images together and proceeds to step S504. A combined image represents a look of an accessory being actually attached. That is, in a case of a selected item being an interchangeable lens, a composite image, just like a lens mount of a camera body is fit with a lens mount of an interchangeable lens, is created and the single-integrated product image as shown in FIG. 24 is obtained.

In step S504, the server transmits data of the composite polygon image (FIG. 24) to the terminal of the purchaser and a process of FIG. 23 is finished. The purchaser can command any angled view of the composite image on a display screen of FIG. 24 by rotating the image.

In step S505, the server transmits to the terminal of the purchaser data of a message that notifies an image of a selected item is not capable to be combined and proceeds to step S506. In step S506, the server transmits display data to the terminal of the purchaser and a process of FIG. 23 is finished. Accordingly, the item selection screen as shown in FIG. 22 is displayed again on the terminal of the purchaser and the purchaser is urged to reconsider a selection of an item.

—Propose Another Recommended Merchandise Depending Upon a Purchaser Own Merchandise—

A purchaser can receive a proposal of new merchandise depending upon purchaser own merchandise. A service provider prepares a merchandise recommendation every merchandise. For example, an interchangeable lens aaa, a speed light bbb, a battery pack ccc and a case ddd in relation to a camera body are prepared and they are given priority order. Data of this recommended merchandise is stored beforehand onto a given database in the server of the service provider.

Figure 25:
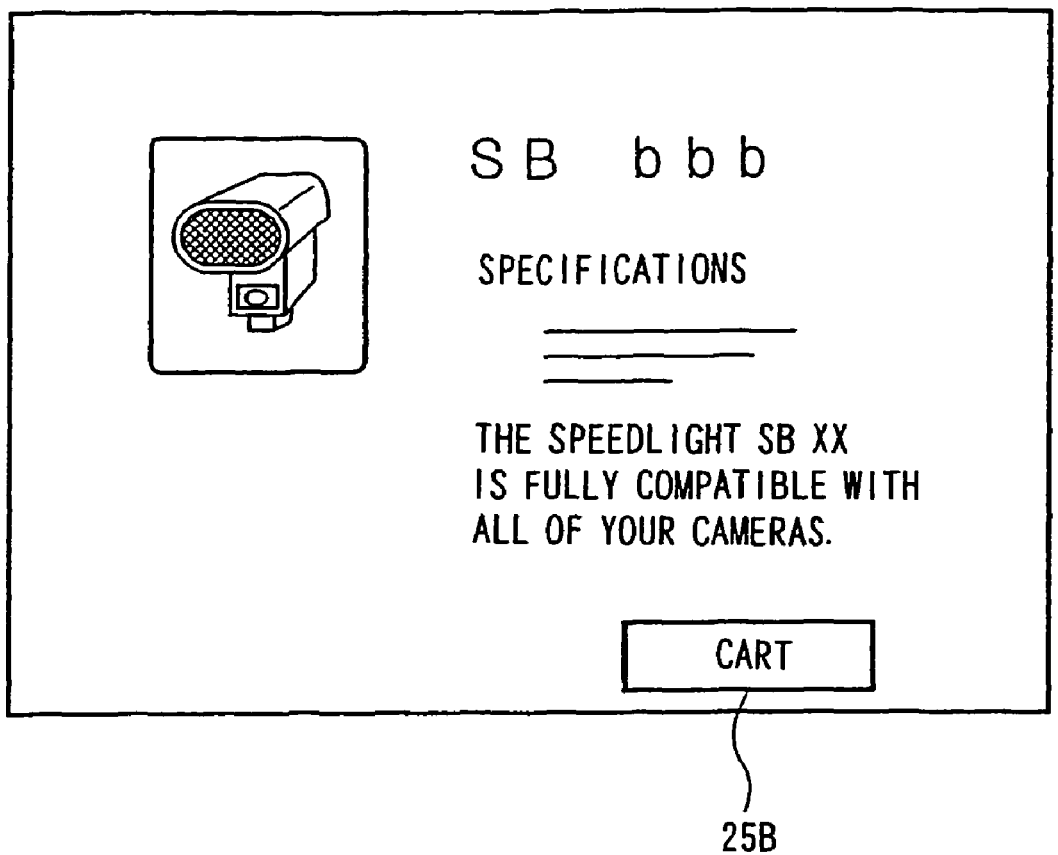
FIG. 25 represents an introduction screen of a recommendation product.

In a screen (not shown) on the terminal of the purchaser, the purchaser clicks on a link button (not shown) corresponding to "Check out recommended merchandise", and then the server of the service provider transmits display data to the server of the purchaser and has an introduction screen of recommended merchandise as represented in FIG. 25 displayed on a monitor of the terminal.

FIG. 25 represents an example of a screen that introduces an image, a specification and purchase merit of speed light bbb. When the purchaser purchases recommended merchandise, the purchaser clicks on button 25B "Put into a shopping cart", data of informing a purchase will is transmitted to the server of the service provider.

Figure 26:
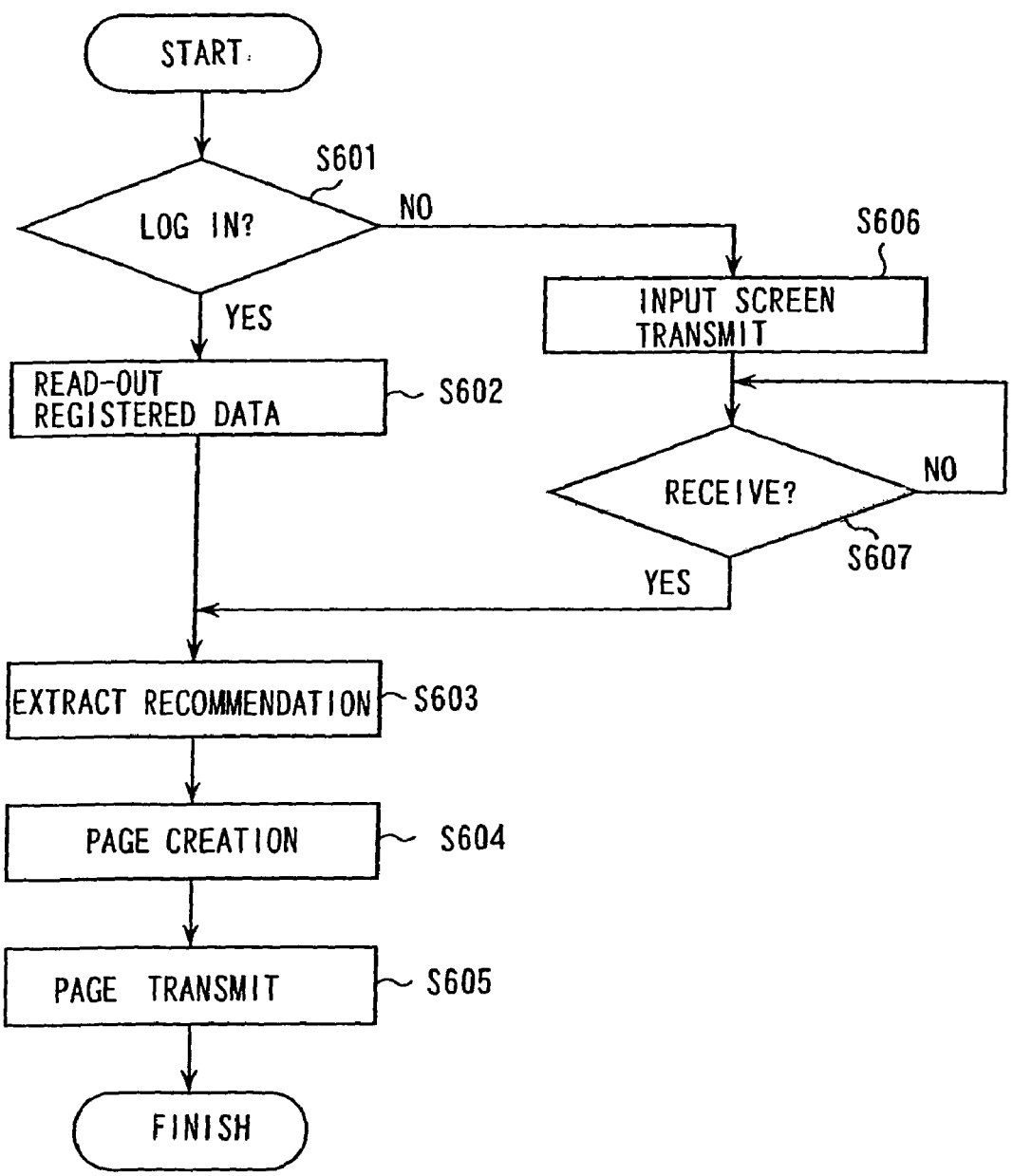
FIG. 26 represents a flowchart explaining how a proposal of a recommendation product is processed.

FIG. 26 represents a flow chart explaining how a recommended merchandise proposal is processed by the server of the service provider. A process of FIG. 26 starts up when a "Check out recommended merchandise" button (not shown) on a terminal of a purchaser is clicked on. In step S601, the server judges whether or not a purchaser logs in the server. When the server is logged in, the server gives a positive judgment to step SS601 and proceeds to step S602, but when the server is not logged in, the server gives a negative judgment to step S601 and proceeds to step S606.

In step S602, the server accesses a database storing information about a customer registration of the login purchaser and reads out model information such as a camera and the like that the purchaser already bought and has owned from registered data and proceeds to step S603. In step S603, the server extracts recommended merchandise from read-out model information and proceeds to step S604. For example, in the event that the purchaser owns a camera, an extraction of recommended merchandise is performed in priority order from interchangeable lens aaa, speed light bbb, battery pack ccc and camera case ddd dedicated for the camera body. For instance, priority order is set as follows;

1. Interchangeable lens aaa
2. Speed light bbb
3. Battery pack ccc
4. Camera case ddd In a case where the purchaser does not have interchangeable lens aaa, the lens is extracted. When the purchaser has interchangeable lens aaa and speed light bbb, battery pack ccc is extracted. Information about a model that the login purchaser owns may be registered as an additional registration freely through a page screen of a customer information update other than at a customer registration.

In step S604, the server creates page data necessary to display a screen of FIG. 25 introducing the extracted recommended merchandise and proceeds to step S605. In step S605, the server transmits created page data to the terminal of the purchaser and a process of FIG. 26 is finished.

In step S606, the server transmits display data to the terminal of the purchaser and has a same input screen for an owned model as one in FIG. 22 displayed on the monitor of the terminal. In FIG. 22, the purchaser enters an owned model, accessories and so into a box on a display screen in accordance with displayed content. The purchaser clicks on OK button 22B, and data of the owned model is transmitted to the server of the service provider.

In step S607, the server judges whether or not the server receives data of the owned model and when data is received, the server gives a positive judgment to step S607 and proceeds to step S603, but if not received, a process of a judgment is repeated.

—Propose Other Recommended Merchandise Depending Upon Merchandise that a Purchaser Puts into a Shopping Cart—

A purchaser can receive a proposal of new merchandise depending upon merchandise in a shopping cart. As explained in the foregoing, the service provider prepares recommended merchandise and stores recommended merchandise onto a database by setting priority order.

Figure 27:
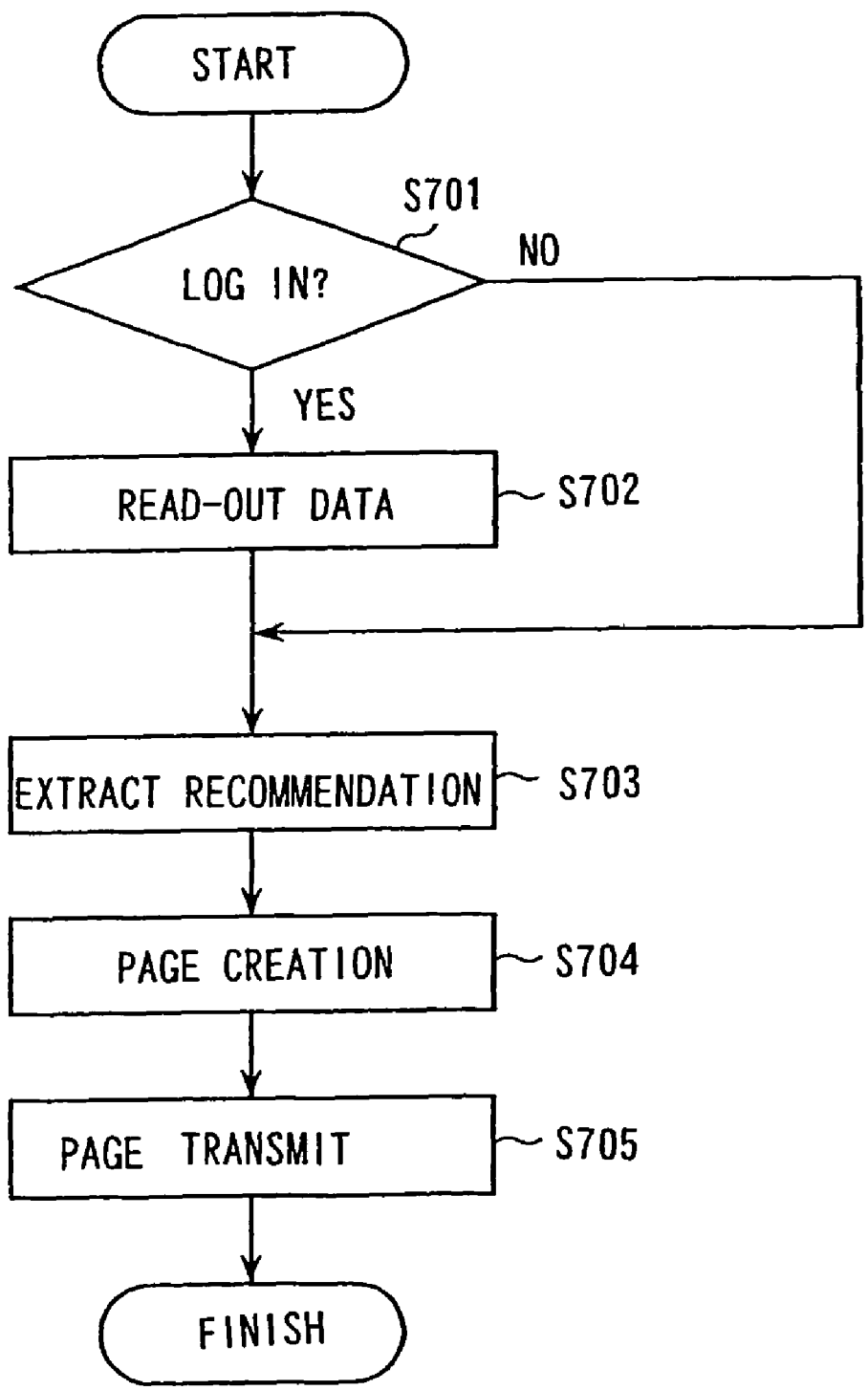
FIG. 27 represents a flowchart explaining how a proposal of a recommendation product is processed.

FIG. 27 represents a flow chart explaining how a recommended merchandise proposal is processed.

A process of FIG. 27 starts up when a "Put merchandise into a shopping cart" button (not shown) is clicked on. In step S701, the server judges whether or not a purchaser logs in. When logged in, the server gives a positive judgment to step S701 and proceeds to step S702, but if not logged in, the server gives a negative judgment to step S701 and proceeds to step S703.

In step S702, the server accesses a database storing information about a web membership registration of the purchaser and reads out model information about a camera and so that the purchaser already bought and has owned and then proceeds to step S703. The server extracts recommended merchandise based upon merchandise put into a shopping cart and information about a model that the purchaser owns and then proceeds to step S704. An extraction of recommended merchandise, for example, when the purchaser has already owned a camera and speed light bbb is put into a shopping cart, interchangeable lens aaa dedicated for a camera is extracted. If the server gives a negative judgment to step S701 (not logged in), the server extracts recommended merchandise from merchandise in a shopping cart and proceeds to step S704.

In step S704, the server creates page data necessary to display a screen of FIG. 25 introducing the extracted recommended merchandise and proceeds to step S705. In step S705, the server transmits created page data for a display to the terminal of the purchaser and a process of FIG. 27 is finished.

—Virtual Stock Management—

The service provider manages merchandise stock by a relative figure, not an absolute figure. A stock is reduced in proportion to a number of merchandise the purchaser puts into a shopping cart and increased in proportion to a number of merchandise the purchaser removes from a shopping cart. In an on-lined shopping service, as a lot of purchasers access at a time, a stock of merchandise varies moment to moment. Therefore, the service provider manages a stock (referred to as a virtual stock therein after) with a stock varying in real time and relative increase/decrease of a stock with reference to a beginning absolute stock.

Figure 28:
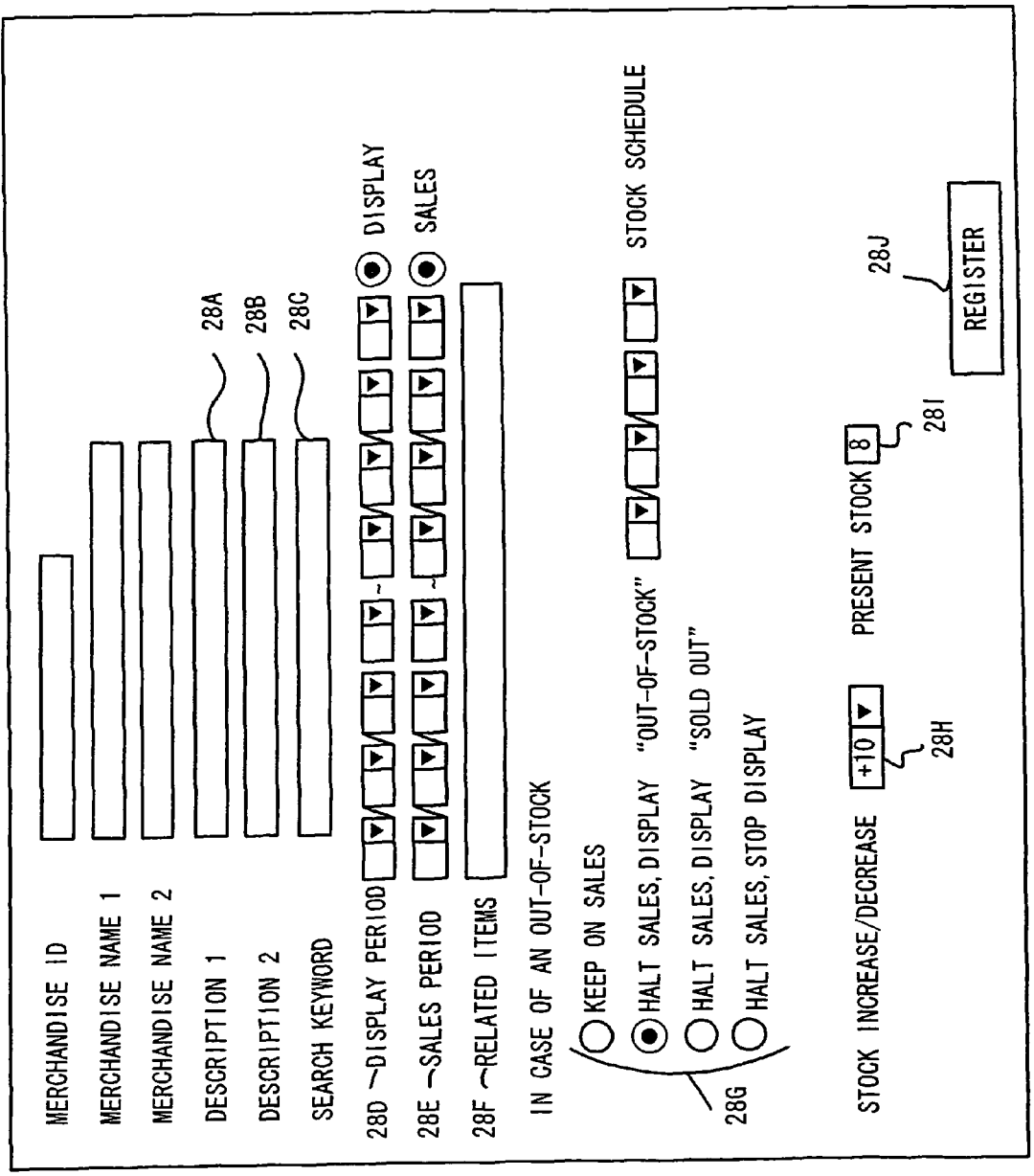
FIG. 28 represents a management screen for commodities information.

FIG. 28 represents an example of a management page screen for use in managing merchandise information.

A management page screen for each of merchandise available for an on-line shopping service is prepared.

Wrapped merchandise and letter (name)-engraved merchandise are given another ID different from that of standard merchandise and managed as different merchandise although they are same merchandise.

A manager predetermined by the service provider performs a given operation to the server, and the server transmits data of a management page screen to a terminal of the manager and has a management page screen of FIG. 28 displayed on the terminal of the manager. Referring to FIG. 28, a general outline of the merchandise is written in box 28A of explanation 1 and the merchandise is explained in detail in box 28B of explanation 2. A keyword to the merchandise is written in box 28C of a search keyword. For example, when the merchandise is a speed light, unit, a flash, a speed light, an illumination and the like are written. Regarding a keyword, any word besides those written at explanations 1 and 2 may be better. The reason is that in a search function to be explained later, on top of a keyword, even words written in boxes of explanations 1 and 2 are referred to.

In box 28D of a carrying period, a period of time to display the merchandise on a page screen of an on-line shopping is written. A carrying means that the merchandise is displayed in a shop menu or as recommended merchandise on a page screen of an on-line shopping as shown in FIG. 21. The server carries the merchandise on an on-line shop for a period specified in box 28D of a carrying period.

When the manager removes a checkmark at the right side in box 28D of a carrying period not to carry, a carrying of the merchandise on an on-line shop page is halted even during a carrying period. That is, a display in a shop menu or as recommended merchandise is halted. In box 28E of an order-taking period, a period of time to take an order for the merchandise on an on-line shop is specified. The server takes an order for the merchandise for a specified period. In the event that the manager removes a checkmark displayed at the right side in box 28E of an order-taking period, an order taking of the merchandise is halted even during a specified period.

In box 28F of relevant merchandise, merchandise ID of another merchandise relevant to the merchandise is specified. A writing of merchandise ID of recommended merchandise in box 28F of relevant merchandise allows the recommended merchandise specified in box 28F to be proposed when a purchaser puts the merchandise into a shopping cart. Column 28G has checkmarks specifying what the server should perform at a time when the merchandise is out of stock. An example of FIG. 28 shows that a checkmark to display an out-of-stock status and halt a sale is ticked. In this case, when the merchandise is out of stock, an out-of-stock display is carried around the merchandise on a page screen of a shop menu or recommended merchandise. Then, when a scheduled available date is written in column 28G, the scheduled available date is displayed on a page screen.

In box 28H of increase/decrease in a stock, a relative increase/decrease in a stock with reference to the beginning stock is written. The manager types +10 when 10 pieces are added to a beginning stock and −5 when 5 pieces are reduced. Therefore, the numeral figure written in box 28H allows the manager to see how many pieces are increased or decreased to a beginning stock. In box 28I of a present stock, a stock is displayed in real time when a purchaser puts merchandise into a shopping cart. A virtual stock manages a stock with increase/decrease in a stock and a present stock.

When the manager clicks on registration button 28J, registration data is transmitted to the server from a terminal of the manager. The server receives registration data, and then modifies a database and the modified database is reflected on a page of an on-line shop. Accordingly, the manager can modify content in each box except for a stock in box 28I of the present stock.

—Notify when a Virtual Stock is Below a Given Number—

The server transmits a mail to the manager for a warning when a present stock of merchandise is below a given number. Further, the server, in a case where the present stock is 0 or—when a purchaser puts the merchandise into a shopping cart, notifies the purchaser that there is no stock.

Figure 29:
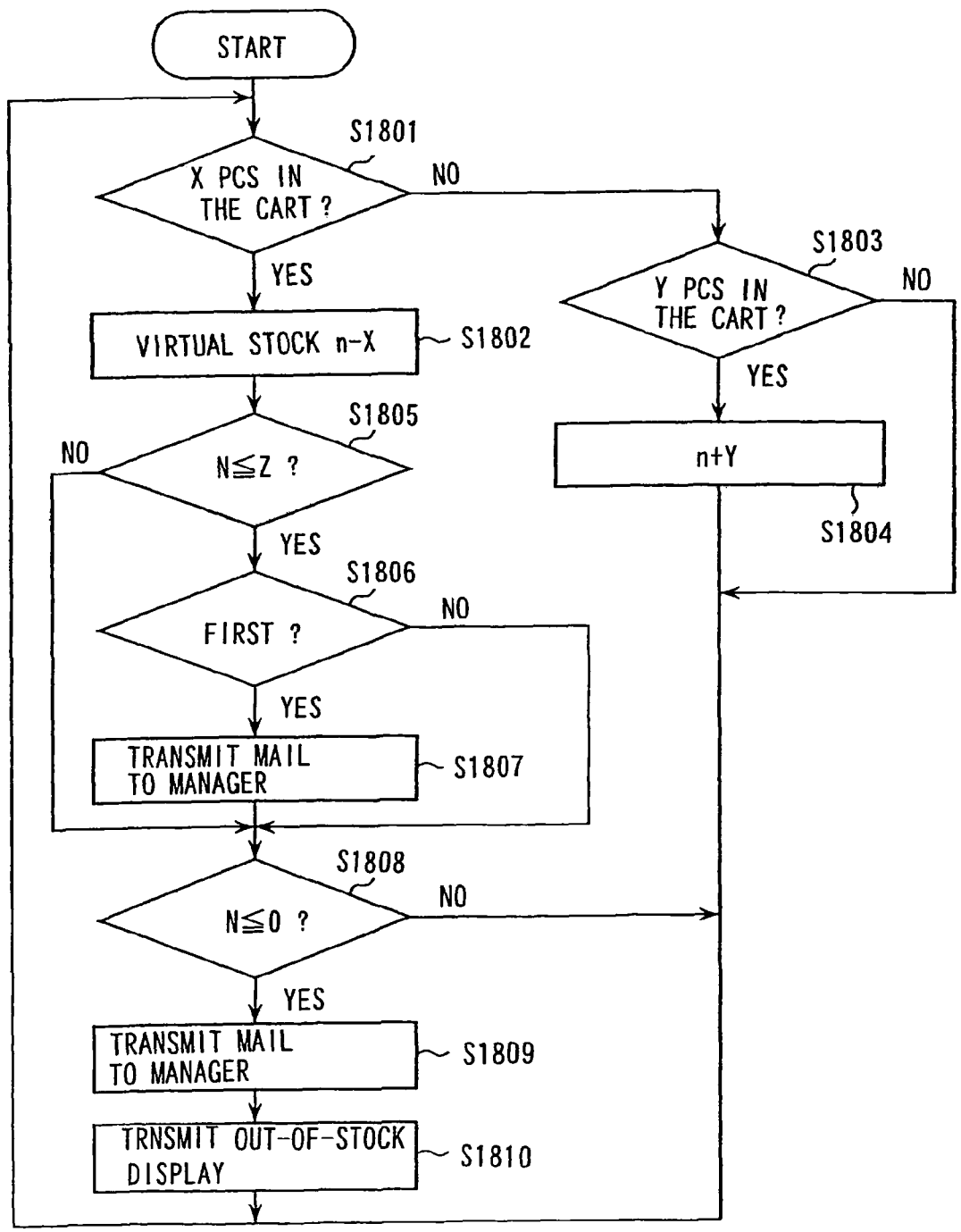
FIG. 29 represents a flow chart explaining an inventory process.

FIG. 29 represents a flow chart explaining how stock information is processed by the server of the service provider. A process of FIG. 29 is executed any time while an on-line shop service is available. In step S1801, the server judges whether or not X piece (X is an integer than 1) of merchandise A is put into a shopping cart. The server gives a positive judgment to step S1801 when merchandise A is in a cart and proceeds to step S1802, but when merchandise A is not, the server gives a negative judgment to step S1801 and proceeds to step S1803.

In step S1802, the server proceeds to step S1805 assuming that a present stock n of a virtual stock of merchandise A is n=n−X. In step S1805, the server judges whether or not the stock level n is below given number Z. Z is the number that is assumed to be out of stock and it is set per each of merchandise (merchandise ID). The server gives a positive judgment to step S1805 in case of n≦Z and proceeds to step S1806, but in case of n>Z, the server gives a negative judgment to step S1805 and proceeds to step S1808.

In step S1806, the server judges whether or not a positive judgment made in step S1805 is a first judgment counted from a specified time. A specified time is, for instance, 12 o'clock in the morning or a time when a virtual stock is increased or decreased. The server gives a positive judgment to step S1806 when the judgment is a first one and proceeds to step S1807, but when it is not the first, the server gives a negative judgment to step S1806 and proceeds to step S1808. In step S1807, the server transmits to the manager a mail notifying a virtual stock manager a low stock and proceeds to step S1808. Accordingly, only when stock n becomes below given number Z for the first time since a specified time, the mail notifying a decreased stock is sent to the manager.

In step S1808, the server judges whether or not a present stock n of a virtual stock is below 0. The server gives a positive judgment to step S1808 in case of n≦0 and proceeds to step S1809, but in case of n>0, the server gives a negative judgment to step S1808 and gets back to step S1801.

In step S1809, the server transmits to a virtual stock manager a mail notifying that a virtual stock becomes zero and proceeds to step S1810. Accordingly, every time a stock n becomes below 0, the mail notifying an out-of-stock is sent to the manager. In step S1810, the server transmits display data to a terminal of a purchaser putting merchandise A into a shopping cart and has a message notifying an out-of-stock displayed on a monitor of the purchaser's terminal. The server transmits display data to the terminal of the purchaser and then gets back to step S1801.

In step S1803 proceeding from step S1801 where the negative judgment was made, the server judges whether or not Y piece (Y is an integer than 1) of merchandise A is removed from a shopping cart. The server gives a positive judgment to step S1803 when merchandise A is removed from a cart, but when merchandise A is not removed from a cart, the server gives a negative judgment to step S1803 and gets back to step S1801. In step S1804, the server gets back to step S1801 assuming that a present stock n of merchandise A is n=n+Y. The present stock n of the virtual stock calculated by the foregoing process explained in FIG. 29 works with displayed content of a management screen for the manager of FIG. 28. Namely, A figure of n is displayed in box 28I of the present stock in FIG. 28. An example of FIG. 28 halts a sale when the present stock becomes 0, but what the checkmark of column 28G is removed at a sales halt is displayed on a page screen. In this case, when the sale is resumed due to increase in stock n, the checkmark of column 28G is ticked at an original location.

—Exclude Sold-Out Merchandise from a Searching Target—

Based upon a status of a check mark of column 28G of FIG. 28, the server performs a following operation at an out-of-stock occasion.

a. Continue a sale even though a stock n becomes below 0.
b. Display an out-of-stock when a stock n becomes below 0 and the sale is halted until a stock is refilled
c. Display a sold-out when a stock n becomes below 0 and the sale is halted thereafter.
d. Delete a display of merchandise when a stock n becomes below 0 and the sale is halted thereafter.

What is continued to be sold even when a stock n becomes below 0 is merchandise of which a production quantity is amply secured and a stable supply is possible. What displays a sold-out and halts a sale until an empty stock is refilled when a stock n becomes below 0 is merchandise of which a production quantity to an order is low and a supply takes some time. What displays a sold-out and halts a sale from then on when a stock n becomes below 0 is merchandise with a limited production quantity. What deletes a merchandise display and halts a sale from then on when a stock n becomes below 0 is discontinued merchandise. A classification of these merchandise a~d is made for each merchandise (merchandise ID) on a management screen as shown in FIG. 28 by the manager.

Figure 30:
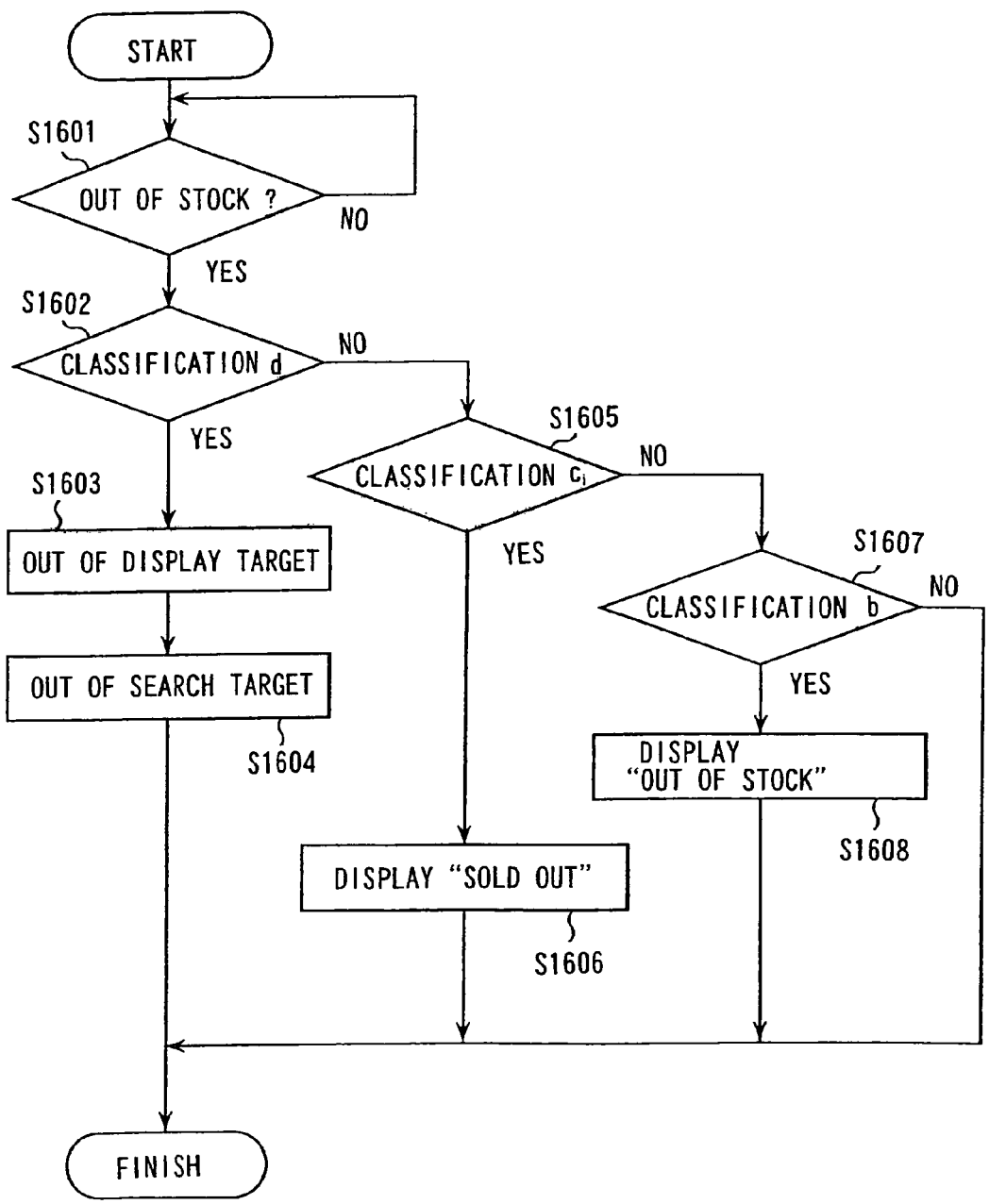
FIG. 30 represents a flow chart explaining how a display of an out-of-stock is processed.

The server changes a display of merchandise subject to any of the classifications a d on an on-line shop as follows. FIG. 30 represents a flow chart explaining how a changeover of a display of merchandise is processed by the server of the service provider.

A process of FIG. 30 is executed any time while an on-line shop service is available. In step S1601, the server judges whether or not a virtual stock is n≦0. When the stock is n≦0, the server gives a positive judgment to step S1601 and proceeds to step S1602, but when the stock is n>0, the server gives a negative judgment to step S1601 and a judgment process is repeated. In step S1602, the server accesses a database and judges whether or not merchandise of which a stock n becomes below 0 is classified into d. The server, when it is classified into d, gives a positive judgment to step S1602 and proceeds to step S1603, but when it's not classified into d, the server gives a negative judgment to step S1602 and proceeds to step S1605.

In step S1603, the server excludes this merchandise from a display target and proceeds to step S1604. Accordingly, a carrying of this merchandise, that is, a display of this merchandise on an on-line shop screen is halted. In step S1604, the server excludes this merchandise from a search target and a process of FIG. 30 is finished. Thus, this merchandise is excluded from a target of an on-line shop search process. In step S1605, the server judges whether or not merchandise of which a stock n becomes 0 is classified into c. The server gives a positive judgment to step S1605 when merchandise is classified into c, but when it's not classified into c, the server gives a negative judgment to step S1605 and proceeds to step S1607.

In step S1606, the server instructs to display a sold-out and a process of FIG. 30 is finished. Accordingly, a sold-out display is carried somewhere around this merchandise on a page screen of a shop menu or recommended merchandise. Even if a sold-out display is carried, let this merchandise be a target of an on-line shop search process. In step S1607, the server judges whether or not merchandise of which a stock n becomes 0 is classified into b and when it is classified into b, the server gives a positive judgment to step S1607 and proceeds to step S1608. In step S1608, the server instructs to display an out-of-stock of this merchandise and a process of FIG. 30 is finished. Accordingly, an out-of-stock display is carried somewhere around this merchandise on a page screen of a shop menu or recommended merchandise.

Even if an out-of-stock display is carried, let this merchandise be a target of an on-line shop search process. On the other hand, when merchandise of which a stock n becomes 0 is not classified into b, the server gives a negative judgment to step S1607 and a process of FIG. 30 is finished. In this case, as merchandise with 0 of a stock n is classified into a, an out-of-stock display is not carried even when this merchandise is out of stock. And, let this merchandise be a target of an on-line shop search process.

According to the foregoing explanation, only when merchandise classified into d becomes out of stock, this merchandise is excluded from a target of a non-line shop search process (step S1604). But, when merchandise classified into c becomes out of stock, this merchandise may be also excluded from a target of an on-line shop search process. In this case, the server may proceed to step S1604 after a process of step S1606 is finished.

—Delivery to a Purchaser a Purchased Item and a Purchaser's Winning Prize in a Lottery—

Figure 31:
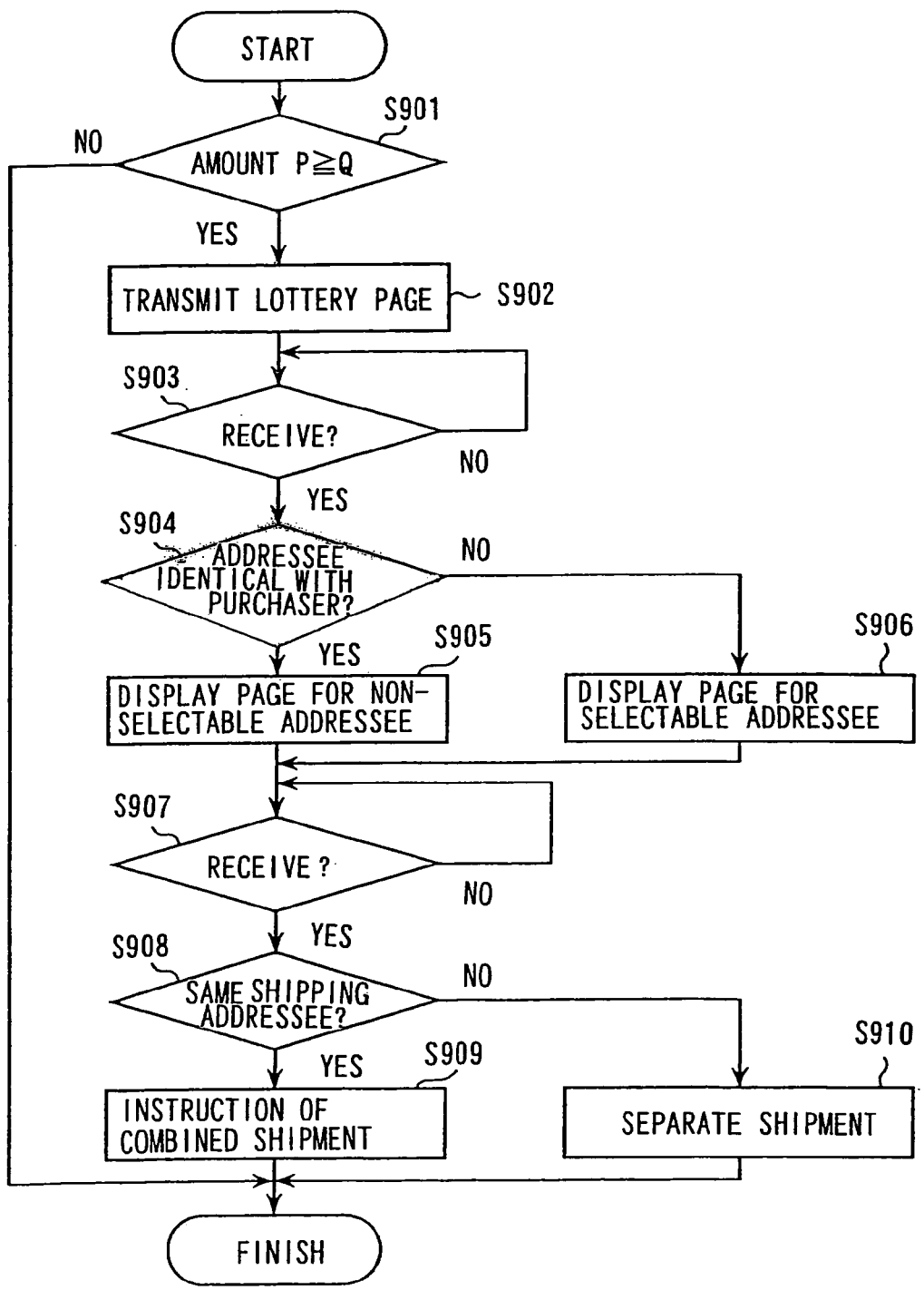
FIG. 31 represents a flow chart explaining how a delivery instruction is processed.

The service provider makes a lottery available for purchasers who shop merchandise at an on-line shop and delivers to a winner purchased merchandise enclosing a winning prize. FIG. 31 represents a flow chart explaining how merchandise delivery instruction is processed by the server of the service provider. A process of FIG. 31 starts up when a purchase process of an on-line shop is finished. In step S901, the server judges whether or not a purchase amount P of merchandise is over a given amount Q. The server gives a positive judgment to step S901 when P≧Q is established and proceeds to step S902, but when P<Q is established, the server gives a negative judgment to step S901 and a process of FIG. 31 is finished. Here, an opportunity of drawing a lottery is available to a purchaser whose purchase amount P is over Q.

In step S902, the server transmits display data to a terminal of a purchaser and has a lottery page screen as shown in FIG. 32(a) displayed on a monitor of the terminal. In FIG. 32(a), a lottery page screen displayed on the monitor of the terminal allows the purchaser to draw a lottery in accordance with displayed content. The purchase clicks on a handle attached to a lottery machine displayed on the screen, and then data saying that a lottery gets started is transmitted to the server of the service provider. In step S903, the server judges whether or not data of a lottery start is received. The server gives a positive judgment to step S903 when data is received and proceeds to step S904, performing a given lottery process. The server repeats a judgment process when data of a lottery start is not received yet.

In step S904, the server judges whether or not an address of the purchaser and a delivery location of purchased merchandise are identical. The address of the purchaser and the delivery location of purchased merchandise have been entered during a purchase process of an on-line shop. The server gives a positive judgment to step S904 when the address of the purchaser and the delivery location of purchased merchandise are identical and proceeds to step S905, but when they are not identical, the server gives a negative judgment to step S904 and proceeds to step S906.

In step S906, the server transmits display data to a terminal of the purchaser and proceeds to step S907. Thus, a page screen as shown in FIG. 32(b) is displayed on a monitor of the terminal. FIG. 32(b) represents that a camera is won as a red ball comes out and further a button to select a prize delivery location is displayed. The purchaser selects a prize delivery location from a merchandise delivery address (merchandise delivery location), an address of the purchaser or others by clicking on any of selection buttons. When the purchaser clicks on any of the selection buttons, data indicative of information about a selected delivery address is transmitted to the server from the terminal of the purchaser.

In step S905, the server transmits display data to the terminal of the purchaser and proceeds to step S907. In this case, as a merchandise delivery address is the same as that of the purchaser, a prize delivery address is also assumed to be an address of the purchaser. Thus, a page screen (not shown) omitting the selection button of the delivery address from a page screen of FIG. 32(b) is displayed on a monitor of the purchaser's terminal. More specifically, as a red ball comes out, a message that a camera is won is notified only. The purchaser clicks on a confirmation button (not shown), and data indicative of information about the address of the purchaser is transmitted to the server from the terminal of the purchaser.

In step S907, the server judges whether or not data of information about a delivery address is received. The server gives a positive judgment to step S907 when data is received and proceeds to step S908, but when data is not received yet, the server repeats a judgment process. In step S908, the server judges whether or not a delivery address of purchased merchandise is the same as that of the prize. The server gives a positive judgment to step S908 when the delivery address is the same and proceeds to step S909, but when the address is not the same, the server gives a negative judgment to step S908 and proceeds to step S910.

Figure 33:
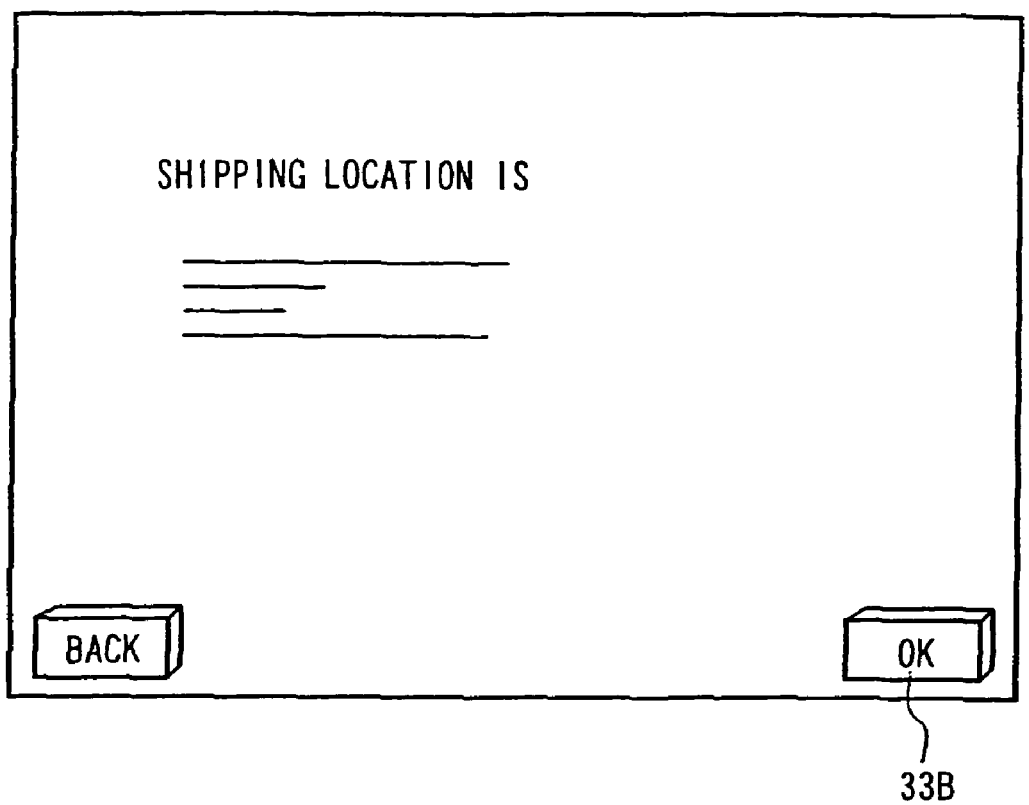
FIG. 33 represents a confirmation screen of a delivery location of a winning gift.

In step S909, the server transmits display data to the terminal of the purchaser and has a delivery address confirmation screen of the prize shown in FIG. 33 displayed on the terminal. The purchaser clicks on OK button 33B, and the server performs a process to enable purchased merchandise and the prize to be combined and delivered to the purchaser and a process of FIG. 31 is finished. In step S910, the server transmits display data to the terminal of the purchaser and has the delivery address confirmation screen of the prize shown in FIG. 33 displayed on the terminal. The purchaser clicks on OK button 33B, and the server performs a process to enable purchased merchandise and the prize to be separately packaged and delivered to each address and a process of FIG. 33 is finished.

—When a Part of Purchased Merchandise is in Waiting for Supply, all the Purchased Merchandise after the Waiting Part is Supplied are Combined and Delivered—

Figure 34:
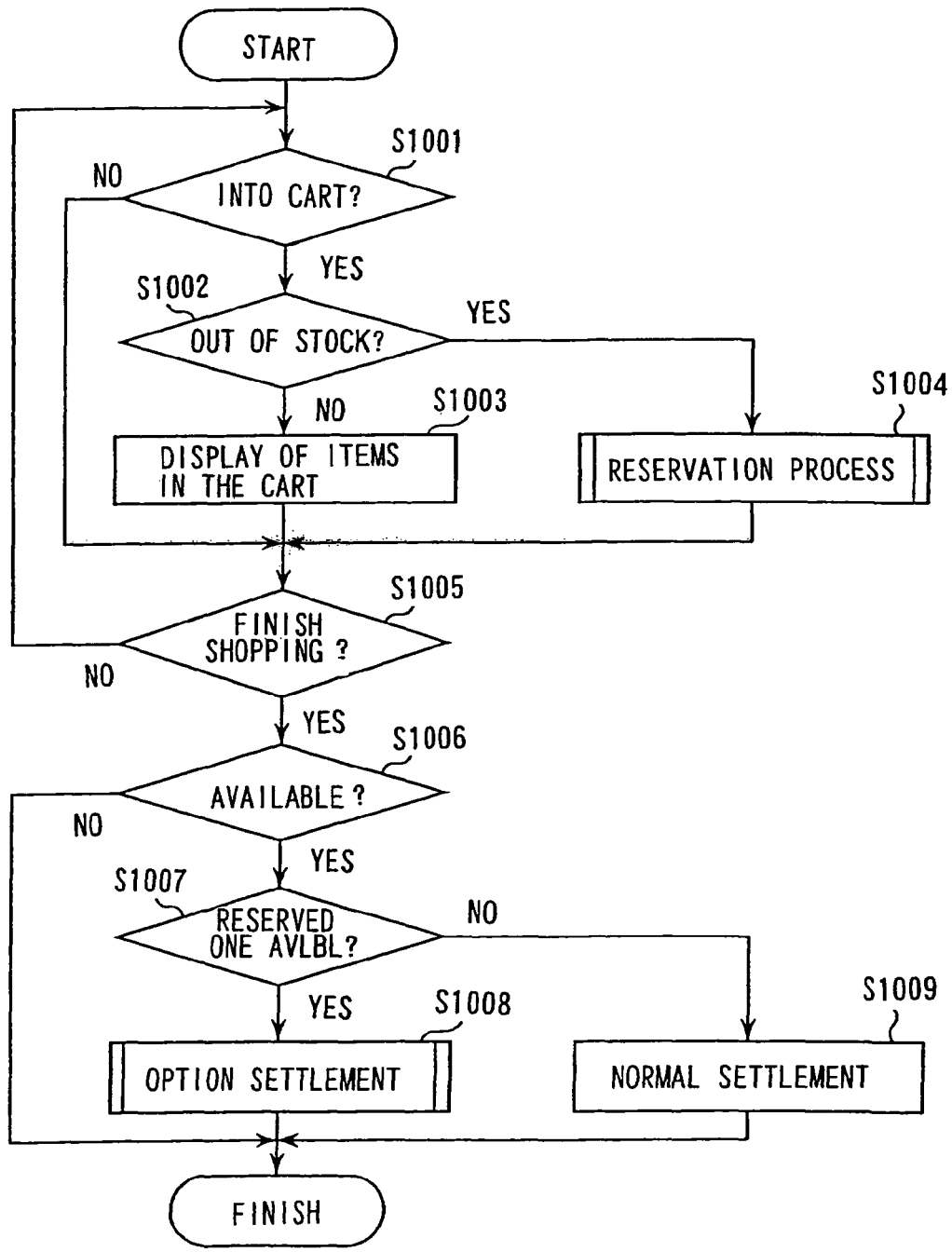
FIG. 34 represents a flow chart explaining how a delivery instruction is processed.

FIG. 34 represents a flow chart explaining how a merchandise delivery instruction is processed by the server of the service provider. A process of FIG. 34 starts up when the purchaser logs in an on-line shop page via the terminal. In step S1001, the server judges whether or not an instruction to put merchandise into a shopping cart is transmitted from the terminal. This instruction is transmitted when the purchaser clicks on a "put into a shopping cart" button (not shown) on a screen displayed on the terminal. The server gives a positive judgment to step S1001 when the server receives data indicative of the instruction to put into a cart and proceeds to step S1002, but when data indicative of the instruction to put into a cart is not received yet, the server gives a negative judgment to step S1001 and proceeds to step S1005.

In step S1002, the server judges whether or not merchandise instructed to be put into a cart is out of stock. The server gives a positive judgment to step S1002 when it is out of stock and proceeds to step S1004, but when it is not out of stock, the server gives a negative judgment to step S1002 and proceeds to step S1003. In step S1003, the server transmits display data to the terminal of the purchaser who instructs to put merchandise into a cart and has a page screen (not shown) representing that merchandise is put into a cart displayed on a monitor of the purchaser's terminal. The server transmits display data and proceeds to step S1005.

In step S1004, the server performs a reservation process for out-of-stock merchandise and proceeds to step S1005. The reservation process will be explained later.

In step S1005, the server judges whether or not an instruction to finish a shopping is transmitted from the terminal of the purchaser. This instruction is transmitted by clicking on a "finish a shopping" button (not shown) viewed on a monitor of the terminal of the purchaser. The server receives data indicative of the instruction of a shopping finish and gives a positive judgment to step S1005 and proceeds to step S1006, but when data is not received yet, the server gives a negative judgment to step S1005 and gets back to step S1001.

In step S1006, the server judges whether or not merchandise is in a shopping cart. The server gives a positive judgment to step S1006 when merchandise is in the cart and proceeds to step S1007, but when merchandise is not in, the server gives a negative judgment to step S1006 and a process of FIG. 34 is finished. In step S1007, the server judges whether or not there is reserved merchandise among merchandise put into the shopping cart. The server gives a positive judgment to step S1007 when there is reserved merchandise and proceeds to step S1008, but when reserved merchandise is not there, the server gives a negative judgment to step S1007 and proceeds to step s1009.

In step S1008, the server performs a settlement process called as an option settlement and a process of FIG. 34 is finished. In step S1009, the server performs a settlement process called as a normal settlement and a process of FIG. 34 is finished. The normal settlement process and option settlement process will be explained later.

Figure 35:
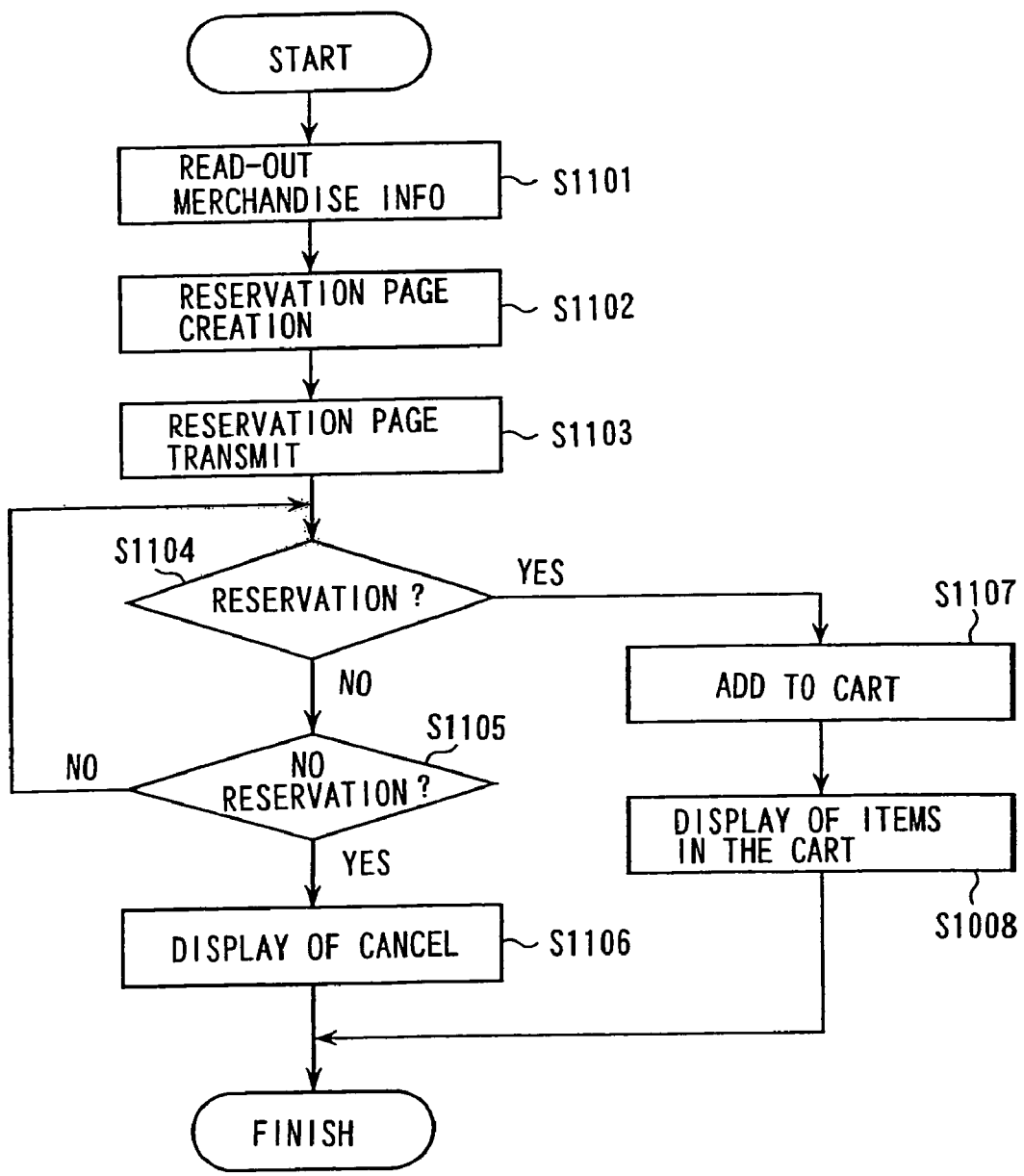
FIG. 35 represents a flow chart explaining how a reservation is processed.

The foregoing reservation process will be explained. FIG. 35 represents a flow chart explaining how a reservation is processed by the server of the service provider. A process of FIG. 35 starts up when the server gives a positive judgment in step S1004 of FIG. 34. In step S1101 of FIG. 35, the server accesses a database and reads out merchandise information about out-of-stock merchandise and proceeds to step S1102, gaining information about a scheduled supply data of this merchandise. In step S1102, the server creates display data for a reservation page screen to be explained later and proceeds to step S1103. In step S1103, the server transmits page data for a display to the terminal of the purchaser and proceeds to step S1104. Thus, the reservation screen as shown in FIG. 36 is displayed on a monitor of the purchaser's terminal. In FIG. 36, the scheduled supply data of this merchandise is displayed.

The purchaser clicks on reservation button 36B on a screen (FIG. 36) viewed on the monitor of the terminal, and data indicative of an instruction to reserve merchandise is transmitted to the server from the terminal of the purchaser. In step s1104, the server judges whether or not the instruction to reserve merchandise is transmitted from the terminal of the purchaser. When the server receives the reservation instruction, the server gives a positive judgment to step S1104 and proceeds to step S1107, but when the reservation instruction is not received yet, the server gives a negative judgment to step S1104 and proceeds to step s1105.

In step S1107, the server adds this merchandise to the shopping cart and proceeds to step S1108. In step S1108, the server transmits page data for a display to the terminal of the purchaser that sends the instruction to put this merchandise into the cart and has a page screen indicative of putting this merchandise into the cart, that is, reservation of this merchandise, displayed on a monitor of the terminal of the purchaser. The server transmits page data for a display, and then a reservation process of FIG. 35 is finished.

In step S1105, the server judges whether or not an instruction not to reserve merchandise is transmitted from the terminal of the purchaser. The instruction not to reserve merchandise is transmitted to the server when the purchase clicks on "no reserve" button 36C on a screen of FIG. 36. The server receives data indicative of the instruction of no reservation, then the server gives a positive judgment to step S1105 and proceeds to step S1106, but when data indicative of the instruction of no reservation is not received yet, the server gives a negative judgment to step S1105 and gets back to step S1104.

Figure 37:
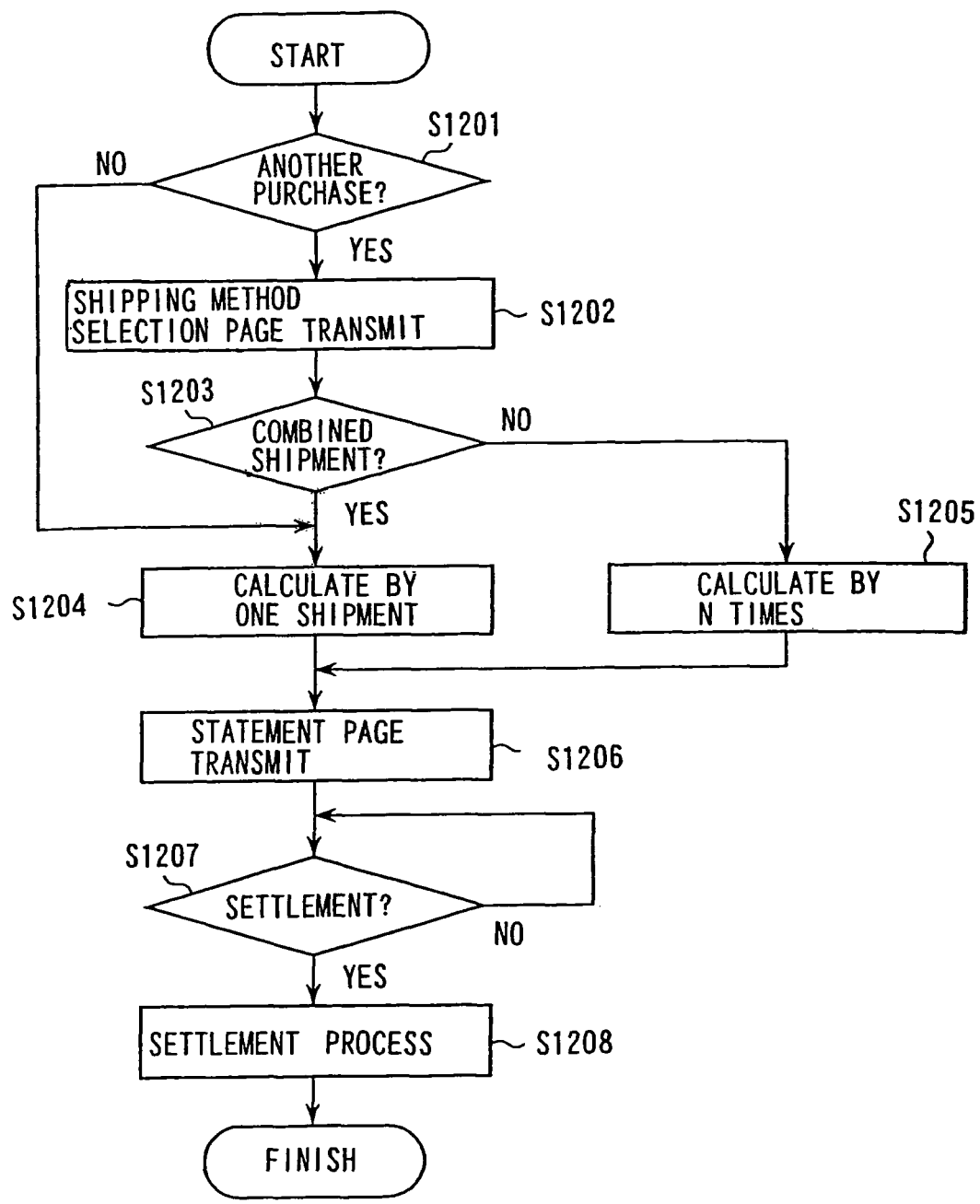
FIG. 37 represents a flow chart explaining how an option settlement is processed.

In step S1106, the server transmits page data for a display to the terminal of the purchaser that sends the instruction to put merchandise into the cart and has a page screen indicative of no reservation displayed on a monitor of the purchaser's terminal. The server transmits page data of the display and the reservation process of FIG. 35 is finished. The foregoing option settlement process will be explained. FIG. 37 represents a flow chart explaining how an option settlement is processed by the server of the service provider. A process of FIG. 37 starts up when the server gives a positive judgment in step S1007 of FIG. 34. In step S1201 of FIG. 37, the server judges whether or not there is any merchandise other than reserved merchandise in the shopping cart. The server gives a positive judgment to step S1201 when there is merchandise other than reserved merchandise and proceeds to step S1202, but when there is not any merchandise other than reserved merchandise, the server gives a negative judgment to step S1201 and proceeds to step S1204. In step S1202, the server transmits page data for a display to the terminal of the purchaser and proceeds to step S1203. Then, a page screen for a delivery selection as shown in FIG. 38 is displayed on a monitor of the purchaser's terminal. In FIG. 38, an expected delivery date is displayed.

When the purchaser clicks on button 38B on a screen (FIG. 38) displayed on a monitor of the purchaser's terminal, data indicative of an instruction that reserved merchandise is delivered combined with other merchandise is transmitted to the server from the terminal of the purchaser. In step S1203, the server judges whether or not a combined delivery instruction is transmitted from the terminal of the purchaser. The server gives a positive judgment to step S1203 and proceeds to step S1204, but when the combined delivery instruction is not received yet, the server gives a negative judgment to step S1203 and proceeds to step S1205.

In step S1204, the server calculates to create a bill and proceeds to step S1206. In this case, as a number of a delivery of this merchandise is one delivery, the bill states one delivery charge and an amount of merchandise. In step S1205, the server calculates to create the bill and proceeds to step S1206. In this case, as a delivery of merchandise is split into a plurality of deliveries, the bill states the delivery charge and the amount of merchandise per each merchandise delivery. In step S1206, the server transmits page data for a display to the terminal of the purchaser and proceeds to step S1207. Thus, a page screen of the bill as shown in FIG. 39 is displayed on a monitor of the purchaser's terminal.

When the purchaser clicks on a "Place an order with this content" button (not shown) on a screen (FIG. 39) displayed on the monitor of the purchaser's terminal, data indicative of an instruction to settle is transmitted to the server from the terminal of the purchaser. In step S1207, the server whether or not the instruction to settle is transmitted from the terminal of the purchaser. The server gives a positive judgment to step s1207 when the settlement instruction is received and proceeds to step S1208, but when the instruction is not received yet, the server repeats a judgment process. In step S1208, the server finishes an option settlement process of FIG. 37 after performing the settlement process.

A normal settlement process will be explained. A normal settlement process omits the processes from step S1201~step S1203 in the option settlement process of FIG. 37 and the process of step S1205. The normal settlement process starts when the server gives a negative judgment in step S1001 of FIG. 34, that is, there is no reserved merchandise. In this case, merchandise in the cart is in stock and one time delivery is just enough, so the bill can be created including one delivery charge and an amount of merchandise. Thus, the normal settlement process starts from the process of step S1204.

In the option settlement process, a case where, when reserved merchandise is delivered combined with another merchandise, a delivery charge is calculated as one time delivery and further settlements of reserved merchandise and another merchandise are jointly processed has been explained. A following explanation is a case where a delivery charge becomes free of charge depending upon a total amount of purchased merchandise or reserved merchandise is settled separately from another merchandise.

Figure 40:
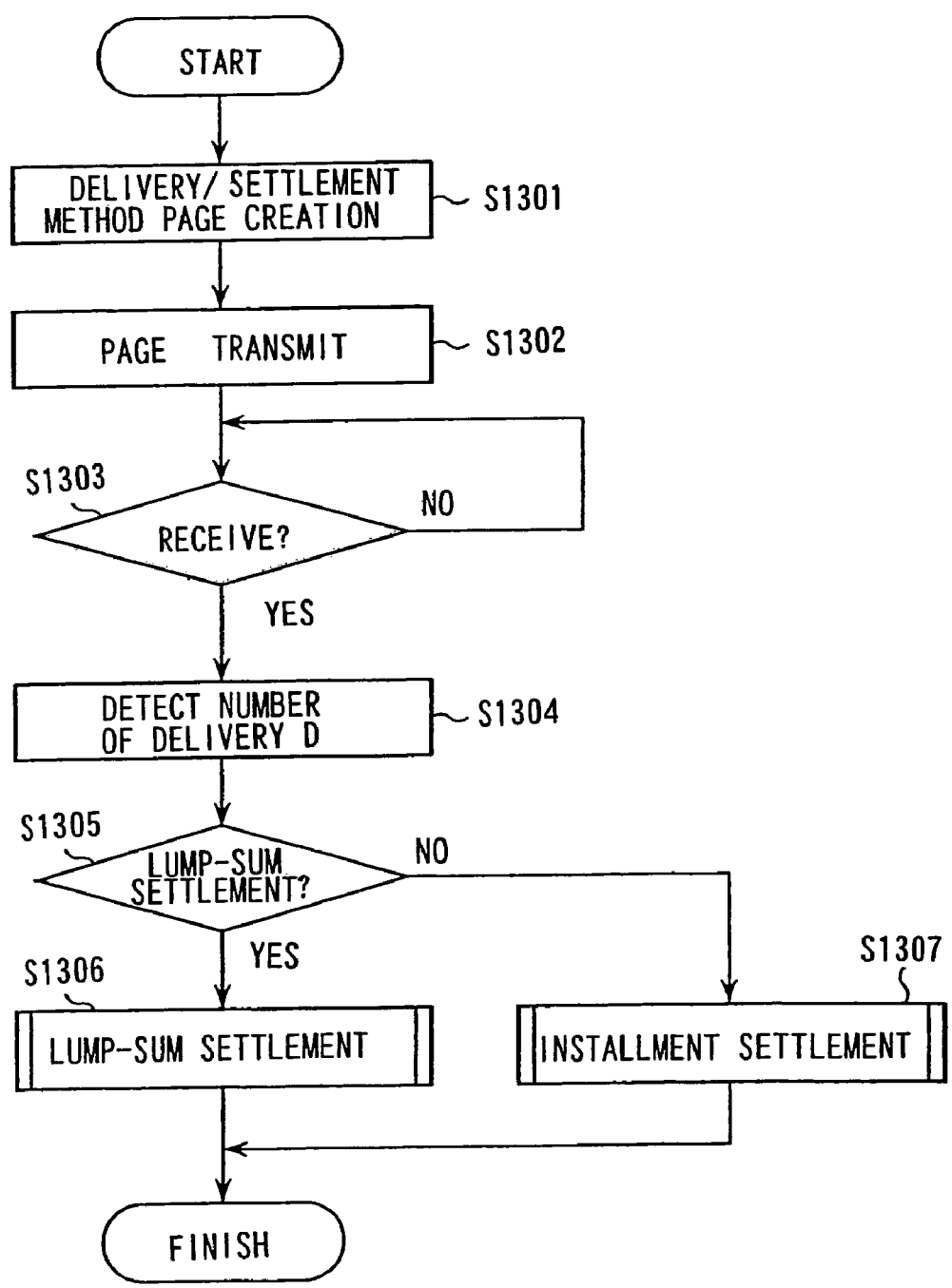
FIG. 40 represents a flow chart explaining a step up to a settlement of a delivery cost.

FIG. 40 represents a flow chart explaining how a decision of a delivery charge is processed depending upon a delivery method and a way of a settlement and this flow is performed in place of the option settlement process of FIG. 37. In step S1301 of FIG. 40, the server creates a page screen for a delivery method selection and a settlement selection and proceeds to step S1302. A delivery method selection is to select either one of a combined delivery of reserved merchandise and another merchandise or a separate delivery. A settlement selection is to select either one of a joint collective settlement of reserved merchandise and an other merchandise or an installment settlement. In step S1302, the server transmits data of the created page screen to the terminal of the purchaser and proceeds to step S1303. Thus, the page screen with a checkbox for a delivery method selection (not shown) and a checkbox for a settlements election (not shown) is displayed on a monitor of the purchaser's terminal.

The purchaser places any of a checkmark in the checkbox on a screen displayed on the terminal and clicks on an OK button (not shown), and data indicative of the delivery method and the way of the settlement is transmitted to the server from the terminal of the purchaser. In step s1303, the server gives a positive judgment to step S1303 when data indicative of the instruction is received and proceeds to step S1304, but when data indicative of the instruction from the terminal is not received, the server gives a negative judgment to step S1303 and repeats a judgment process.

In step S1304, the server detects a number of a delivery D and proceeds to step S1305. When a delivery of merchandise is combined, D=1. In a case of a separate delivery of reserved merchandise, D≧2. A figure of D takes a different figure subject to an availability status of reserved merchandise and a scheduled supply date of each of reserved merchandise. In step S1305, the server judges whether or not a settlement is a lump-sum payment. The server gives a positive judgment to step S1305 when data indicative of an instruction of the lump-sum payment is transmitted from the terminal of the purchaser and proceeds to step S1306, but when data indicative of an instruction of an installment payment is transmitted, the server gives a negative judgment to step S1305 and proceeds to step S1307. In step S1306, the server performs a settlement process of the lump-sum payment and a process of FIG. 40 is finished. In step S1307, the server performs a settlement process of the installment payment and a process of FIG. 40 is finished.

Figure 41:
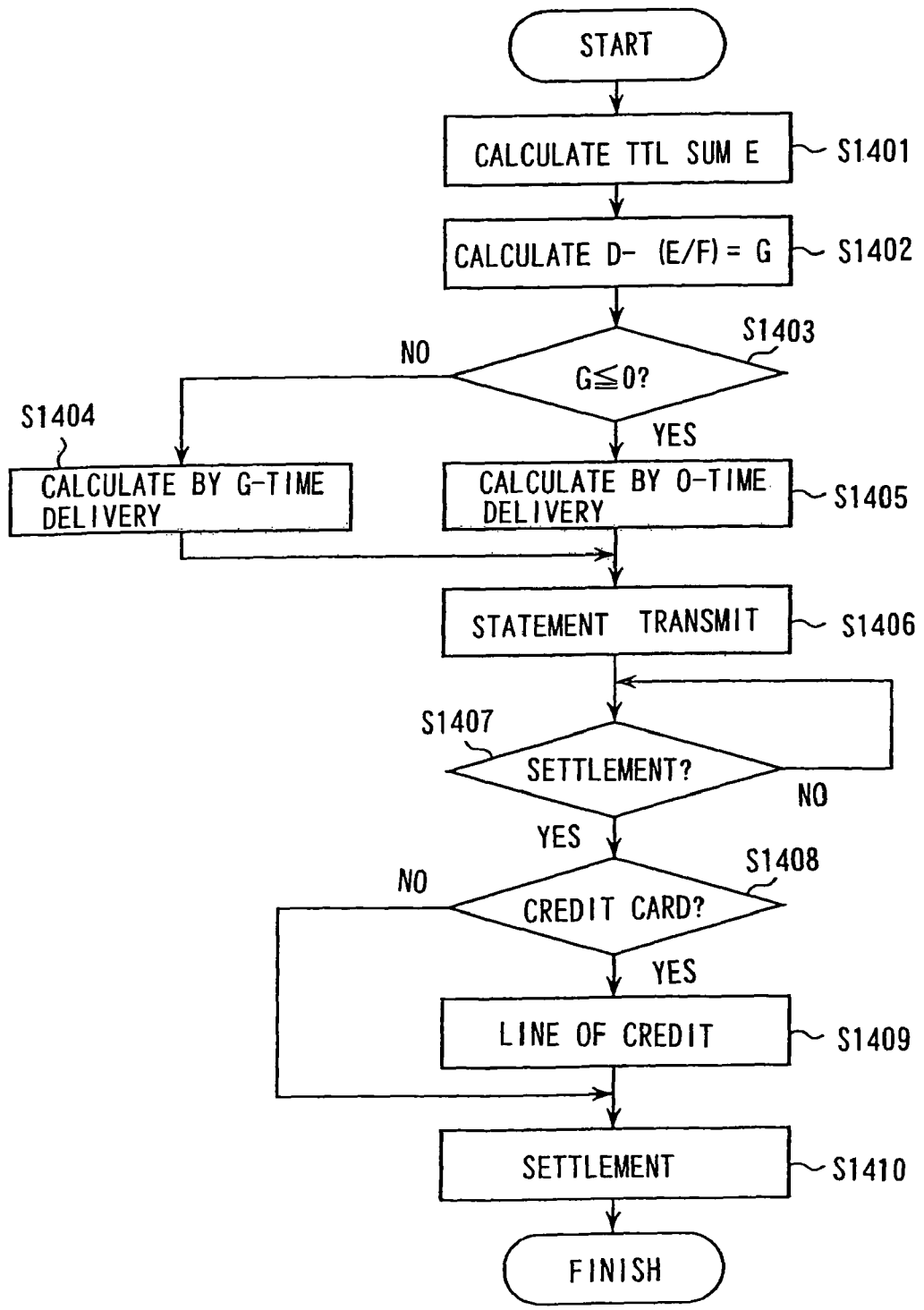
FIG. 41 represents a flow chart explaining a lump sum settlement process.

A lump-sum payment settlement will be explained. In the lump-sum payment settlement, merchandise in stock and reserved merchandise due to an out-of-stock are jointly settled. FIG. 41 represents a flow chart explaining how the lump-sum payment settlement is processed by the server of the service provider. In step S1401, the server calculates a total amount E of purchased merchandise and reserved merchandise in the shopping cart and proceeds to step S1402. In step S1402, the server calculates a chargeable number of a delivery D and proceeds to step S1403. Chargeable number of a delivery D is calculated by G=D−(E/F), but F is a predetermined rate so as to provide a free-of-charge delivery service. A fraction of a decimal point is rounded up.

In step S1403, the server judges whether or not G≦0 is established. The server gives a positive judgment to step S1403 when G≦0 is established and proceeds to step S1405, but when G>0 is established, the server gives a negative judgment to step S1403 and proceeds to step S1404. In step S1405, the server creates the bill with 0 of a delivery charge and proceeds to step S1406.

In step S1406, the server transmits page data for the bill display to the terminal of the purchaser and proceeds to step S1407. Thus, a page screen of the bill as with that of FIG. 39 is displayed on a monitor of the purchaser's terminal. When the purchaser clicks on a "Place an order with this content" button (not shown) on a screen (FIG. 39) displayed on the terminal of the purchaser, data indicative of a settlement instruction is transmitted to the server. In step s1407, the server judges whether or not data of indicative of the settlement instruction is transmitted. The server gives a positive judgment to step S1407 when data is received and proceeds to step S1408, but when data is not received, the server repeats a judgment process.

In step S1408, the server detects whether or not a payment is made by a credit card. A payment selection is a process that the purchaser selects a way of a payment among various ways of payments such as, for instance, a credit card and cash on delivery. The server gives a positive judgment to step S1408 when the credit card payment is made and proceeds to step S1409, but when the payment is not made by the credit card, the server gives a negative judgment to step S1408 and proceeds to step S1410.

In step S1409, the server connects to a credit card finance company the purchaser gets a finance contract with and checks out a line of credit inclusive of a payment amount payable by the credit card. The server proceeds to step S1410 after performing the process of the line of credit check. In step S1410, the server performs a settlement when the line of credit is cleared and finishes the lump-sum payment process of FIG. 41. When the line of credit is not cleared, the server performs non-settlement process and a process of FIG. 41 is finished. In this case, a purchase does not come into effect.

Figure 42:
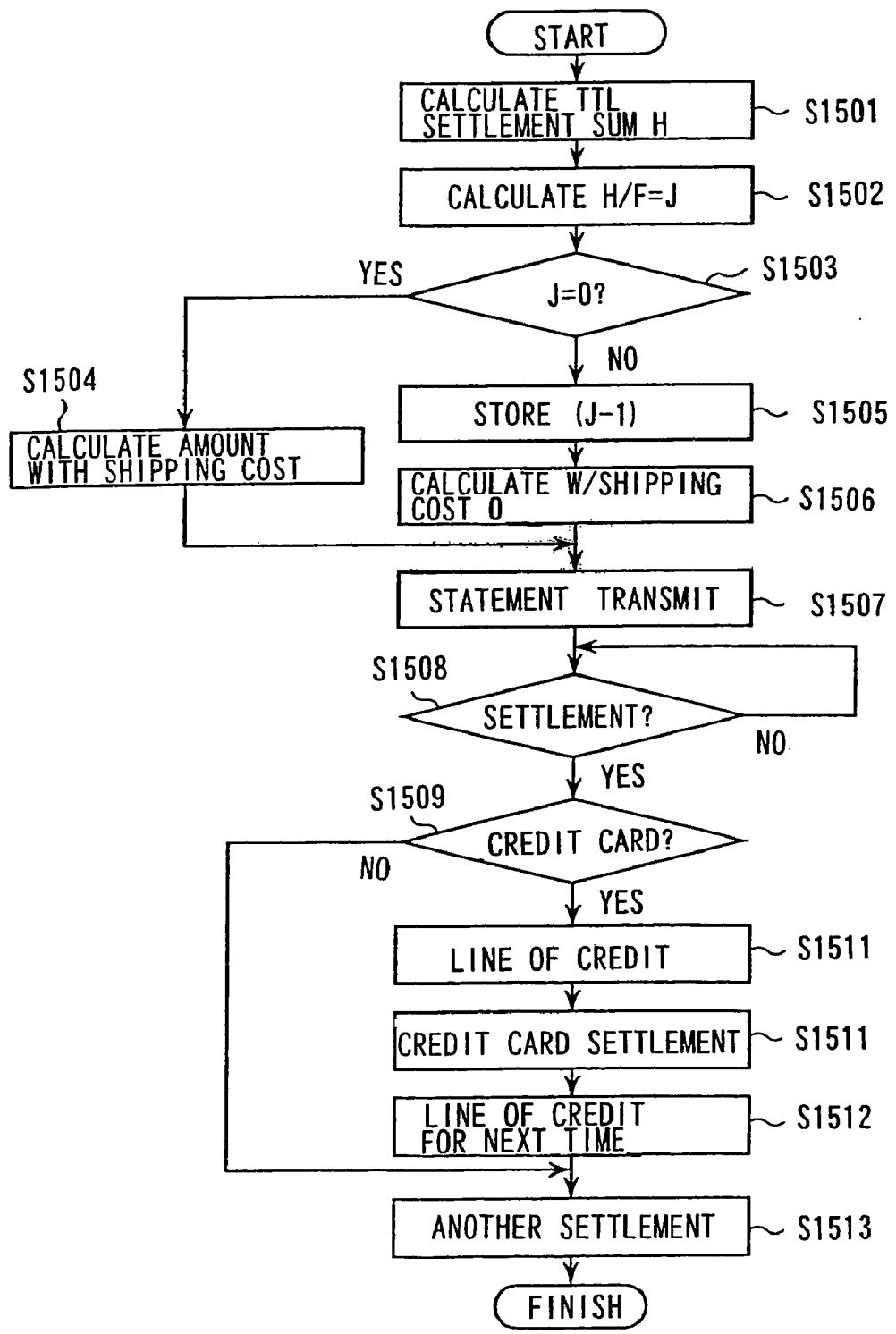
FIG. 42 represents a flowchart explaining an installment settlement process.

An installment payment will be explained. In an installment payment, a first comes a settlement of merchandise in stock and a next settlement comes after out-of-stock merchandise is supplied. FIG. 42 represents a flow chart explaining how an installment payment is processed by the server of the service provider. In step S1501, the server calculates a total amount H of merchandise to be settled this time out of purchased merchandise and reserved merchandise in the shopping cart and proceeds to step S1502. In step S1502, the server calculates a number of deliveries J enabling a delivery service to be free of charge and proceeds to step S1503. A free-of-chargeable number of deliveries J is calculated by J=H/F. F is a predetermined amount so as to make a delivery service free of charge. A fraction of a decimal is rounded down.

In step S1503, the server judges whether or not J=0 is established. The server gives a positive judgment to step S1503 when J=0 is established and proceeds to step S1504, but when J≠0 is established, the server gives a negative judgment to step S1503 and proceeds to step S1505. In step S1506, the server sets J=J−1, and then, relating a value of J to a purchaser, the server stores the value of J onto a database and proceeds to step S1506. In step S1506, the server creates a bill with 0 of a delivery charge and proceeds to step S1507. In step S1504, the server creates a bill including a delivery charge and proceeds to step S1507.

In step S1507, the server transmits page display data for a created bill and proceeds to step S1508. Thus, the same page screen of the bill as that of FIG. 39 is displayed on a monitor of the purchaser's terminal. The purchaser clicks on a "Place an order with this content" button (not shown) on a screen (FIG. 39) of a monitor of the purchaser's terminal, data indicative of a settlement instruction is transmitted to the server from the terminal of the purchaser. In step S1508, the server judges whether or not data of the settlement instruction is transmitted. The server gives a positive judgment to step S1508 when data is received and proceeds to step S1509, but when data is not received, the server repeats a judgment process.

In step S1509, the server detects whether or not a payment, is made with a credit card. The server gives a positive judgment to step S1509 when the payment is made with the credit card and proceeds to step S1510, but when the payment is not made with the credit card, the server gives a negative judgment to step S1509 and proceeds to step S1513.

In step S1510, the server connects to a credit card finance company the purchaser gets a credit card finance contract with and checks out a line of credit for a settlement amount this time payable by the credit card. The server performs a process of the line of credit check and proceeds to step S1512. In step S1511, the server performs a settlement process when the line of credit is cleared and proceeds to step S1512. In this step, a settlement of reserved merchandise is not made. When the line of credit is rejected, the server performs non-settlement process and proceeds to step 1512. When non-settlement process is performed, the purchase does not come into effect. In step S1512, the server checks out a line of credit amount of reserved merchandise except for the settlement amount this time. The server performs the process of the line of credit check and proceeds to step S1513. Thus, as it is possible to check out that the payment through the credit card makes it possible to purchase reserved merchandise, a credibility of reservation gets enhanced.

In step S1513, the server finishes the installment payment settlement process of FIG. 42 when the line of credit is cleared. However, when the line of credit is rejected, the server performs another settlement rather than the credit card and finishes the installment payment settlement process of FIG. 42.

According to the on-line shop with content of this embodiment, a following effect is obtained.

(1) The service provider prepares a polygon image of a camera body and another polygon image of each accessory such as an interchangeable lens and makes it possible to create a composite by combining these images. Thus, a purchaser can see an image of each accessory being attached to the camera body before purchasing merchandise. The service provider does not have to take various combinations of pictures that each accessory is actually attached to a camera body, so it saves the service provider time and trouble.

(2) The service provider can access a database storing information of a membership registration of a login purchaser, readout information about a model such as a purchaser's camera and make a suggestion about new merchandise such as an accessory for the camera to the purchaser. Therefore, the service provider never makes a suggestion about the same merchandise as has been already owned by the purchaser and even if the purchaser does not take a trouble to search, the service provider automatically puts forward a suggestion about an accessory for a camera owned by the purchaser. Thus, a convenient shop service for a purchaser can be provided.

(3) In addition to (2), a suggestion about new merchandise depending upon merchandise the purchaser has already put into a shopping cart is made, so a suggestion about the same merchandise as the purchaser has already put into a shopping cart is not put forward. Thus, a convenient shop service for a purchaser is provided.

(4) As a stock (a virtual stock) is managed by a relative increase/decrease in a stock with reference to a beginning absolute stock and a stock n varying in real time synchronizing with a status of content in a shopping cart, the manager can see how many merchandise are increased/decreased against the beginning stock by the figure specified in box 28H of an increase/decrease in a stock and can also see a surplus/short by the stock n displayed in box 28H of the present stock.

(5) In a management of merchandise information, a different merchandise ID is allocated and managed as separate merchandise even though wrapped merchandise and name-engraved merchandise and so are the same merchandise. Thus, in comparison to wrapping merchandise when requested, a working efficiency becomes enhanced.

(6) Only when a stock n of merchandise becomes below a given number Z for the first time since a given time, a mail conveying a decrease in the stock of the merchandise is transmitted to the manager. Therefore, even when a lot of purchasers visit an on-line shop at the same time and the stock varying moment to moment becomes larger or smaller than Z, the same mail is not transmitted over and over again to the manager.

(7) Every time a stock n becomes below 0, a mail conveying 0 of the stock of the merchandise is transmitted to the manager. Therefore, the manager can see how many times the merchandise has been put into a shopping cart from the number of the received mail conveying 0 of the stock.

(8) When the stock 0 of merchandise is 0, a message conveying an out-of-stock is transmitted to the terminal of the purchaser at a time when the purchaser puts the merchandise into a cart. Therefore, while the purchaser operates a terminal to perform a settlement process of merchandise put into a cart, this merchandise does not become out of stock. That is, merchandise that is not out of stock at a time when the merchandise is put into a cart is purchasable without making a reservation.

(9) When the stock is 0, in accordance with a status of the checkbox of column 28G on a management screen of merchandise information managed per each of merchandise, whether an out-of-stock is displayed, a sold-out is displayed, a display of the merchandise is continued and the display of the merchandise is halted are decided. Therefore, content of a display at an out-of-stock can be varied with merchandise in such a way that merchandise taking some time to be supplied carries an out-of-stock display, sold-out merchandise with a limited available number carries a sold-out display and discontinued merchandise halts a display. As a result, self-explanatory out-of-stock information to a purchaser can be provided.

(10) When the stock n of merchandise that a purchaser puts into a cart is 0 (step S1002), information of an out-of-stock and a scheduled supply date is transmitted to the terminal of the purchaser and a reservation can be made via reservation button 36B. Thus, a purchaser can make a purchase reservation readily.

(11) An on-line lottery is provided to a purchaser purchasing merchandise at an on-line shop and when an address of a prize is the same as that of purchased merchandise, an instruction of a combined delivery is issued (step S909). Thus, a delivery cost can be reduced when compared to a separate delivery.

(12) When a purchaser purchases in-stock merchandise and out-of-stock merchandise, whether or not in-stock merchandise and out-of-stock merchandise are delivered combined is checked out (step S1203). Therefore, the purchaser can select any of delivery methods depending upon merchandise availability, namely, a combined delivery of in-stock merchandise and out-of-stock merchandise when supplied or a separate delivery just like a delivery of in-stock merchandise comes first and the next comes reserved merchandise.

(13) When a purchaser purchases out-of-stock merchandise and in-stock merchandise, whether or not a lump sum settlement of in-stock merchandise and reserved merchandise due to an out-of-stock is made is checked out (step S1509). If instructions of an installment payment is received and further a credit card settlement is received (Yes judgment of step S1509), a line of credit payable for reserved merchandise is checked out (step S1512) separately from this time settlement amount. As a result, as it is also confirmed that reserved merchandise is purchasable, reservation credibility is increased.

—Album Printout Service—

Figure 43:
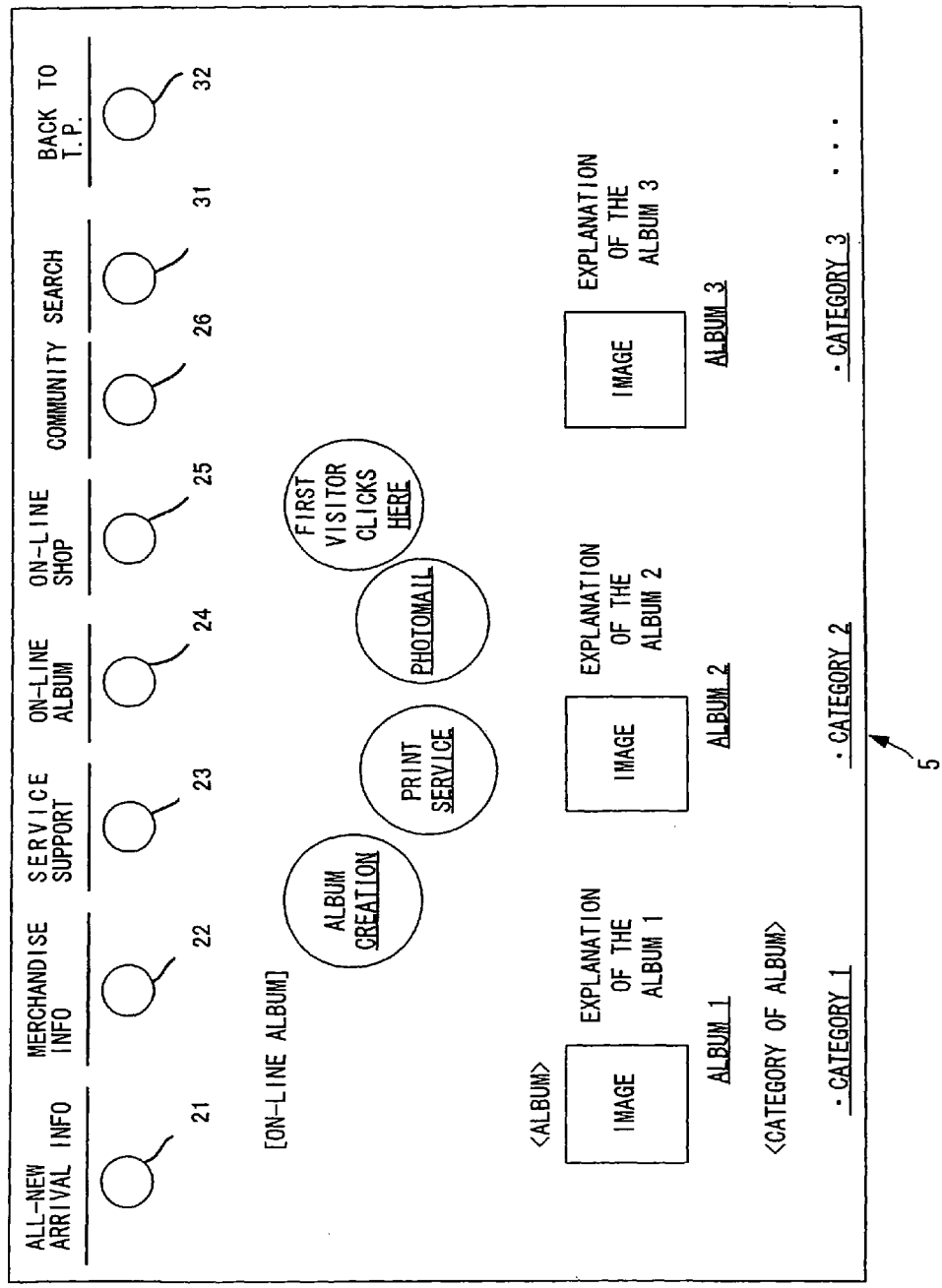

A category of on-line album 5 will be explained. An on-line album is called as an electronic album. A web service user clicks on link button 24 to "On-line album" on the screen of top page 10 of FIG. 3, the top page screen of the category of the on-line album (not shown) is displayed on the terminal. When the service user logs in this top page, a page screen as shown in FIG. 43 is displayed on a monitor of the terminal. As explained before, a service use of on-line album 5 is not available until the service user with a web membership registration enters a login name and password.

In FIG. 43, each location described as "Album creation", "Printout service", "Photo mail" and "Welcome to a first user" is embedded to information of each link. The service user clicks on an underlined letter and button of "Album creation", a page screen for an album creation is further displayed. The album creation is performed in such a way that the service user borrows a data storage area inside an album server the supplier prepares and stores an image onto the data storage area. The service user uses the data storage area storing the image as an electronic album. Storage of an image onto an electronic album is called a registration of an image.

A memory size (memory capacity) of an album data storage area is, for instance, 50 MB per person, effective for one year (usable period of time). A preferred treatment such as a larger memory size and a longer effective period than a standard one is appropriately available to a service user that records a customer registration. A registered image data stored onto an electronic album by a service user is principally read out from a data storage area to a terminal by the service user and the image via this image data is viewed by the service user. When a service user wants the album to be viewed by another service user or permits another service user to view the album, the service user can put the album on view, notifying its intension to the service provider. The album put on view is displayed on a screen of FIG. 43 as the open album. In an example of FIG. 43, an explanation is displayed at album 1, album 2 and album 3 with a typical sample image of each album. When a service user clicks on any of images and the underlined letter of the album, image data stored at each album is transmitted from a storage area of this image data to a terminal of the service user. Then, the service user can view the image created by this transmitted data on a monitor of the user's terminal.

When an album is not put on view, the album is private and only a service user that creates the album is eligible for viewing the album, but another service user can not. A setting of "Put on view"/"Private" is determined per each registered image by the service user that creates the album. There are two types of "Put on view", an unconditional "Put on view" and "Put on view" with a password. The server, when an album is put on view unconditionally, allows anybody of the service user to read out image data and when a password is required to view the album, the server permits only a service user that types a password to read out image data. An album put on view is introduced with a display of a typical image on a screen of FIG. 43 and further it is classified per category of the album and the classified album is also introduced. For example, when a service user clicks on underlined "Category 1", a page screen introducing the album classified into category 1 with a typical image of each album appears for a display. Accordingly, the album put on view is classified per each category and the classified album is introduced.

In FIG. 43, when a service user clicks on "Printout service" and a button, a page screen for a printout service is coming up for a display. The printout service is a service in which a service provider prints out a high definition hard copy of an image registered in an electronic album and the hard copy can be delivered to the service user. An actual printout service may be performed by the service provider or outsourced to a third party by the service provider. A printout service procedure is flowed as follows;

① A service user logs in an on-line album of the service provider,

② The service user selects an image out of registered images,

③ The service user checks out a printout charge, a payment method and an address of a printout delivery, ④ The service user places an order, ⑤ The service provider takes the order, ⑥ The service provider makes a printout and deliveries it.

In FIG. 43, when a service user clicks on underlined "Photo mail" and a button, a page screen for a mail service further appears for a display. The photo mail is a mail service that enables information linked to an image registered onto an electronic album to be attached. A mail receiver of the photo mail can read out image data registered onto the electronic album by selecting information of a link written in the mail, for instance, by specifying URL and browse the image.

In FIG. 43, when the service user clicks on underlined "Welcome to a first visit" and a button, a page screen introducing how to use an on-line album service appears for a display. Referring to this introduction page, the service user obtains information such as a usage of the electronic album. In accordance with the on-line album service of this embodiment, the service provider provides to a service user a following service.

—Delete an Album when a Service User has not Logged in for a Given Period of Time—

An on-line album service lends a service user a data storage area storing an image, so a large data storage area is required in comparison to a mail and the like. Therefore, in order not to keep on holding a data storage area for a service user that has not been using this service, data stored in a data storage area lent to the service user is deleted when the service has not been used and a given period has elapsed. Accordingly, this data storage area can be lent to another service user.

Figure 44:
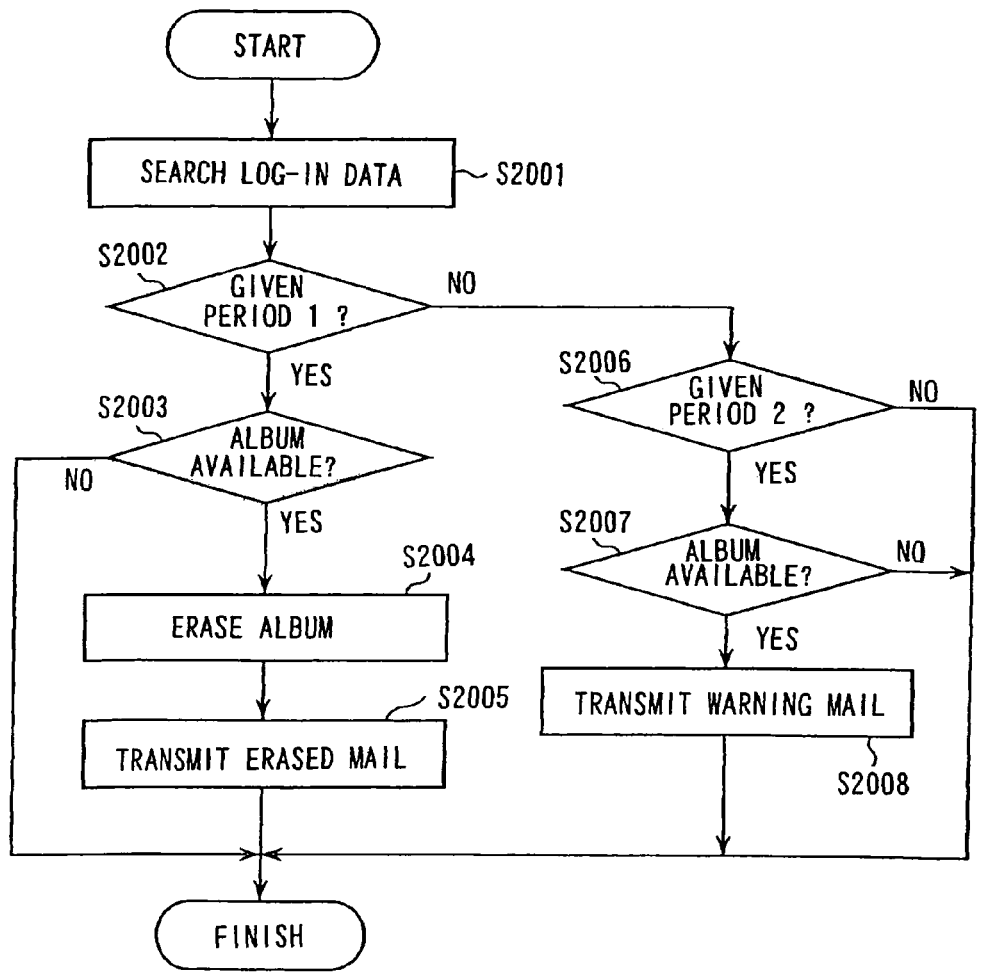
FIG. 44 represents a flow chart explaining how erasure of an album is processed.

FIG. 44 represents a flow chart explaining how an album deletion is processed. A process of FIG. 44 is performed regularly once a month. In step S2001, the server accesses a database and searches login data recorded per each service user and proceeds to step S2002. In step S2002, the server judges whether or not there is a service user with no login record for more than a first given period. The first given period is, for example, one year. The server, when there is a service user with no login record, gives a positive judgment to step S2002 and proceeds to step S2003, but when there is not, the server gives a negative judgment to step S2002 and proceeds to step S2006.

In step S2003, the server judges whether or not the service user has an album. When the service user registers the album, the server gives a positive judgment to step S2003 and proceeds to step S2004, but when the album is not registered, the server gives a negative judgment to step S2003 and a process of FIG. 44 is finished. When step S2003 is given the negative judgment, the album is not deleted.

In step S2004, the server deletes all the albums the service user registers and proceeds to step S2005. In step S2005, the server transmits to the service user a mail notifying that the albums are deleted because of no record of a login for more than the first given period and a process of FIG. 44 is finished.

In step S2006, the server judges whether or not there is a service user with no login record for less than the first given period and more than a second given period. The second given period is, for example, 11 months. The server, when there is the service user with no login record, gives a positive judgment to step S2006 and proceeds to step S2007, but when there is not, gives a negative judgment to step s2006 and A process of FIG. 44 is finished. When step S2006 is given the negative judgment, the album is not deleted.

In step S2007, the server judges whether or not the service user has an album. When the service user registers the album, the server gives a positive judgment to step S2007 and proceeds to step S2008, but when the album is not registered, the server gives a negative judgment to step S2007 and a process of FIG. 44 is finished. When step S2007 is given the negative judgment, the album is not deleted.

In step S2008, the server transmits a mail warning that albums will be deleted because of no login record for more than the first given period and a process of FIG. 44 is finished. Accordingly, the warning mail is transmitted to the service user that has not been using this service for more than the second given period before the album is deleted.

—No Deletion of an Album Now Browsed by Another Service. User—

Even when a service user registering an album has not logged in, the album that is now put on view and browsed by another service user is not deleted. Accordingly, the service provider can secure a prospective user that uses this service with an eye to browsing the album put on view.

Figure 45:
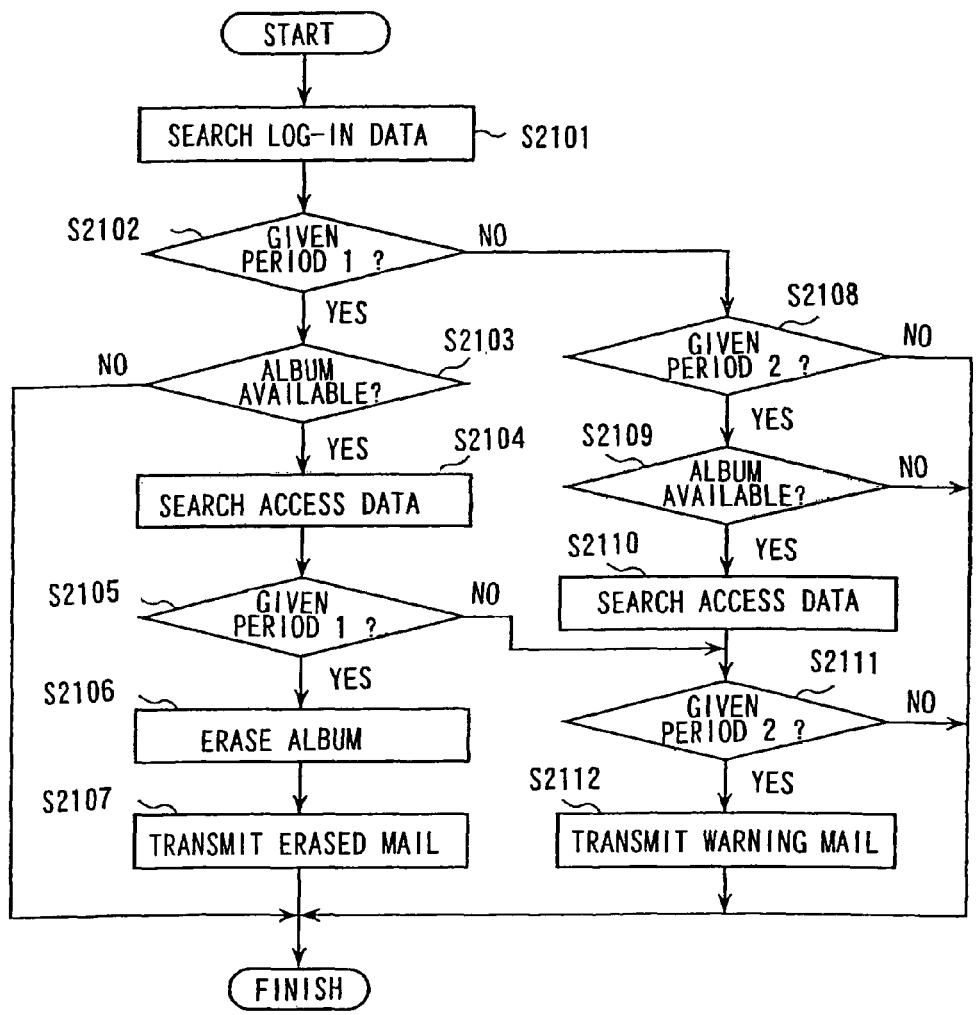
FIG. 45 represents a flow chart explaining how erasure of an album is processed.

FIG. 45 represents a flow chart explaining how an album deletion is processed by the server of the service provider. A process of FIG. 45 is performed regularly once a month.

In step S2101, the server searches login data recorded per each a service user and proceeds to step S2002. In step S2102, the server judges whether or not there is a service user with no login record for more than the first given period. The server, when there is a service user with no login record, gives a positive judgment to step S2102 and proceeds to step S2103, but when there is not, the server gives a negative judgment to step S2102 and proceeds to step S2108.

In step S2103, the server judges whether or not the service user has an album. When the service user registers the album, the server gives a positive judgment to step S2103 and proceeds to step S2104, but when the album is not registered, the server gives a negative judgment to step S2103 and a process of FIG. 45 is finished. When step S2103 is given the negative judgment, the album is not deleted.

In step S2104, the server searches data indicative of an access status of each album registered by the service user and proceeds to step S2105. In step S2105, the serve judges whether or not there is an album with no access record during the first given period. The server, when there is the album, gives a positive judgment to step s2105 and proceeds to step S2106, but when there is not the album, gives a negative judgment to step s2105 and proceeds to step S2111.

When step S2106 is given the negative judgment, the server deletes an album with no access record out of albums the service user registers and proceeds to step S2107.

In step S2107, the server transmits to the service user a mail notifying that the album with no login record for more than the first period was deleted and a process of FIG. 45 is finished.

In step S2108, the server judges whether or not there is a service user with no login rack record for less than the first given period and more than the second given period. When there is the service user, the server gives a positive judgment to step S2108 and proceeds to step S2109, but when there is not the service user, the server gives a negative judgment to step S2108 and a process of FIG. 45 is finished. When step S2108 is given the negative judgment, the album is not deleted.

In step S2109, the server judges whether or not the service user has an album. The server, when the service user registers the album, gives a positive judgment to step S2109 and proceeds to step S2110, but when the album is not registered, the server gives a negative judgment to step S2109 and a process of FIG. 45 is finished. When step S2109 is given the negative judgment, the album is not deleted.

In step S2110, the server accesses a database to search data indicative of an access status of each album the service user registers and proceeds to step S2111. In step S2111, the server judges whether or not there is an album with no access record for more than the second given period. The server, when there is the album, gives a positive judgment to step S2111 and proceeds to step S2112, but when there is not, the server gives a negative judgment to step S2111 and A process of FIG. 45 is finished. When step S2111 is given the negative judgment, the album is not deleted.

In step S2112, the server transmits to the service user a mail warning that an album with no login or access record for more than the first given period will be deleted and a process of FIG. 45 is finished. Accordingly, the warning mail is transmitted to the service user with no use record for more than the second given period before an album with no access is actually deleted.

—Delete an Album Registered by a Service User Who Resigns its Web Membership—

Figure 46:
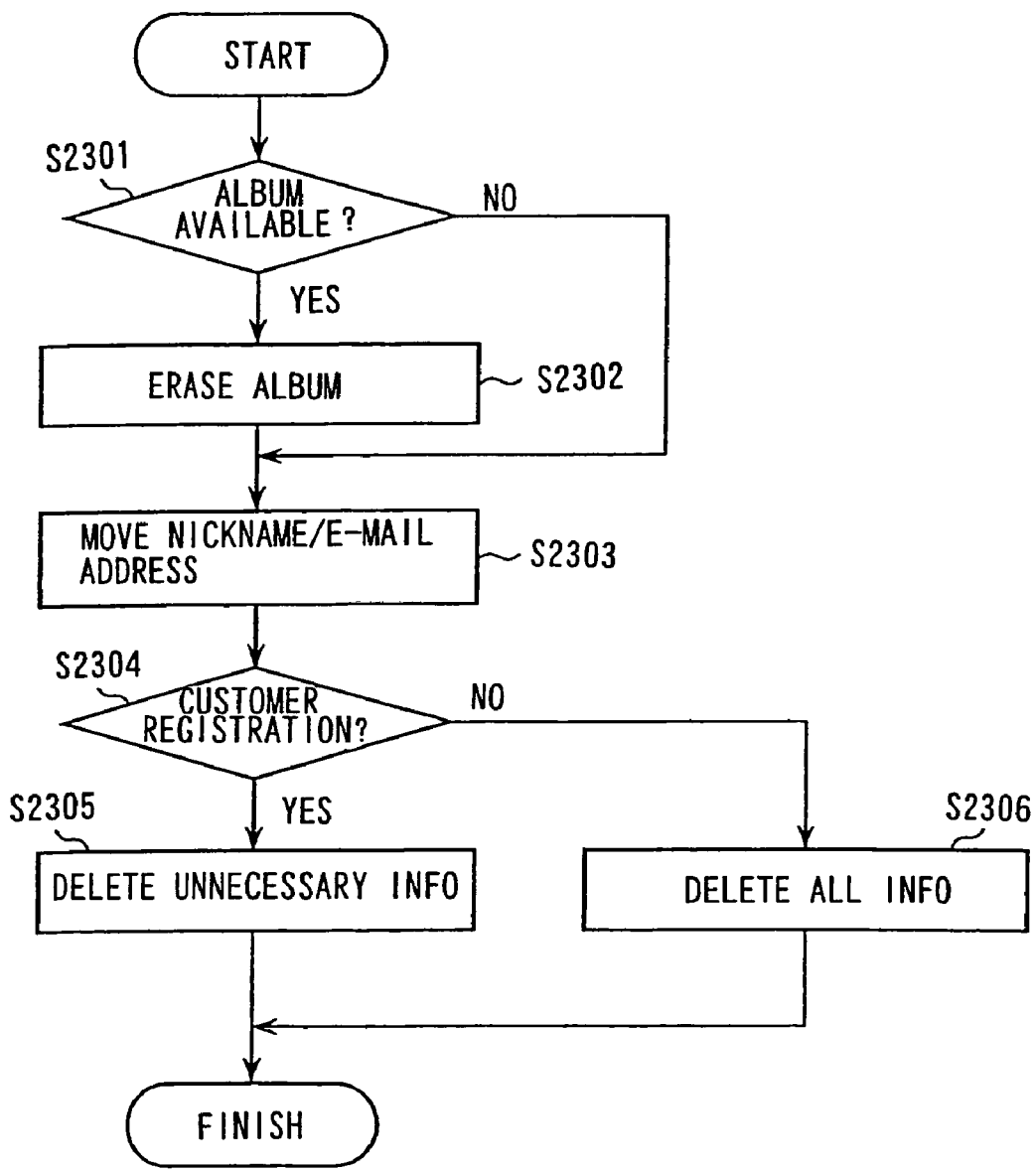
FIG. 46 represents a flow chart explaining how erasure of an album is processed.

FIG. 46 represents a flow chart explaining how an album deletion is processed by the server of the service provider. A process of FIG. 46 starts when a web membership resignation procedure is finished. In step S2301, the server judges whether or not a resigned member has an album. The server, when the resigned member ha registered the album, gives a positive judgment to step s2301 and proceeds to step S2302, but when the resigned member has not registered, gives a negative judgment to step S2301 and proceeds to step S2303. In step S2302, the server deletes the album registered by the resigned member and proceeds to step s2303. In this case, the server leaves content written in a bulletin board and data of data size reduced image (for instance, thumbnail image) attached to this writing. What is all about a thumbnail will be explained later.

In step S2303, the server transfers data indicative of a nickname and a photo mail address for the bulletin board the resigned member used from a database storing information about a web member to a database area storing information about a resigned web member and proceeds to step S2304. Storing information about the resigned web member, the server makes sure not to allocate the same nickname and photo mail address as those of the resigned web members to a prospective web member. In step S2304, the server judges whether or not the resigned web member registered a customer registration. The server, when the resigned web member registered the customer registration, gives a positive judgment to step s2304 and proceeds to step S2305, but when the customer registration was not performed, gives a negative judgment to step S2304 and proceeds to step S2306.

In step S2305, the server deletes unnecessary data as customer registration data from data recorded at a web membership registration by the resigned web member and a process of FIG. 46 is finished. In step S2306, the server deletes all data recorded at a web membership registration by the resigned web member and a process of FIG. 46 is finished.

—Album Management—

The service provider classifies an album registered by a service user into each category and manages the categorized album and enables registered image data to be browsed per each category. Generally, an image against public decency is considered to converge to a specific category and registered. Thus, the service provider manages an album in such a way that the provider can readily check out the album per each category.

Figure 47:
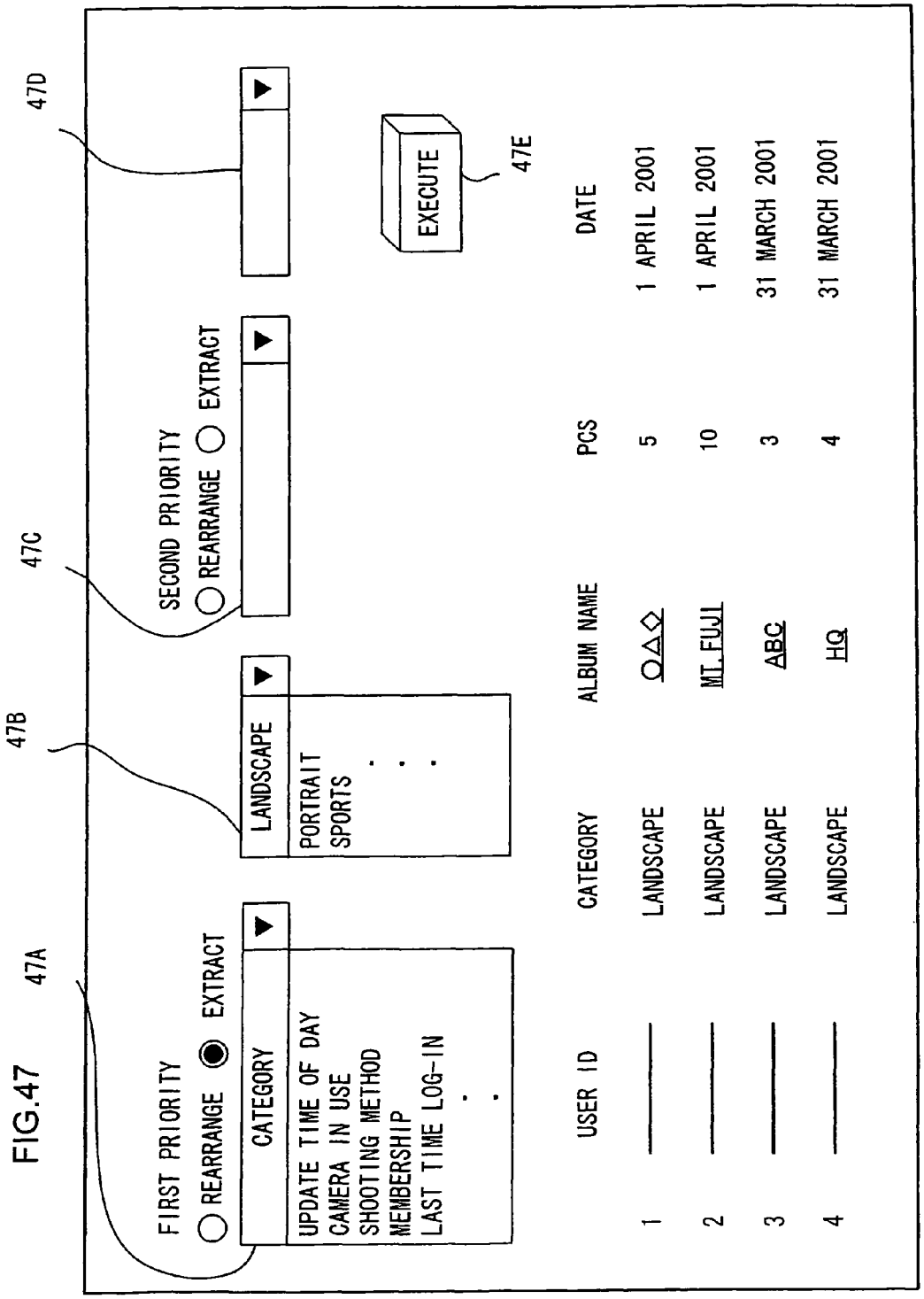
FIG. 47 represents a management screen of an album.

FIG. 47 represents an example of a management page screen for managing an album. The management page screen is prepared per each category of the registered album by the service provider. A manager predetermined by the service provider performs a given operation onto the server and then the server transmits management data to a terminal of the manager and the management screen of FIG. 47 is displayed on the terminal of the manager. In FIG. 47, when the registered album is rearranged per a category and the rearranged album is displayed, the manager ticks "Rearrange" in the checkbox of a first priority and clicks on execute button 47E, selecting "Category" from pull-down menu 47A. With this operation, a list of albums belonging to a "category" is displayed.

And also, when displaying a list of albums belonging to a "Landscape" in a category, the manager ticks an "Extract" in the checkbox of a first priority and selects a "Category" for pull-down menu 47A. And further, the manager selects the "Landscape" from pull-down menu 47B and clicks on execute button 47E. Accordingly, the list of the albums belonging to the categorized landscape as represented in FIG. 47 is displayed. As represented in the example of FIG. 47, a user ID of the service user that registers the album, a category name (in this case, a landscape), an album name (when the album name is registered), a number of registered image and a registered time of day are displayed as a list.

In addition to a category, pull-down menu 47A includes a registered time of day, a camera in use, away of picture-taking, membership, a last time login and a number of browsing and they are configured in such a way that the rearrangement and extraction of the album are possible. Also, as a second priority, pull-down menu 47C and 47D performing the rearrangement and extraction are provided and the rearrangement and extraction can be performed by further adding a condition of the second priority to a condition of the first priority. Selected content of any of selected pull-down menus 47A~47D is kept on being displayed while the list is displayed, so it is easy to further rearrange the displayed list of the album or extract again.

In FIG. 47, for instance, when selecting a "Camera in use" from pull-down menu 47A and ticking the "Rearrangement", a model name of the camera in use in place of the category is displayed and a list of the album registering images taken with the model is displayed.

Figure 48:
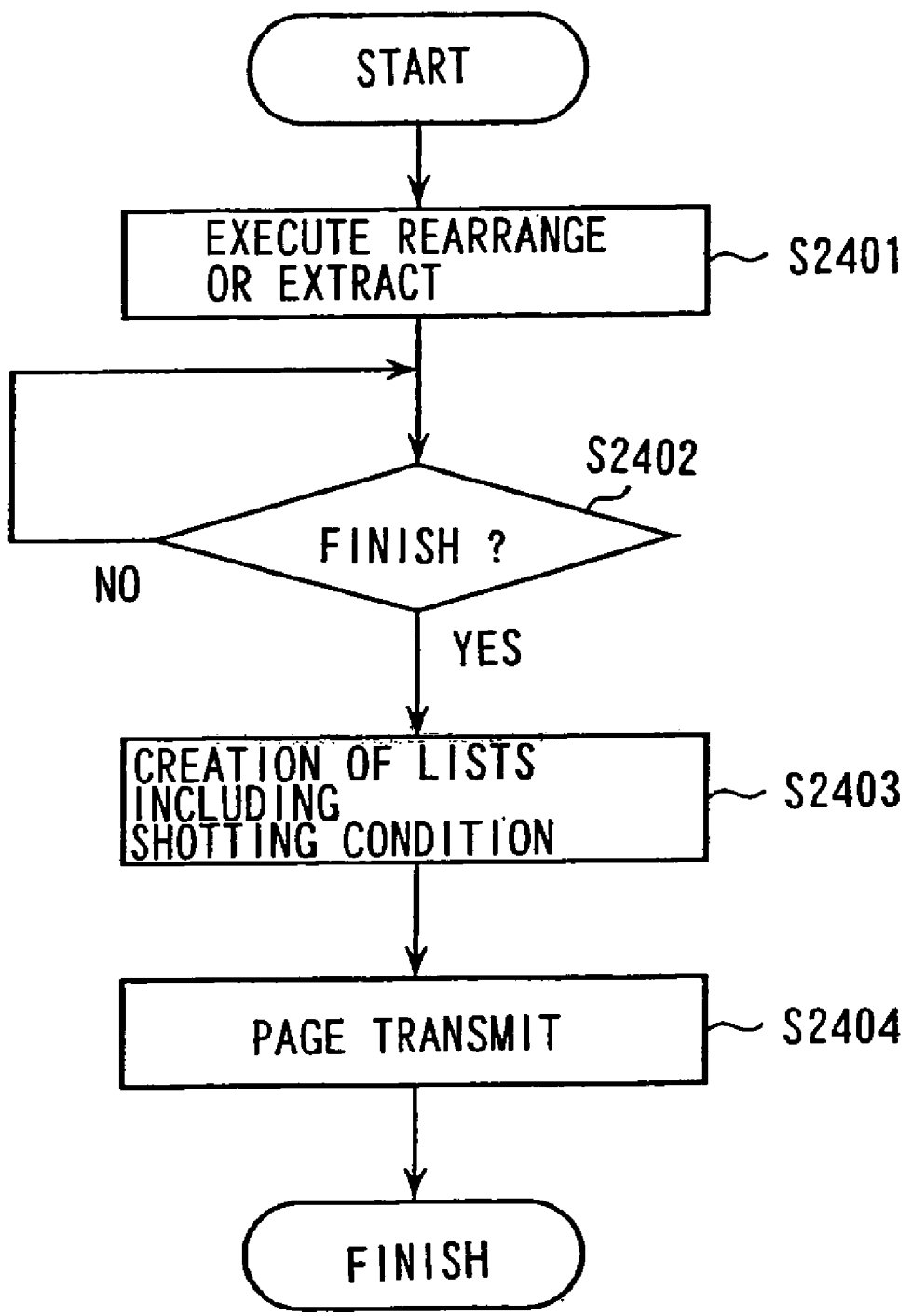
FIG. 48 represents a flow chart explaining how an album list creation is processed.

FIG. 48 represents a flow chart explaining how a creation of a list of an album is processed by the server of the service provider. A process of FIG. 48 starts when the manager clicks on execute button 47E. In step S2401, the server executes the rearrangement and extraction according to a condition of as elected pull-down menu and proceeds to step S2402. In step S2402, the server judges whether or not a process of the rearrangement and extraction is finished. The server gives a positive judgment to step S2402 when the process is finished and proceeds to step S2403, but when the process is not finished, the server gives a negative judgment to step S2402 and a process of the judgment is repeated.

In step S2403, the server creates a page screen of a list of an album and proceeds to step S2404. In step S2404, the server transmits data of the page screen to a terminal of the manager and a process of FIG. 48 is finished. Thus, a management screen as shown in FIG. 47 is displayed on the terminal of the manager.

When, for instance, the manager clicks on underlined "Mt. Fuji" in an album name on the management screen of FIG. 47 browsed on the terminal of the manager, image data stored onto the album name "Mt. Fuji" is read out and a thumbnail image is displayed on a monitor of the terminal of the manager. The thumbnail image is a contracted image of original image data being contracted, for example, by eliminating some of original image data and the like. FIG. 49(a) represents the thumbnail created by image data stored onto the album name "Mt. Fuji". In FIG. 49(a), ten images stored onto the album, that is, six images 1~6 out of image data of images 1~10 are displayed as thumbnails 1~6. When an image is titled, the title of each image is displayed beneath each thumbnail image.

When the manager clicks on, for instance, thumbnail image 1 while the thumbnail images represented in FIG. 49(a) are displayed, and a larger image created by image data of image 1 than the thumbnail image is displayed on the monitor of the terminal of the manager. At this time, a picture-taking condition such as a camera in use, an aperture number, a shutter speed, a speed light, an exposure compensation value and so and information of whether or not an image is displayed in a bulletin board to be explained later are displayed together with the image. Information of the picture-taking condition and whether or not the image is displayed in the bulletin board registered in the album is information that is displayed on the management screen for the manager and that is not transmitted to a terminal of a service user. Namely, what a service user can browse is only a title that is attached to an image put on view and the image put on view.

—Preferred Service of a Memory Size for an Album and a Period of Use to a Service User with a Customer Registration—

As shown in FIG. 1, an album server is a server that performs the album service different from a server responsible for another services. Thus, membership information necessary for the album service, for example, information such as a login name, a photo mail address, a service flag and additional service flag and the like is stored even in an album service server. The service flag is a flag that is turned on when a member has recorded a customer registration.

Figure 50:
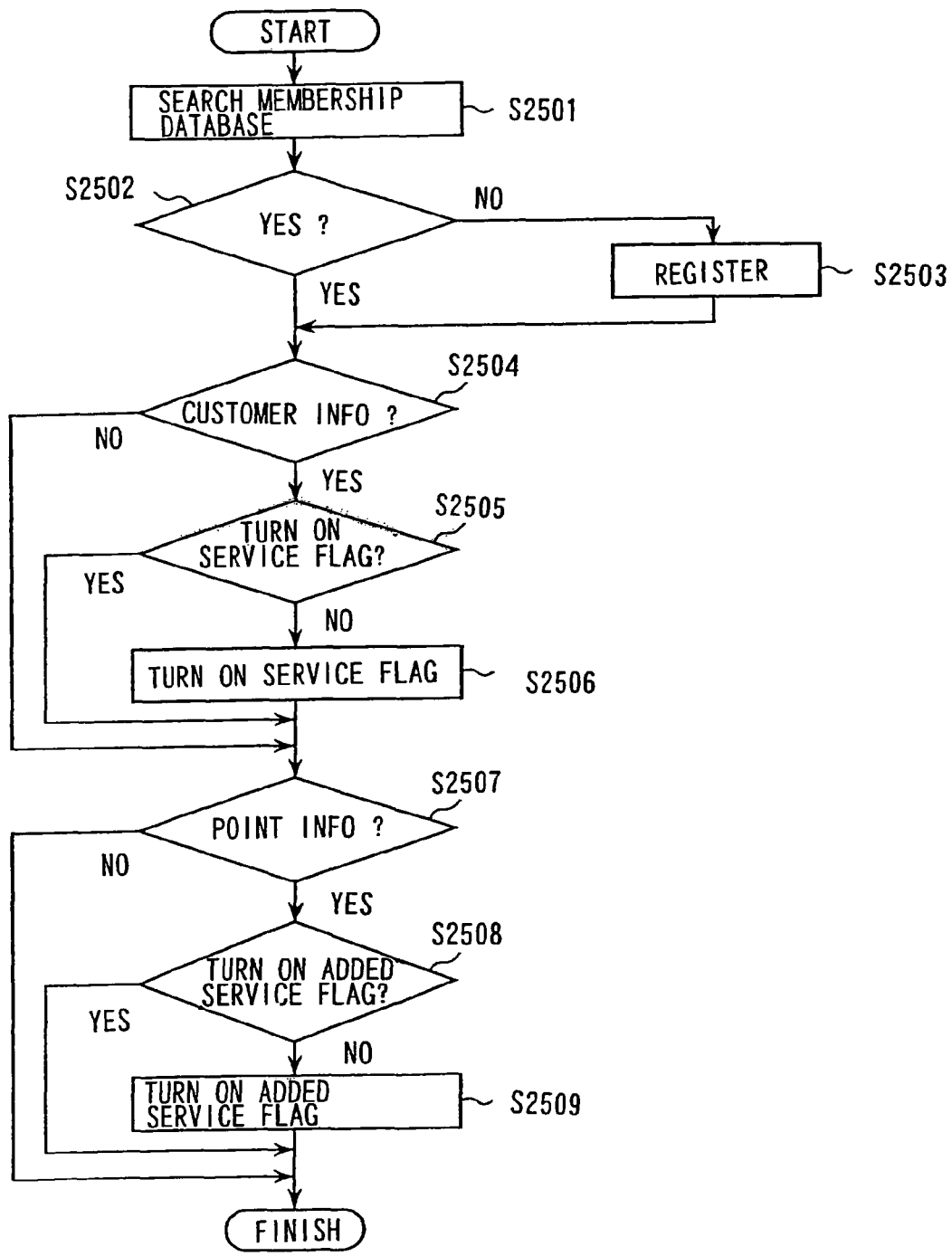
FIG. 50 represents a flow chart explaining a preferred treatment.

FIG. 50 represents a flowchart explaining how a preferred service is processed by the server of the service provider. A process of FIG. 50 starts up when a service user logs in through a top page screen of on-line album 5.

In step S2501 of FIG. 50, the server accesses a database in the album service server and searches for membership information and proceeds to step S2502. In step S2502, the server judges whether or not there is logged-in membership information. The server gives a positive judgment to step S2502 when there is information, but when there is not, the server gives a negative judgment to step S2502 and proceeds to step S2503. In step S2503, the server registers membership information onto a database in the album service server and proceeds to step S2504.

In step S2504, the server judges whether or not the server receives data indicative of a service user having recorded a customer registration when an album printout service is logged in. The server gives a positive to step S2504 when data indicative of the registered customer is received and proceeds to step S2505, but when data is not received, the server gives a negative judgment to step S2504 and proceeds to step S2507. In step S2505, the server judges whether or not a service flag in membership information is ON. The server gives a positive judgment to step S2505 when the service flag is ON and proceeds to step S2507, but when the service flag is not ON, the server gives a negative judgment to step S2505 and proceeds to step S2506. In step S2506, the server turns the service flag ON and proceeds to step S2507.

The server gives preferred treatment to a service user whose service flag is ON, for instance, with an increase of an album memory size to a 100 MB from a standard 50 MB and an extended period of use to an indefinite period from a one-year period.

In step S2507, the server judges whether or not the server receives data indicative of point information when logging in the album printout service. Point information is information that relates to a point addition when the point is selected on a gift selection page screen at the completion of the customer registration. This point is also added when an answer is displayed in a bulletin board to be explained later. The server gives a positive judgment to step S2507 when data was received, but when data was not received, the server gives a negative judgment to step S2507 and a process of FIG. 50 is finished.

In step S2508, the server judges whether or not an extended service flag of is ON. The server gives a positive judgment to step S2508 when the extended service flag is ON and a process of FIG. 50 is finished, but when the extended service flag is not ON, the server gives a negative judgment to step S2508 and proceeds to step S2509. In step S2509, the server turns ON the extended service flag and a process of FIG. 50 is finished.

The server gives preferred treatment to a service user whose extended service flag is ON, for example, with an increase in an album memory size by further 50 MB.

According to foregoing process of FIG. 50, the extended service flag is turned ON unconditionally to a service user with points, in other words, an album memory size is enlarged further by 50 MB. Instead, in exchange for turning ON the extended service flag, the points owned by the service user may be reduced. When the points owned by the service user is traded for preferred treatment provided by the service provider, in addition to enlarging the album memory size as preferred treatment, the printout service may be made free of charge.

—Make a File Name of Image Data to be Registered onto an Album Random—

Figure 51:
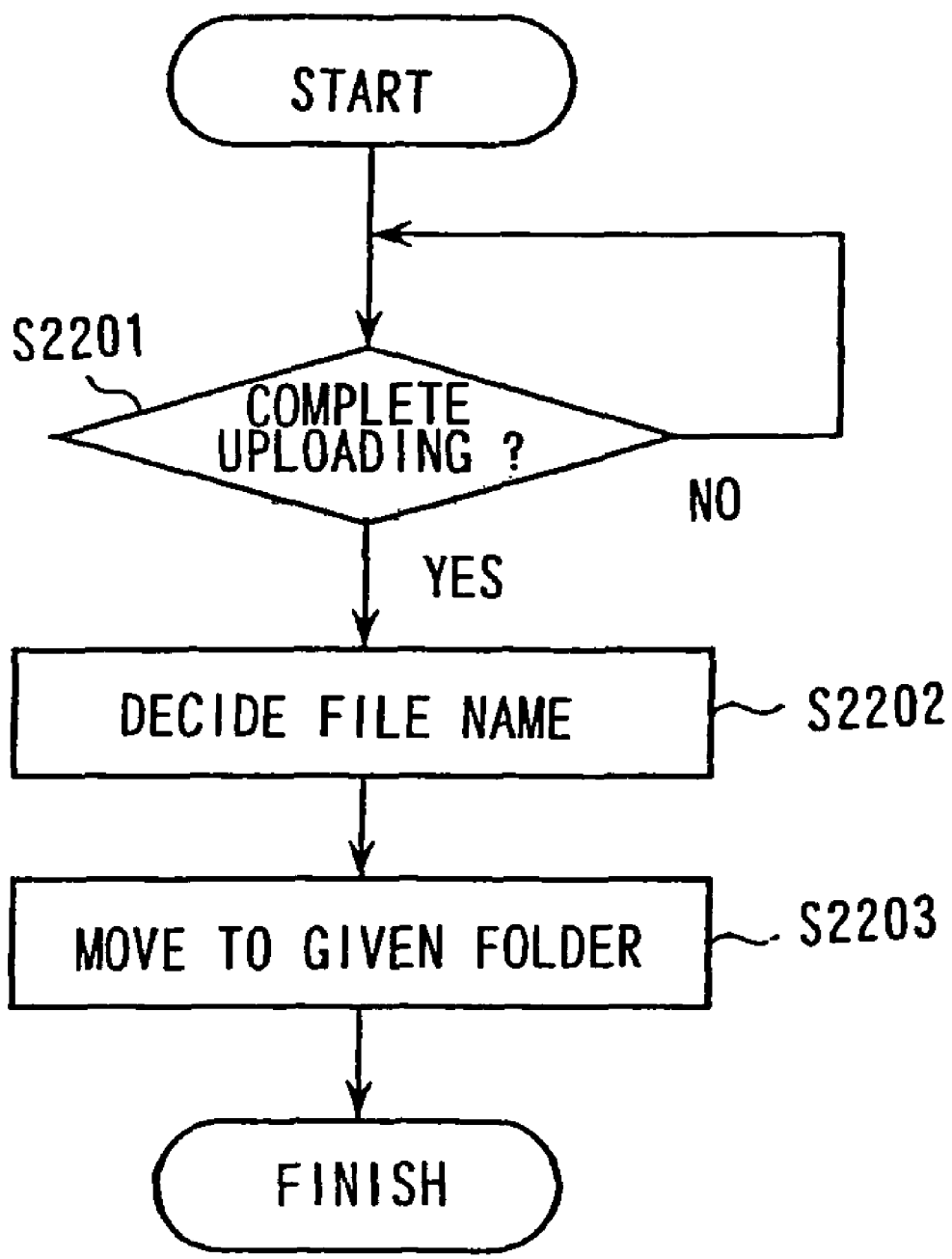
FIG. 51 represents a flow chart explaining a process of deciding a file name.

For example, when a file name of image data at an image registration onto the album is given with a consecutive number, once one of image data file names is known, it becomes easy to guess a file name of another image data. The album service server, when image data to be registered onto an album is uploaded to the server from a service user, renames the file of this image data and registers the renamed file onto a data storage area. FIG. 51 represents a flow chart explaining how a process to decide a file name is performed by the server of the service provider.

A process of FIG. 51 starts up when a service user begins to upload registered image.

In step S2201, the server judges whether or not an upload of data of one image file is completed. The server gives a positive judgment to step S2201 when the upload is completed and proceeds to step S2202, but when the upload is not completed, the server gives a negative judgment to step S2201 and a judgment process is repeated until the upload is completed. In step S2202, the server decides a file name of the uploaded image data at random and proceeds to step S2203.

To decide a file name, a technology of a known onetime password is used. The server creates a file name as a parameter of, for example, a time when this image file is uploaded. Thus, even when the image data file is successively uploaded, as an uploaded time of each image data file is different, the all-different file names are created against these image data files. Accordingly, a random filename that cannot be guessed from a file name of another image data registered onto the album is decided.

In step S2203, the server transfers the image data file that was uploaded and given a random filename to a predetermined folder in response to a service user and a process of FIG. 51 is finished.

In a process of FIG. 51, when a plurality of image data are registered onto an album, a file name that can not guess another file name each other is given to these image data files. As a result, it does not take place that, once any of image data of an album is opened, a file name of another image data is guessed from an opened file name of image data of the album and private image data with the guessed file name is read out.

According to the album printout service performed by content of the foregoing embodiment, a following effect will be available.

(1) When a service user registering an album has no service use record for a given period, data stored onto a data storage area for an album lent to the service user is deleted. As a result, this data storage area can be lent to another service user, so the data storage area can be used efficiently.

(2) Even if a service user registering the album has not used the album service, this album cannot be deleted by another service user while the album is put on view and browsed. Thus, the service provider can secure a prospective service user that aims at an album put on view.

(3) The service provider classifies an album registered by a service user into a category and has registered image data viewed per the category. Thus, it becomes possible to monitor a specific category intensively in which images against public decency converge.

(4) Based upon data of picture-taking information recorded onto image data registered onto an album, information of a picture-taking condition such as a camera, an aperture number, a shutter speed, a speed light and an exposure compensation that shot this image and of whether or not the image is carried in a bulletin board is displayed on the terminal of the manager. If a lot of registered albums are scrutinized, for instance, information about what picture-taking condition is preferred by a service user may be obtained, so obtained information may be useful in developing a new camera.

(5) Preferred treatment is given to a service user that has recorded a customer registration with a larger memory size (memory capacity) of an album data storage area than a normal size and an extended period of use. Thus, the service user may be urged to record the customer registration.

(6) Even when an image data file to be registered onto an album is uploaded successively, a completely different random file name is given to each image data file. Thus, it may be prevented that a file name of another image data is guessed from the file name of image data put on view and private image data is browsed.

In the rearrangement of a display of a list of an album, the rearrangement or extraction is performed per the album. If an image is registered per image data, not using a concept of an album, the rearrangement and extraction may be performed per this image data.

—Bulletin Board—

Figure 52:
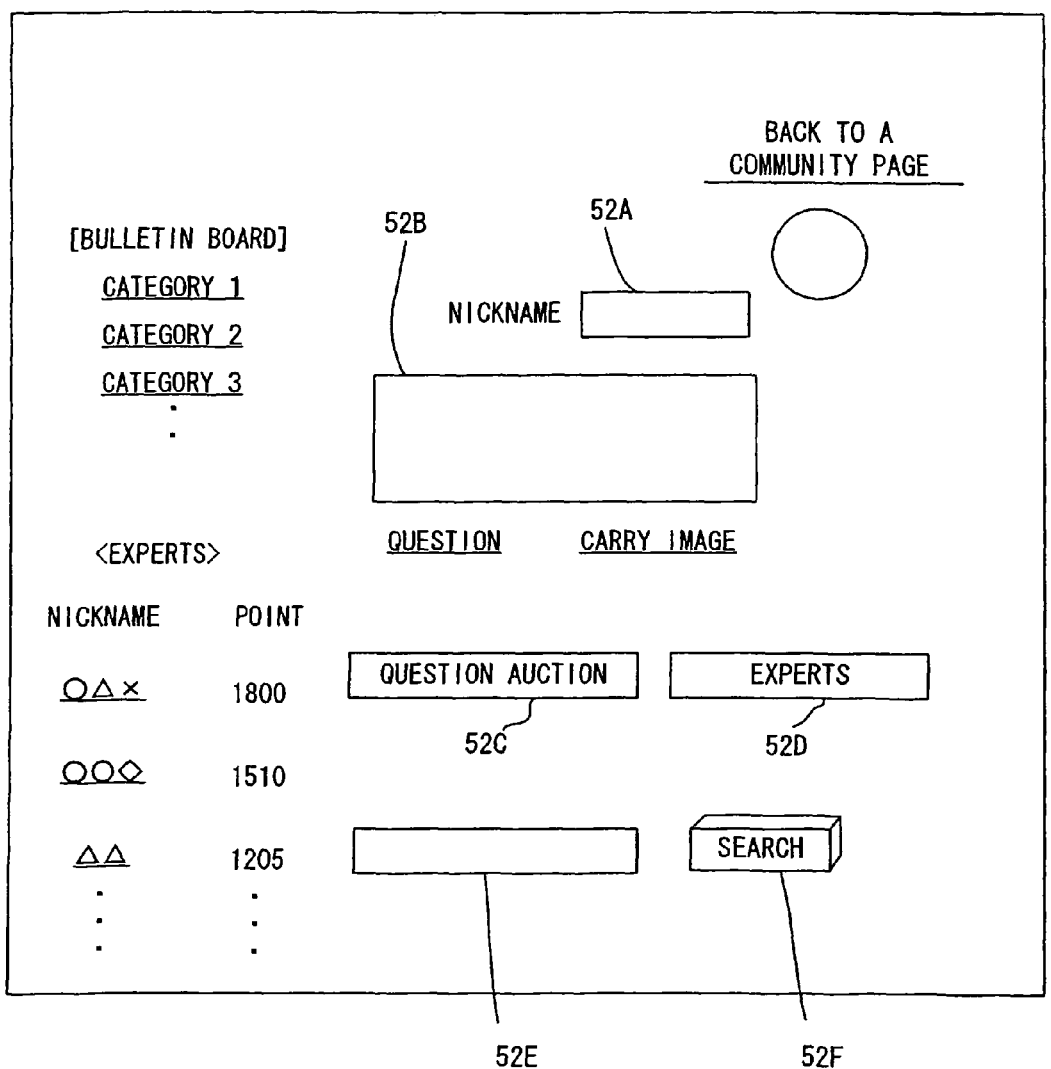

A service user clicks on link button 71 linked to a page of a "Bulletin board" on a category page screen of community 7 in FIG. 5, and a top page screen of a "Bulletin board" (not shown) is displayed on a monitor of a terminal. A service user logs in through the top page screen, and then a page screen as shown in FIG. 52 is displayed on a monitor of a terminal. A service use of the bulletin board is not available until a service user that has recorded a web use membership registration logs in by keying a login name and password. This bulletin board is also called as an electronic bulletin board.

In the bulletin board service, a question posed by a service user is open to service users and answerable by another service user that views the question in the bulletin board. A service user poses a question in the bulletin board using a nickname and an answer is displayed in the bulletin board with the nickname. There are two kinds of the bulletin board service; "Listen to in a question auction" that a questioner solicits answers widely from indefinite web service members and "Listen to an expert" that the questioner solicits an answer from an expert. A service user clicks on any of either button 52C corresponding to "Listen to in a question auction" or button 52D corresponding to "Listen to an expert" and selects any of them. An expert means a member that has answered the question displayed in the bulletin board.

An expert answers the question displayed in the bulletin board, and a point moves to the expert answering the question from the member displaying the question in the board. More specifically, the expert reads the question and writes the answer in the bulletin board, and then the point moves when the questioner reads out the answer written in the bulletin board. The point is usable as remuneration for the answer. As for this point, the point that has been explained as a gift of the customer registration can be used. The server lays a question open to a member of a web service use when content written in the board is made available to an indefinite member and in the event that the content in the bulletin board is aimed at a specific member, the specific member can read it out by entering a password.

At a left lower part of a screen shown in FIG. 52, a nickname of an expert is viewed with gained points. An expert that has many gained points indicates that the expert has answered many questions. When any of underlined "Category 1", "Category 2", "Category 3" and the like is clicked on, a list of experts in relation to a question belonging to each category is displayed in gained points order. That is, a nickname of an expert is classified per each question and the classified nickname is managed. When an underlined "○ Δ X" of a nickname of an expert is clicked on, a page screen (e.g. FIG. 63) introducing the expert is displayed on a monitor of a terminal. A questioner can decide a specific expert belonging to a question by referring to information about an expert like FIG. 63.

When a questioner poses a question to a specific expert in the bulletin board, button 52D and a category falling under the question are clicked on, the questioner transmits the question designated for the specific expert selected from an expert list to the server. When a questioner uses "Listen to in a question auction", the questioner clicks on button 52C and a category belonging to a question and transmits the question to the server. When transmitting the question to the server, a nickname is entered into nickname box 52A and the question is written into question box 52B and underlined "Pose a question" is clicked on, and then data of the question is transmitted from a terminal of the questioner (the service user) to the server.

According to a bulletin board service of this embodiment, the service provider provides a following service to a service user.

—Place an Image Registered onto an Album in the Bulletin Board—

An image placed in the board could make things more easily understood than letters only in the bulletin board. In FIG. 52, when a questioner (a service user) clicks on underlined "Place an image", an image in an album registered by the questioner (the service user) can be placed in the bulletin board by being attached to a question. It should be noted that an image to be placed is the image that is put on view, not private one. Also, in addition to the image that a questioner has registered, an image to be placed with a question may be a registered image that another service has put on view.

If image data is placed in the bulletin board as it is, an amount of data stored onto the bulletin board server upsurges and data for the bulletin board gets full so rapidly. Therefore, this bulletin board service of this embodiment creates a thumbnail image with a contracted data size in comparison to original image data registered in an album and this thumbnail image is placed in the bulletin board.

Figure 53:
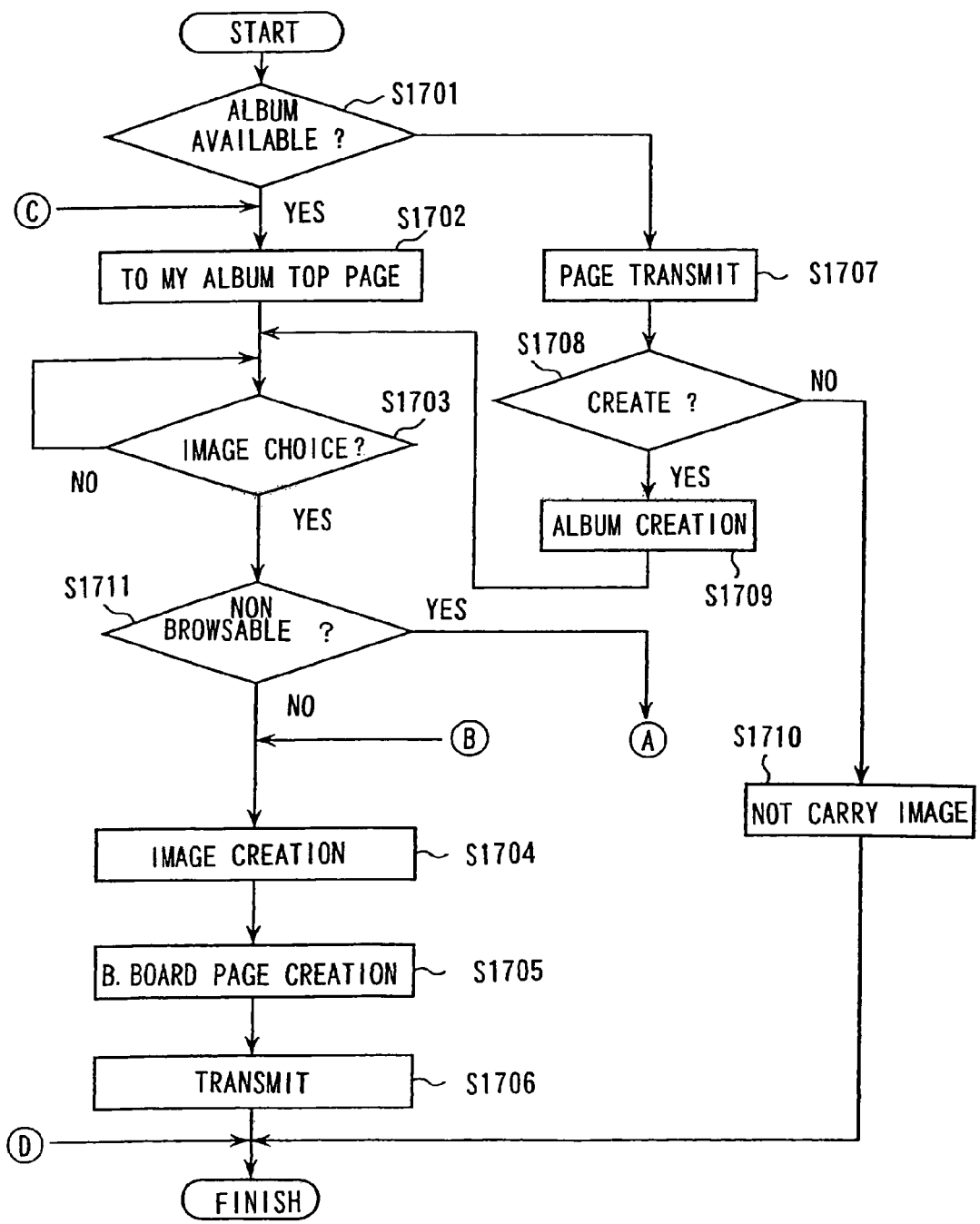
FIG. 53 represents a flow chart explaining how a process of carrying a thumbnail image in the board is performed.
Figure 54:
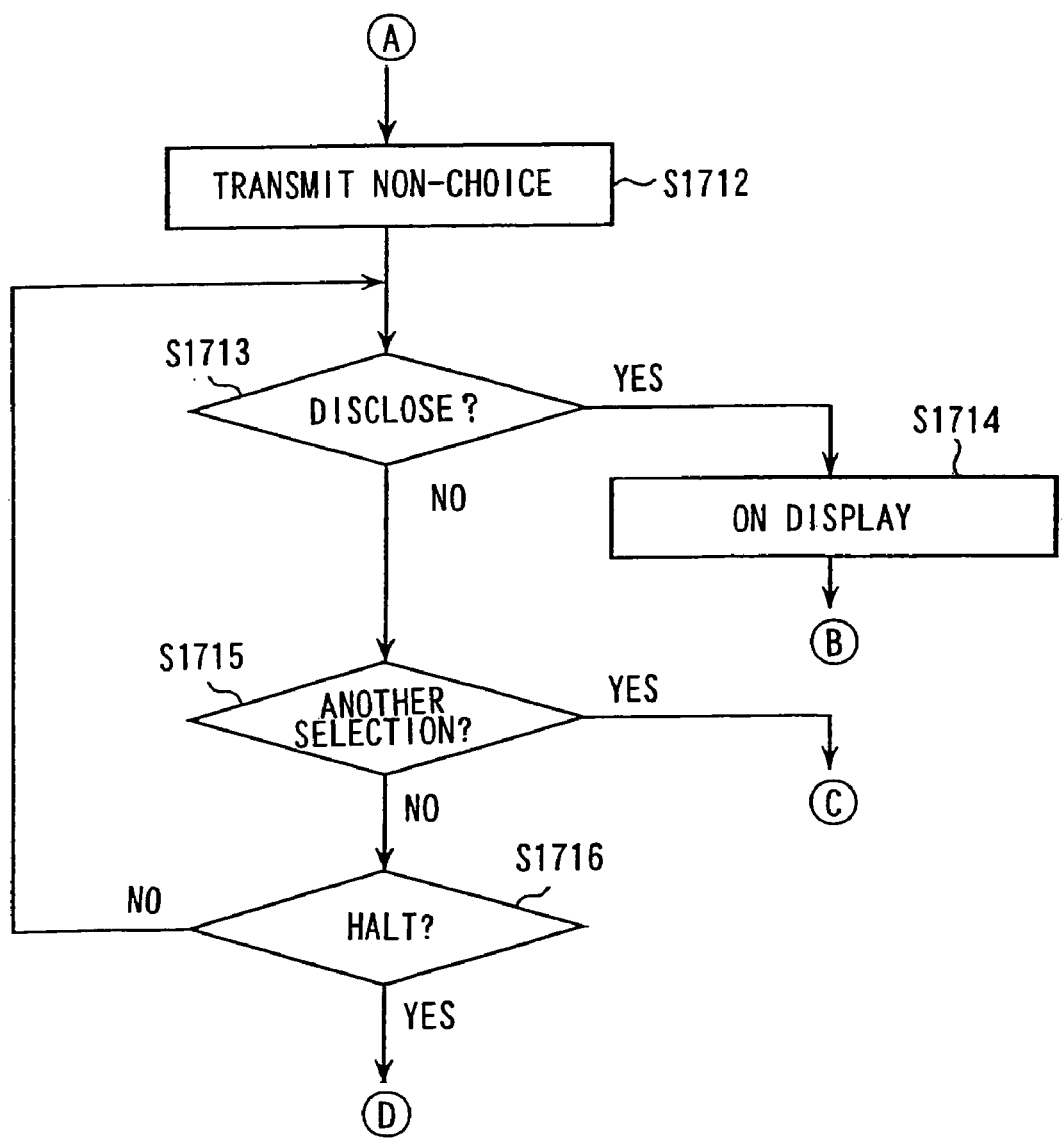
FIG. 54 represents a flow chart explaining how a process of carrying a thumbnail image in the board is performed.

FIGS. 53 and 54 represent a flow chart explaining how a thumbnail image is processed to be placed in the board by the server of the service provider. Processes of FIGS. 53 and 54 start up when a questioner (a service user) clicks on "Place an image" on a screen of FIG. 52. In step S1701 of FIG. 53, the server judges whether or not a login service user has an album. The server gives a positive judgment to step S1701 when the service user has registered the album and proceeds to step S1702, but when the service user has not, the server gives a negative judgment to step S1701 and proceeds to step S1707.

In step S1702, the server reads out image data of the album (thereafter referred to my album) that the service user has registered and proceeds to step S1703, creating data of a top page screen (not shown). Data of the created top page screen is transmitted to a terminal of the service user and the top page screen of my album is displayed on the terminal of the service user. This top page screen displays, for example, a thumbnail created by image data in my album and a title as shown in FIG. 49(*a*). The service user clicks on a thumbnail image that the service user wants to place in the bulletin board.

In step S1703, the server judges whether or not an image in my album is selected. The server gives a positive judgment to step S1703 when a thumbnail image is clicked on and proceeds to step S1711, but when the thumbnail image is not clicked on, the server gives a negative judgment to step S1703 and a judgment process is repeated. In step s1711, the server judges whether or not the selected image is private. When the selected image is set to be private, the server gives a positive judgment to step S1711 and proceeds to step S1712 of FIG. 54, but when the image is set to be put on view, the server gives a negative judgment to step S1711 and proceeds to step S1704.

In step S1704, the server creates image data of the thumbnail selected by a clicked operation and a larger middle-sized image data than image data of the thumbnail with regard to a data size and stores them onto a predetermined image folder in a bulletin board server respectively. The image folder where thumbnail image data and middle-sized image data are stored respectively is provided separately from a storage area storing data of writing into the bulletin board and an album data storage area storing image data (original data) of my album. The server stores thumbnail image data and middle-sized image data respectively, and proceeds to step S1705.

In step S1705, the server creates a bulletin board page screen embedding link information (information about a storage location in the image folder) of the selected image and proceeds to step S1706. Due to link information, a question and the selected thumbnail image are displayed all together in question box 52B of FIG. 52. Link information is further embedded to the bulletin board page screen in such a way that, when the thumbnail image displayed in question box 52B is clicked on, the server displays an image created by middle-sized image data. And further, when a middle-sized image is clicked on in a state of the image created by middle-sized data being on display, link information is embedded to the bulletin board page screen in such a way that the server displays an image created by image data (original data) of my album.

In step S1706, the server transmits data of the bulletin board page screen embedding link information as explained before to the terminal of the service user and a process of FIG. 53 is finished. Accordingly, a screen carrying the thumbnail image as shown in FIG. 52 is displayed on a monitor of the terminal. In this state, when the questioner clicks on (the service user) underlined "Pose a question", data of the question is transmitted from the questioner (the service user) to the server.

When other service user views the question displayed in the bulletin board through a terminal, link information linked to the thumbnail image data is included in data of the question, so the thumbnail image is displayed with the question. And then, when the thumbnail image is clicked on through a screen of the terminal, an image created by middle-sized image data is displayed and, when the image created by middle-sized image data is clicked on, an image created by image data (original image) of my album is displayed on the screen of the terminal respectively.

In step S1707, the server conveys to the terminal of the service user that the album has not been registered and creates page screen data including a message urging to register the album and then proceeds to step S1708 after transmitting data to the terminal of the service user. In step s1708, the server judges whether or not an instruction to create the album is received. The server gives a positive judgment to step S1708 when data indicative of the instruction to register an image of an album is received and proceeds to step S1709, but when data is not received yet, the server gives a negative judgment to step S1708 and proceeds to step S1710.

In step S1709, the server processes an album registration by uploading registered image data of the service user and proceeds to step S1703. In step s1710, the server creates page screen data notifying that an image cannot be displayed in the bulletin board and transmits data to the terminal of the service user and a process of FIG. 53 is finished.

Figure 55:
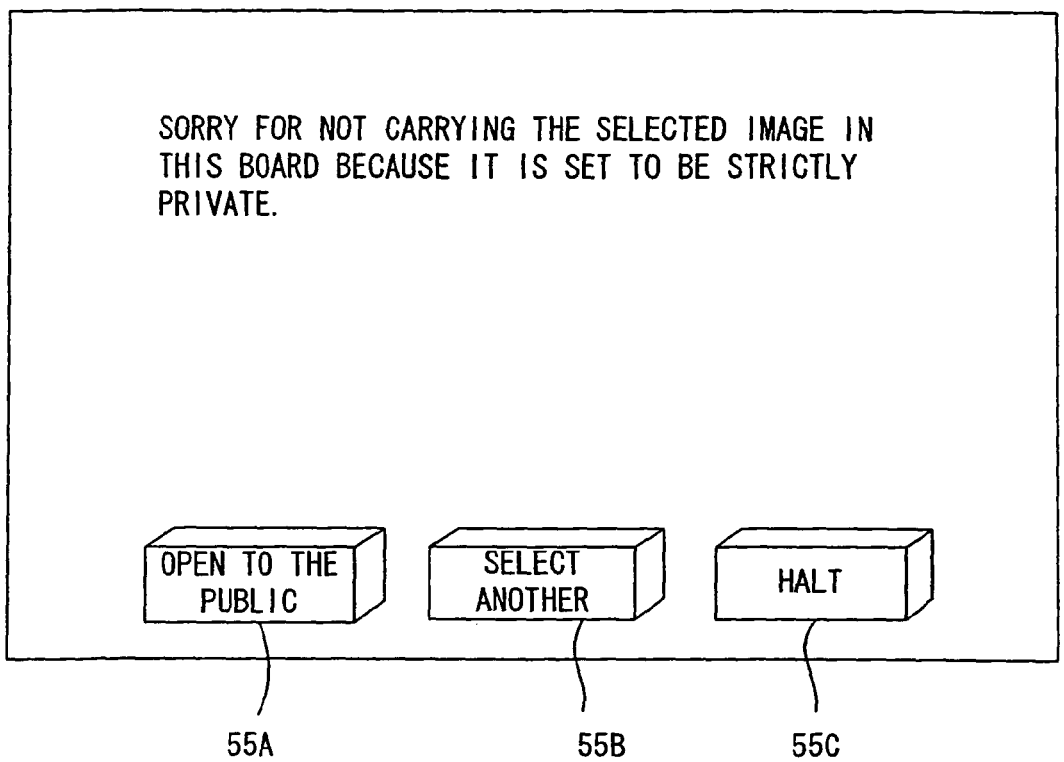
FIG. 55 represents a screen notifying that a selected image cannot be displayed.

In step S1712 of FIG. 54, the server creates page screen data including the message notifying that the image cannot be displayed in the bulletin board and transmits data to the terminal of the service user and then proceeds to step S1713. Accordingly, a page screen as shown in FIG. 55 is displayed on the monitor of the terminal of the service user. The service user can choose any of following three processes.

1. Click on "Put on view" button 55A on the screen of FIG. 55 and display an image in the board, putting the image on view.
2. Click on "Another choice" button 55B and display another image put on view in the board.
3. Click on "Halt" button 55C, and halt to display an image in the board.

In step S1713, the server judges whether or not "Put on view" button 55A is clicked on. The server gives a positive judgment to step S1713 when button 55A is clicked on and proceeds to step S1714, but when button 55A is not, the server gives a negative judgment to step S1713 and proceeds to step S1715. In step S1714, the server sets the selected image to be put on view and proceeds to step S1704 of FIG. 53.

In step S1715, the server judges whether or not "An other choice" button 55B is clicked on. The server gives a positive judgment to step S1715 when button 55B is clicked on and gets back to step S1702 of FIG. 53, but when button 55B is not, the server gives a negative judgment to step S1715 and proceeds to step S1716.

In step s1716, the serve judges whether or not "Halt" button 55C is clicked on. The server gives a positive judgment to step s1716 and processes of FIGS. 53 and 54 are finished, but when button 55C is not, the server gives a negative judgment to step S1716 and gets back to step s1713.

Processes of FIGS. 53 and 54 enables the questioner to display an image registered onto an album in the bulletin board. More specifically, smaller thumbnail image data than original image data in a data size is created from the original image registered onto the album and thumbnail image data is stored onto a folder, but not the bulletin board server nor a data storage apparatus for the album and link information about a storage folder of the thumbnail image is caused to be embedded to the question to be written into the bulletin board. As a result, image data is not stored onto the bulletin board server, so a workload on the server can be held down. And further when the original image of the album is deleted, it is possible to keep on carrying an image in the bulletin board by means of thumbnail image data.

In the foregoing explanation so far, thumbnail image data is stored onto the image folder different from the storage area of writing data into the bulletin board and the data storage area for the album and link information about an image folder storing the thumbnail image is caused to be embedded to the question to be written into the bulletin board. Instead, thumbnail image data may be stored onto the storage area of writing data into the bulletin board with the question. Even in this case, when compared to copying and storing original image data onto the storage area of writing data into the bulletin board, a workload on the bulletin board server can be held down.

In the meanwhile, link information to the original image of the album is only embedded to the question to be written into the bulletin board, not by creating thumbnail image data at the beginning and then thumbnail image data is created when original image data is deleted and stored onto the image folder different from the storage area of writing data into the bulletin board and the data storage area for the album and link information embedded to the question may be rewritten so as to be linked to the image folder.

Figure 56:
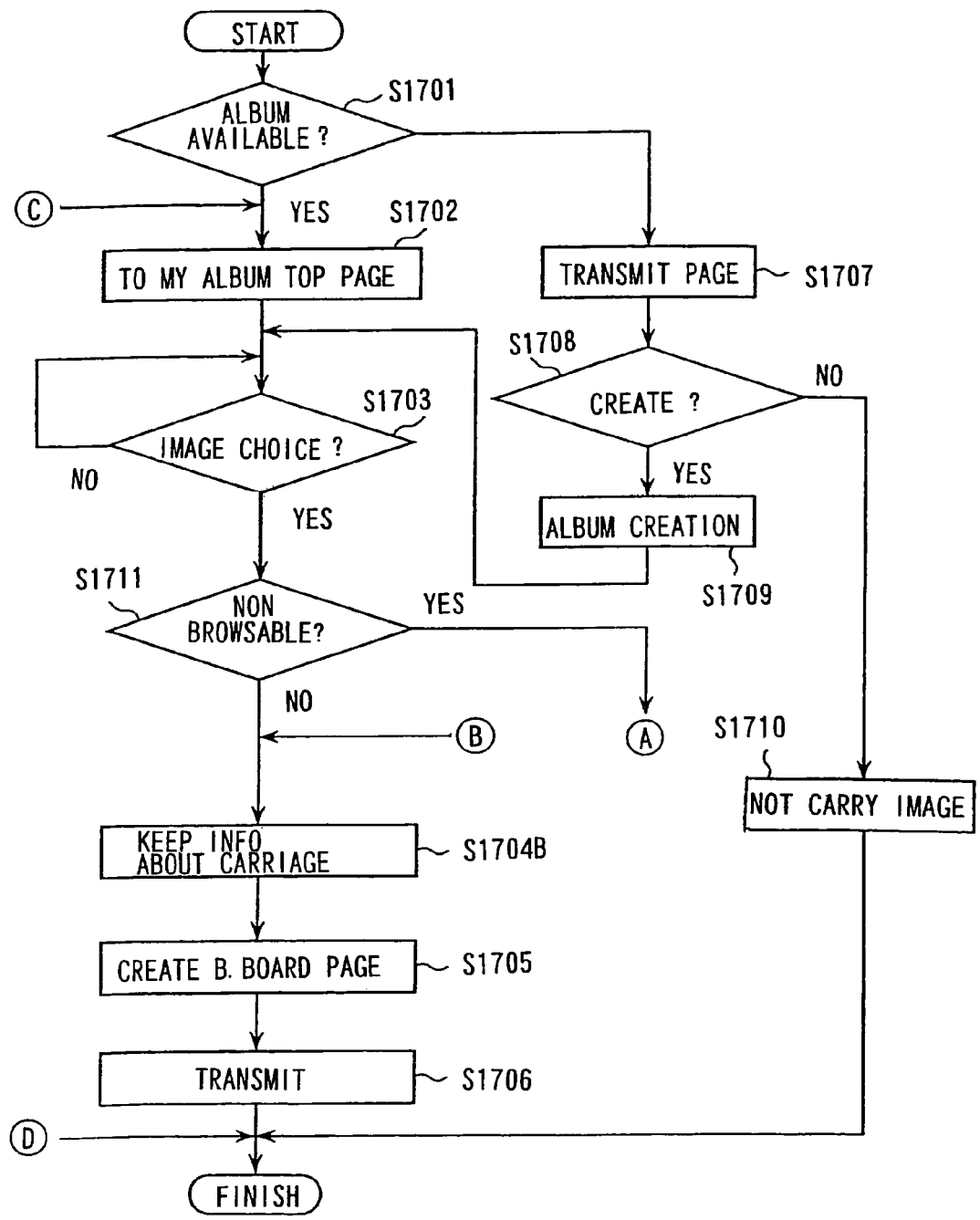
FIG. 56 represents a flow chart explaining how a process of carrying a thumbnail image in the board is performed.
Figure 57:
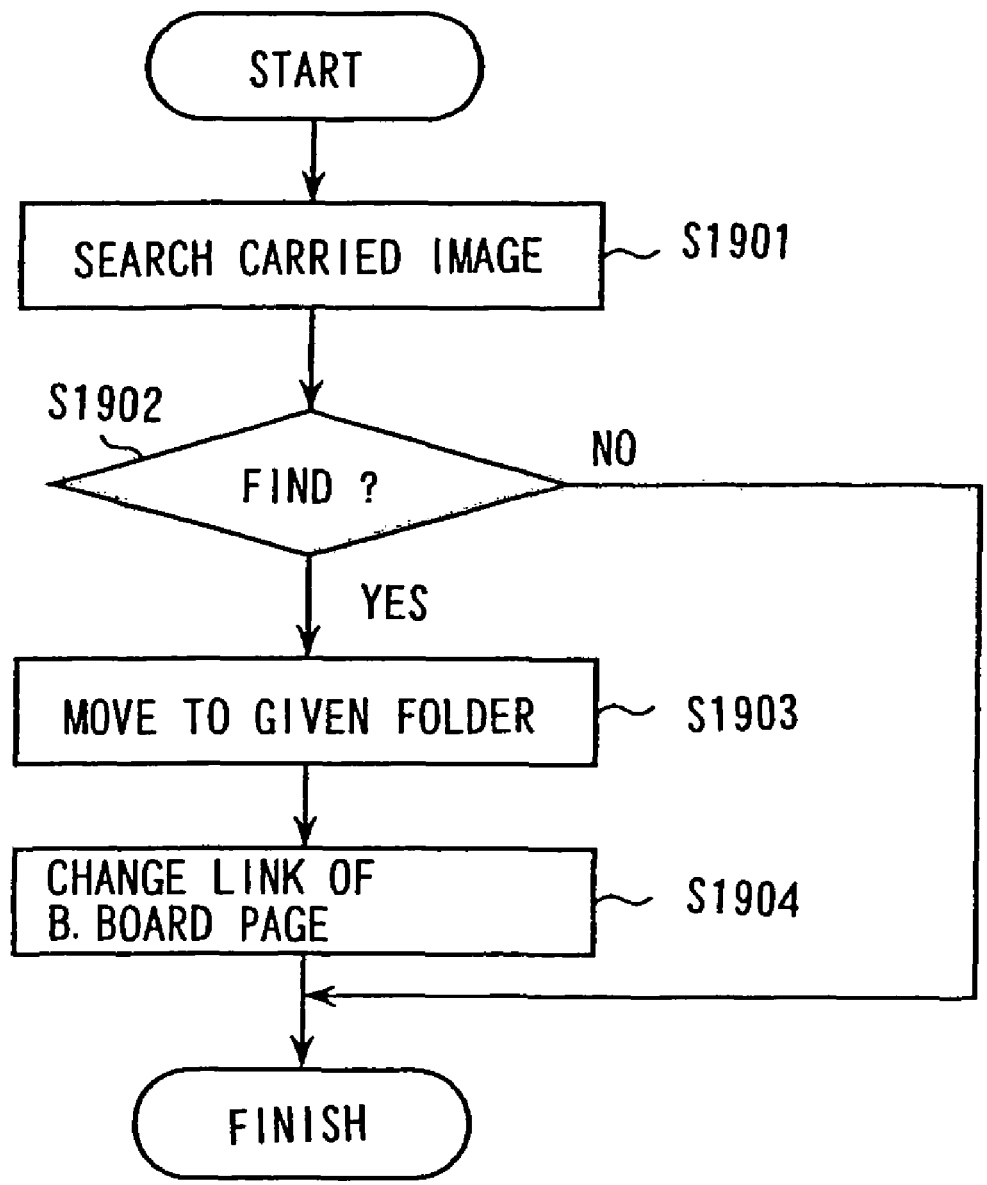
FIG. 57 represents a flow chart explaining how a process of carrying a thumbnail image in the board is performed.

FIGS. 56 and 57 represent a flow chart explaining a processing flow of the foregoing.

As a process of step S1704 in FIG. 53 is changed to one of step S1704B, a process of FIG. 56 refers to step S1704B only. In step S1704B of FIG. 56, the server proceeds to step S1705, adding image data (original data) of my album corresponding to thumbnail image data selected by a click on operation to information indicative of the thumbnail image being displayed in the bulletin board. The added information may be appended to a header in original image data or stored onto my album in a state of corresponding to this original image data.

A process of FIG. 57 starts when the server receives an instruction to delete my album or original image data stored onto my album. In step S1901 of FIG. 57, the server detects that image data to be deleted is displayed in the bulletin board and proceeds to step S1902. In step S1902, the server judges whether or not image data to be deleted is displayed in the bulletin board. The server gives a positive judgment to step S1902 when information indicative of image data being displayed in the board is added to image data and proceeds to step S1903, but when information indicative of image data being displayed in the board is not, the server gives a negative to step S1902 and a process of FIG. 57 is finished.

In step S1903, the server creates thumbnail image data of data size of this image data being contracted and larger middle-sized image data than thumbnail image data in a data size respectively and stores these two image data onto a predetermined image folder together with this image data. In step S1904, the server changes link information of image data embedded to the bulletin board page screen from information indicative of a link to my album (original data) to information indicative of a link to the image folder (thumbnail image data, middle-sized image data) and a process of FIG. 57 is finished. Accordingly, even when original image data of my album is deleted, an image displayed in the bulletin board is hold on by thumbnail image data stored in the image folder.

—Cause the Category of a Question in the Bulletin Board to be Identical with One of an Album—

A category on a page screen of on-line album 5 as shown in FIG. 43 is caused to be identical with a category on a page screen of the bulletin board as shown in FIG. 52. For example, the album has the category such as "Landscape", "Night scene", "Portrait" and so on. Further, this category "Landscape" is subcategorized into "Hokkaido", "Tohoku", "Kanto" and the like. In this case, the category of the bulletin board is classified into, for example, a category "Shooting information" and a subcategory "Hokkaido", "Tohoku" and so.

FIG. 58(a) represents an example of a page screen displaying a question classified as "Shooting information"-"Hokkaido" in the bulletin board. FIG. 58(a) displays the category "Shooting information" and the subcategory "Hokkaido", "Tohoku", "Kanto" and so on towards the left side on the screen. At the center of the screen, several questions classified into "Hokkaido" are displayed orderly. What an expert answers the question is represented by a number of an answer against the question at the right side of the screen. At the upper right position, information about a link to on-line album 5, information about a link to a page of a category "Landscape" in the album and a subcategory "Hokkaido" in the album are embedded respectively.

When the service user clicks on underlined "Album", a top page screen of on-line album 5 is displayed on a monitor of a service user's terminal. Also, when the service user clicks on underlined "Landscape", a page screen of a category "Landscape" in the album is displayed on the monitor of the terminal. And further, when the service user clicks on underlined "Hokkaido", a page screen of a subcategory "Hokkaido" in the album is displayed on the monitor of the terminal.

FIG. 58(b) represents an example of a page screen displaying an image created by image data registered onto the album classified into "Landscape"-"Hokkaido" in on-line album 5. FIG. 58(b) displays a category "Landscape" and subcategory "Hokkaido", "Tohoku", "Kanto" and so on towards the left side on the screen. At the center, images that are created by image data classified into "Hokkaido" are displayed in order. At the upper right position, information about a link to a top page of the bulletin board, information about a link to a category "Shooting information" page of the bulletin board and information about a link to a subcategory "Hokkaido" page of the bulletin board are embedded respectively.

When the service user clicks on underlined "Bulletin board", a top page screen of the bulletin board is displayed on a monitor of a service user's terminal. Also, when the service user clicks on underlined "Shooting information", a page screen of a category "Shooting information" in the bulletin board is displayed on the monitor of the terminal. And further, when the service user clicks on underlined "Hokkaido", a page screen of a subcategory "Hokkaido" in the bulletin board is displayed on the monitor of the terminal.

It is supposed that if the service user views an image on a "Hokkaido" page in the album and finds out a favorite image, the service user wishes to know more about where, when and how this image was photographed in Hokkaido. In this case, the category of a question in the bulletin board is in agreement with one of the album and link information is also embedded, so the service user can easily view the corresponding pages displayed in the bulletin board without fail.

—Display a Category of the Bulletin Board Falling Under an Entered Name of a Place—

Figure 59:
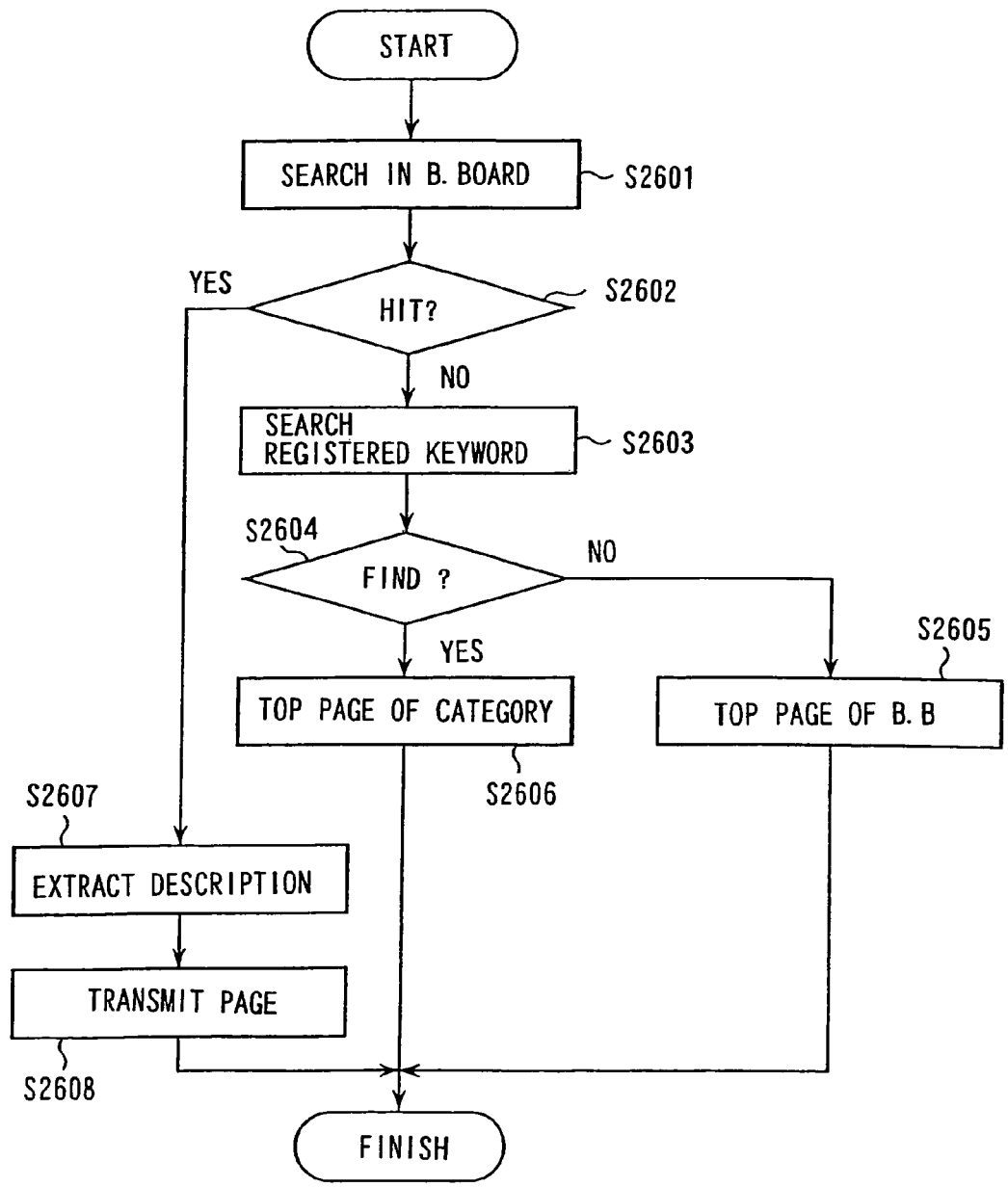
FIG. 59 represents a flow chart explaining how a search command is processed.

FIG. 59 represents a flow chart explaining how a search command is processed by the sever of the service provider. A process of FIG. 59 starts up when search button 52F is clicked on through a page screen of the bulletin board as shown in FIG. 52. A service user enters a search word into search word box 52E and clicks on search button 52F.

In step S2601 of FIG. 59, the server searches for a word fitting into the search word among all writings entered in the bulletin board and proceeds to step S2602. In step s2602, the server judges whether or not there are any of writings that fit into the search word. The server gives a positive judgment to step S2602 when there are any of writings fitting into the search word and proceeds to step S2607, but when there are not, the server gives a negative judgment to step S2602 and proceeds to step s2603. In step s2603, the server searches for a keyword fitting into the search word among the keywords registered into the server beforehand and proceeds to step S2604. The keyword is a word that is registered corresponding to the category of the bulletin board and, for instance, the keyword such as "Tokyo tower", "Diet building", "Shibuya", "Yokohama port" and the like is registered by being related to the category "Kanto" of the bulletin board. And the keyword such as "Osaka castle", "Kansai Airport", "Kobe port" and so on is also registered by being related to a category "Kansai" of the bulletin board.

In step S2604, the server judges whether or not a there is a keyword fitting into a search word. The server gives a positive judgment to step S2604 when there is the keyword and proceeds to step S2606, but when there is no keyword, the server gives a negative judgment to step S2604 and proceeds to step S2605. In step S2606, the server jumps to a category page related to the keyword in the bulletin board. For example, when a search word is "Shibuya", the server jumps to a bulletin board page of a category "Kanto" related to the keyword "Shibuya". The server displays the bulletin board page of the category "Kanto" on the terminal of the service user and a process of FIG. 59 is finished.

In step S2605, the server causes the page screen of the bulletin board of FIG. 52 with a message urging the service user to change a search word to be displayed again on the terminal of the service user since there is neither writing nor a category of the bulletin board relating to the search word. The server jumps to the page of FIG. 52 and a process of FIG. 52 is finished.

In step S2607, the server creates a page screen (not shown) extracting writing of the bulletin board that the search word has a hit and proceeds to step S2608. In step s2608, the server transmits the created page screen to the terminal of the service user and a process of FIG. 59 is finished.

According to the foregoing bulletin board service with content of this embodiment, a following effect can be obtained.

(1) An image put on view in the album registered by a questioner (a service user) can be displayed in the bulletin board with attachment to a question, so the image makes the question more easily understood than a description only.

(2) To display an image in the bulletin board, a thumbnail image with smaller image data in comparison to original image data is created from the original image registered in the album and a thumbnail image is stored onto a folder different from the bulletin board server and the data storage apparatus for the album and information of a link to the folder storing thumbnail image is embedded to the question to be entered in the bulletin board. As a result, image data is not stored into the server, so an initial workload on the server can be held down and further the server permits to keep on displaying the image in the bulletin board with thumbnail image data even when an original image of the album is deleted.

(3) When a thumbnail image clicked on by a questioner (a service user) to display in the bulletin board is private (a positive judgment of step S1711), the service user is caused to be notified that as the selected image is private, the image cannot be displayed in the bulletin board. Thus, a wrong display of the private image in the bulletin board can be avoided.

(4) A category of a question in the bulletin board is caused to be identical with one of the album and information of a link is caused to be embedded to each of pages of the bulletin board and album respectively. Therefore, when a questioner (a service user) browses images displayed on the page of "Hokkaido" of the album, finds out a favorite image and then wants to know more specifically about where, when and how this image was taken, a page of the corresponding question displayed in the bulletin board can be readily found out without fail.

(5) When search button 52F of the page screen (FIG. 52) of the bulletin board is clicked on, a word that fits into the search word entered into search word box 52E is searched for from all writing of the bulletin board and when there is writing that the search word has a hit, this writing is extracted and the extracted writing is displayed on a terminal. On the other hand, when there is no writing that the search word has a hit, whether or not a plurality of registered keywords beforehand is fit into by the search word is searched for and a page of a category related to the hit keyword is displayed on the terminal. Accordingly, even when writing fitting into the search word is not available, the bulletin board of a category relatively similar to the search word is automatically displayed on the terminal, so an ease-of-use bulletin board for a service user can be provided.

—Search Function—

Figure 60:
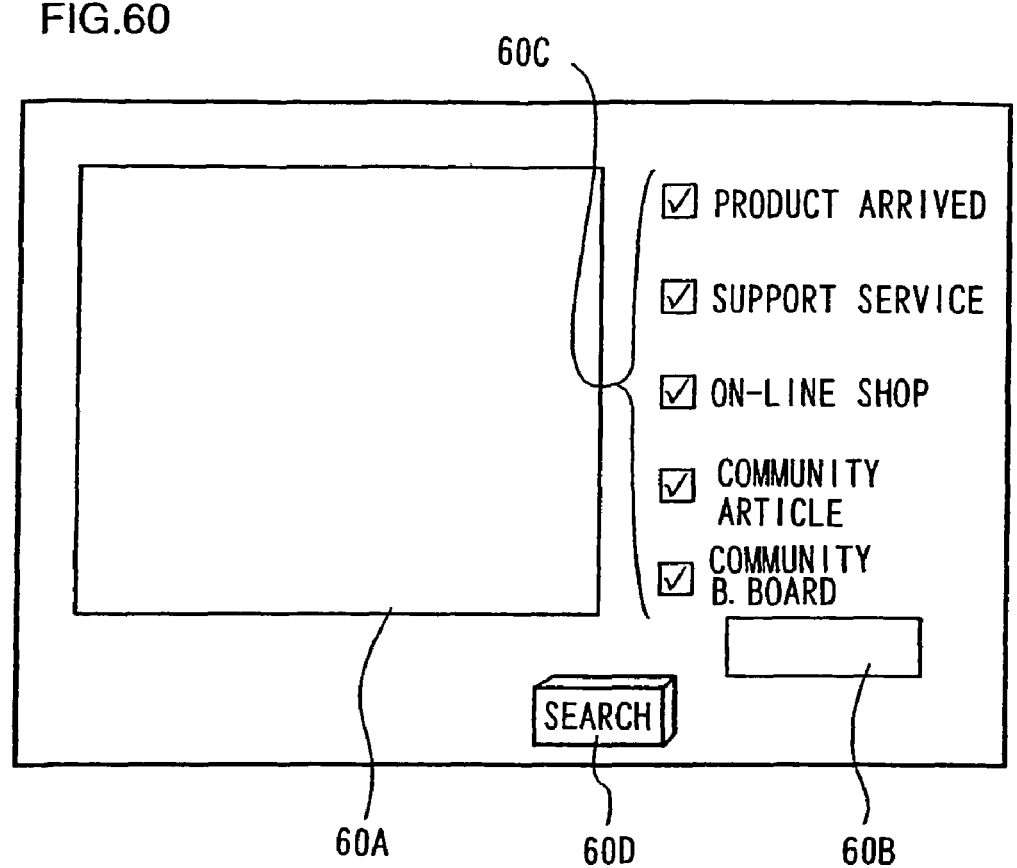
FIG. 60 represents a search screen.

In a screen of web top page 10 as shown in FIG. 3 and a top page screen of each category of website content as shown in FIGS. 4, 5, 21, 43 and so, link button 31 linking to "Search" page that performs a site search is provided. When a service user clicks on button 31, the server transmits page data for a display to a terminal of the service user and has a search page screen as shown in FIG. 60 displayed on a monitor of the terminal. In FIG. 60, search document writing box 60A, search word writing box 60B, search range checkbox 60C and search button 60D are provided.

Figure 61:
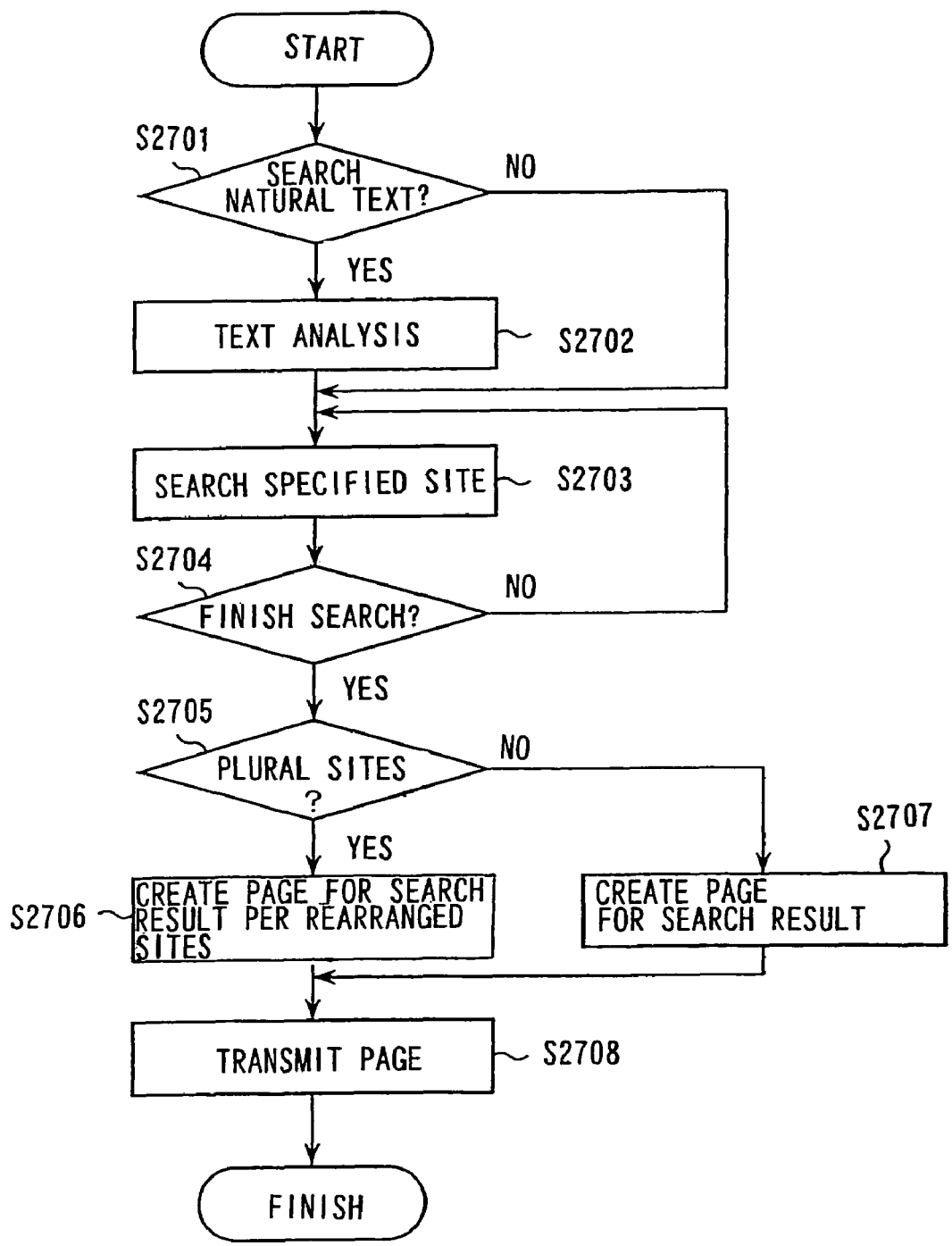
FIG. 61 represents a flow chart explaining how a search command is processed.

The server searches for what a search document written in search document writing box 60A or a search word written in search word box 60B has a hit within a range of content ticked through search range checkbox 60C. FIG. 61 represents a flow chart explaining a flow of a search process performed by the server of the service provider. A process of FIG. 61 starts up when search button 60D is clicked on.

In step s2701 of FIG. 61, the server judges whether or not a search is a natural language search. The server regards the search as the natural language search when there is writing in search document writing box 60A and proceeds to step S2702, giving a positive judgment to step S2701. On the other hand, when there is no writing in search document box 60A and there is writing in search word box 60B, the search is regarded as a word search and the server proceeds to step S2703, giving a negative judgment to step S2701.

In step S2702, the server analyzes a search text and proceeds to step S2703. The analysis is a pre-process for performing a well-known text search by means of the search text. In step S2703, the server searches for any of words included in page screens registered in the content specified through search range checkbox 60C and proceeds to step S2704. In step s2704, the server judges whether or not a search within the specified search range is finished. The server proceeds to step S2705, giving a positive judgment to step S2704 when the search is finished. When the search is not finished, the server gives a negative judgment to step S2704 and gets back to step S2703 and a search process is continued.

In step S2705, the server gives a positive judgment to step S2705 when search range checkbox 60C has been ticked several times and proceeds to step S2706, but when checkbox 60C has not been ticked several times, the server proceeds to step S2707, giving a negative judgment to step S2705. In step S2706, the server rearranges what the search has a hit per the search range (per each of content) and creates a search result page screen showing the search result per each of content and then proceeds to step S2708. In step S2708, the server transmits data of the search result page screen to a terminal of a service user and a process of FIG. 61 is finished. Accordingly, a screen of the search result as shown in FIG. 62(*a*) is displayed on a monitor of the service user's terminal.

In the search result page screen of FIG. 62(*a*), a number of hit every each of content is displayed. Every top five in the hit rank is displayed on each of content in decreasing order of similarity among search string and text. Every number of hit is displayed on content with less than five hits display and when there is no hit, message data (not shown) notifying that the number of hit is 0 is displayed. And button 62A for executing a "Display every number" is also provided and when button 62A is clicked on, the server displays not only the top five with more than six hits but also every number of hit on content.

In step s2707, the server transmits data of the search result page screen to the terminal of the service user and a process of FIG. 61 is finished. Thus, the search result screen as represented in FIG. 62(*b*) is displayed on the monitor of the terminal.

As represented in FIG. 62(*b*), a number of hit on specified content is displayed and more specifically, top twenty in the hit rank is displayed in order of similarity among search string and texts. When the number of hit is less than 20 hits, every number of hits is displayed and if the number is 0, a message (not shown) saying that there is no hit is displayed.

In a process of FIG. 61, a display of a number of hits per each of content is caused to be up to the top five in the hit rank per content when a search range extends over a plurality of content (a positive judgment in step S2705) and up to the top twenty of content in the hit rank when the search range is limited to the single content category (a negative judgment in step S2705). An upper limit for displaying the number of hit may vary per a category of content or a number of a category of content where search range of the category of content overlaps. For example, when a number of a tick performed in search range checkbox 60C is 1, the upper limit for displaying the number of hits is the top twenty and in the case of two ticks, the upper limit for displaying the number of hit is set at ten per single content and in the event of three ticks, the upper limit is set at seven per single content.

—Search Through a Camera Model Name—

Content of a website in accordance with this embodiment is to provide information or a service about a camera and a camera-related thing. For instance, when a camera model name is displayed on the page screen of the bulletin board, this camera model name is regarded as the search word and then a search process is performed. FIG. 63 represents an example of a page screen introducing the expert. Herein, the model name is introduced as "Owned camera". In the example of FIG. 63, the camera model name like "FΔ" and F□" is displayed. Display data is configured in such a way that the letters of these model names can be clicked on.

Figure 64:
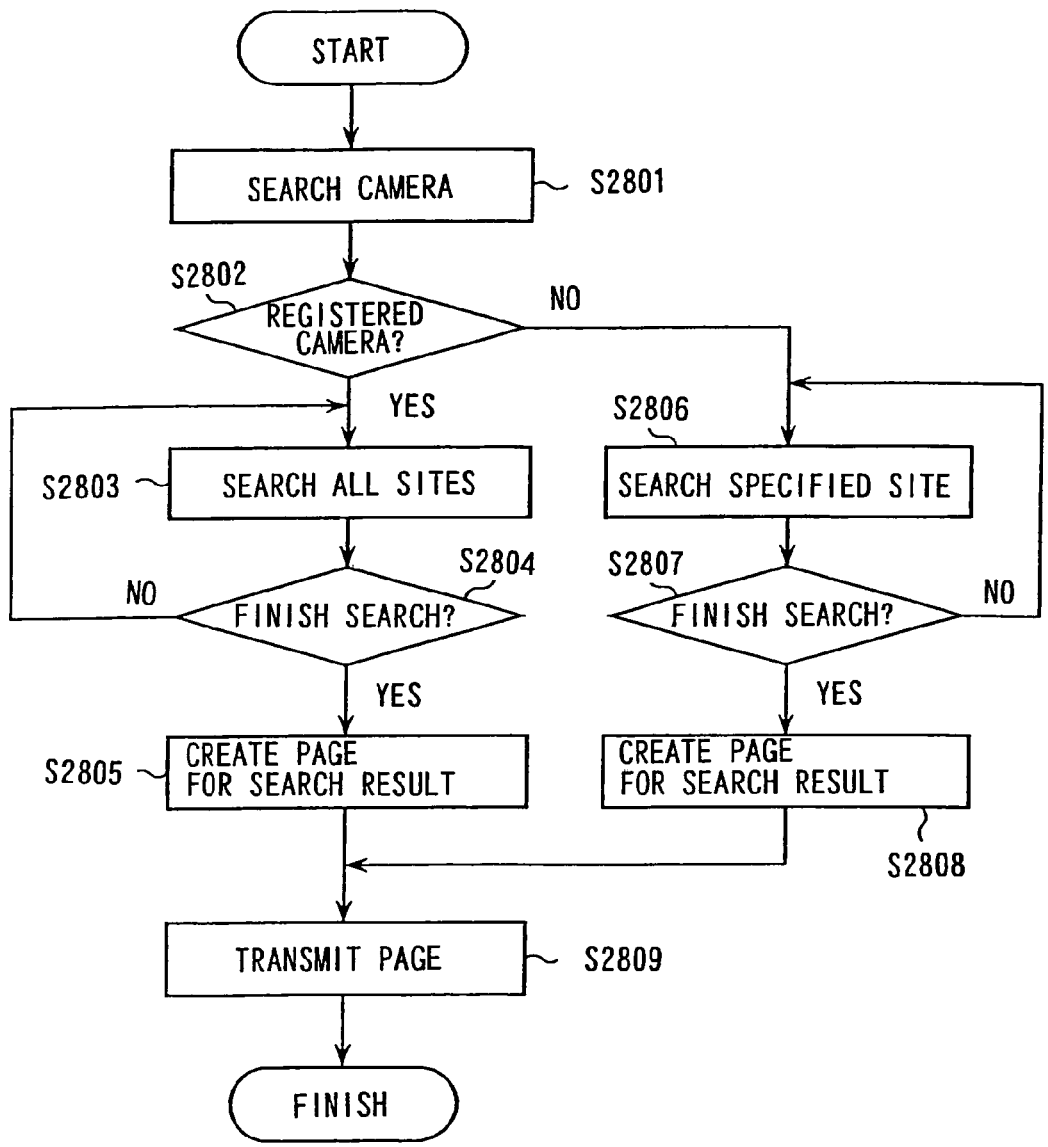
FIG. 64 represents a flow chart explaining how a search command is processed.

FIG. 64 represents a flow chart explaining a flow of a search process executed by the server of the service provider. A process o FIG. 64 starts up when any of the model name "F Δ" or F□" is clicked on and data of a clicking is received by the server. In step S2801, the server gets access to a database and checks out whether a clicked model name is registered onto the database and then proceeds to step S2802. This embodiment provides the service about a camera, so camera data in general has been stored in the database by the service provider. In step S2802, the server judges whether or not a clicked model name is registered. The server gives a positive judgment to step S2802 when the model name is registered and proceeds to step S2803, but when the name is not, the server gives a negative judgment to step S2802 and proceeds to step S2806.

In step S2803, the server regards the model name as the search word and then searches through all content such as all-new information, product information, a service support, an on-line shop, a community, a bulletin board and so and proceeds to step S2804. In step S2804, the server judges whether or not the search within the search range is finished. The server gives a positive judgment to step S2804 when the search is finished and proceeds to step S2805. On the other hand, when the search is not, the server gives a negative judgment to step S2804 and then a search process is continued, getting back to step S2803.

In step S2805, the server rearranges what the search has a hit every the search range (every each of content) and creates a search result page screen showing the search result every each of content and then proceeds to step S2809. In step S2809, the server transmits data of the search result page screen to a terminal of a service user and a process of FIG. 64 is finished. Accordingly, the same search result screen as shown in FIG. 62(*a*) is displayed on a monitor of the service user's terminal.

Similarly as shown in FIG. 62(*a*), a number of hit every each of content is displayed on the search result page screen and top five in the hit rank in decreasing order of similarity to the clicked model name is displayed on each of content. Content with less than five hits displays every number of hit and when there is no hit, message data (not shown) notifying that the number of hit is 0 is displayed. And button 62A for executing a "Display every number" is also provided.

In step S2806, the server regards the clicked model name as the search word and searches through content category such as a community and bulletin board and then proceeds to step S2807. When a negative judgment is made in step S2802, the model of this name is a camera that the service provider has not dealt so far. In this case, as there is no hit even if all-new information, product information, a service support and on-line shop are searched, the search into these content is omitted. In step S2807, the server judges whether or not the search within the search range is finished. When the search is finished, the server gives a positive judgment to steps 2807 and proceeds to step S2808. On the other hand, when the search is not, the server gets back to step S2806, giving a negative judgment to step s2807 and a search process is continued.

In step S2808, the server rearranges what the search has a hit every the search range (every each of content) and creates a search result page screen showing the search result every each of content and then proceeds to step S2809. In this case, as a number of content to be searched are not many, the search result is displayed in such a way that every top ten in the hit rank per each of content is displayed in decreasing order of similarity to the clicked model name.

—Related Search—

Figure 65:
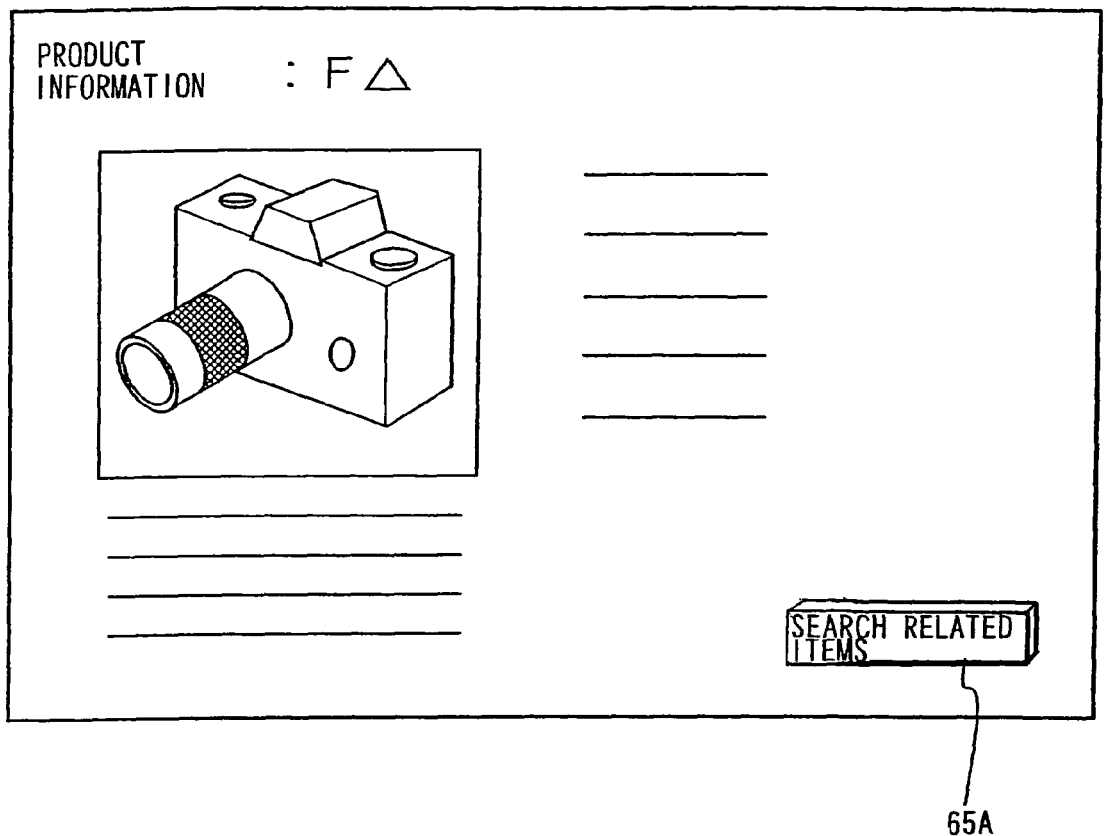
FIG. 65 represents an introduction screen of product information.

With regard to a page screen the service user views, a character string and text written in HTML (Hyper Text Markup Language) for a web document text language are extracted and the extracted character string and text are searched for from each of content. For example, a case that a service user views a page screen introducing product information as shown in FIG. 65 will be explained as an example. In FIG. 65, information about a camera named as FΔ is introduced. "Related search" button 65 is displayed in the lower right hand of a page screen. When describing this page screen in HTML file, in addition to a description for locating "Related search" button 65A, the page is described in such a way that, when button 65A is clicked on, a title string that is caught in between title tags (<TITLE></TITLE>) is extracted as a search string. A character string or a text that is caught in between specially made search tags (e.g. <!-SEARCH CONTEXT--><!-SEARCH CONTEXT-->) may be described. The character string or the text caught in between the search tags (<!-SEARCH CONTEXT--><!-SEARCH CONTEXT-->) is extracted as the search string or the text. In this case, a HTML tag is excluded from the search word.

Further, besides the character string or the text actually displayed on the page screen, a character string or a text specially created for use as the search string may be described by embedding it into **** in <META HTTP-WQUIV="Keywords"CONTENT="****">.

The character string or the text that is embedded into ****** and then described is extracted as the search string or the text.

Figure 66:
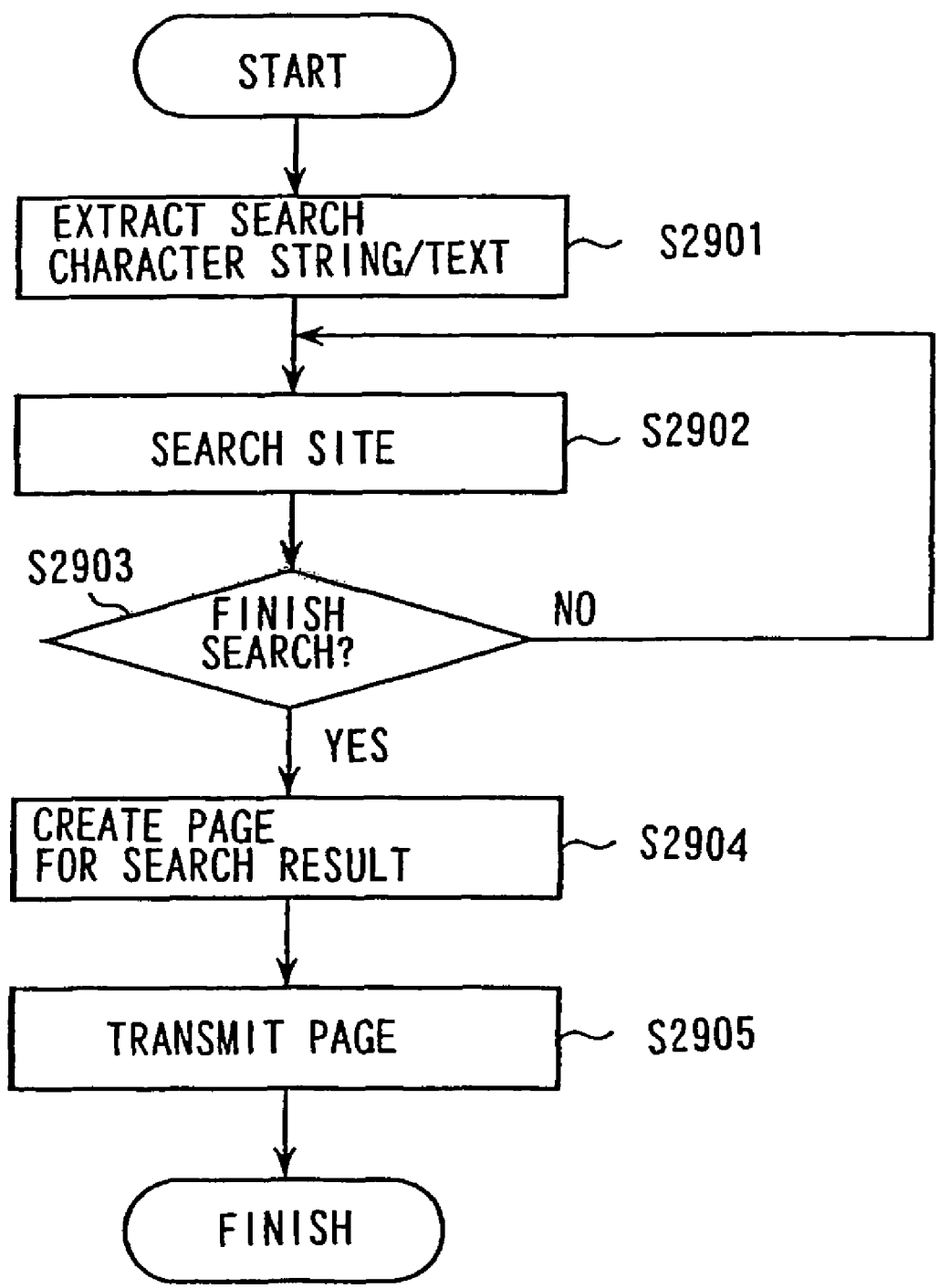
FIG. 66 represents a flow chart explaining how a search command is processed.

FIG. 66 represents a flow chart explaining a flow of a search process performed by the server of the service provider. A process of FIG. 66 starts up when "Related search" button 65A on the page screen of FIG. 65 is clicked on. In step S2901, the server extracts the character string or the text represented by the foregoing tags on the page screen and proceeds to step S2902. In step S2902, the server searches through each of content by regarding the extracted character string or text as the search string. On this occasion, the page screen now on view is not a target for a search.

In step s2903, the server judges whether or not the search is finished. The server gives a positive judgment to step S2903 when the search is finished and proceeds to step S2904, but when the search is not, the server gives a negative judgment to step S2903 and the search is continued, getting back to step S2902.

In step S2904, the server rearranges what the search has a hit every each of content and proceeds to step S2905, creating a search result page screen displaying a search result per each of content. In step S2905, the server transmits data of the search result page screen to a terminal of the service user and a process of FIG. 66 is finished. Accordingly, the same search result screen as in FIG. 62(a) is displayed on a monitor of the service user's terminal.

As same as in FIG. 62(a), the search result page screen displays a number of hit every each of content and top five in the hit rank in decreasing order of similarity to the search string or the text is displayed on each of content. Content with less than five hits display every number of hit on the content and when the number of hit is 0, a message notifying that there is no hit is displayed. And "Display every hit" button 62A for causing to display every hit on content with more than six hits is provided.

—Related Expert Search—

In a page screen of FIG. 63 introducing information about an expert, "Related expert search" button 63A is provided in the lower hand of the page screen.

When describing this page screen in HTML file, in addition to a description for locating "Related expert search" button 63A, a shooting field that an expert is good at and an expert's own camera model name may be described by catching them between specially provided tags so as to regard character strings described in boxes of the shooting field and the expert's model name as search strings.

Figure 67:
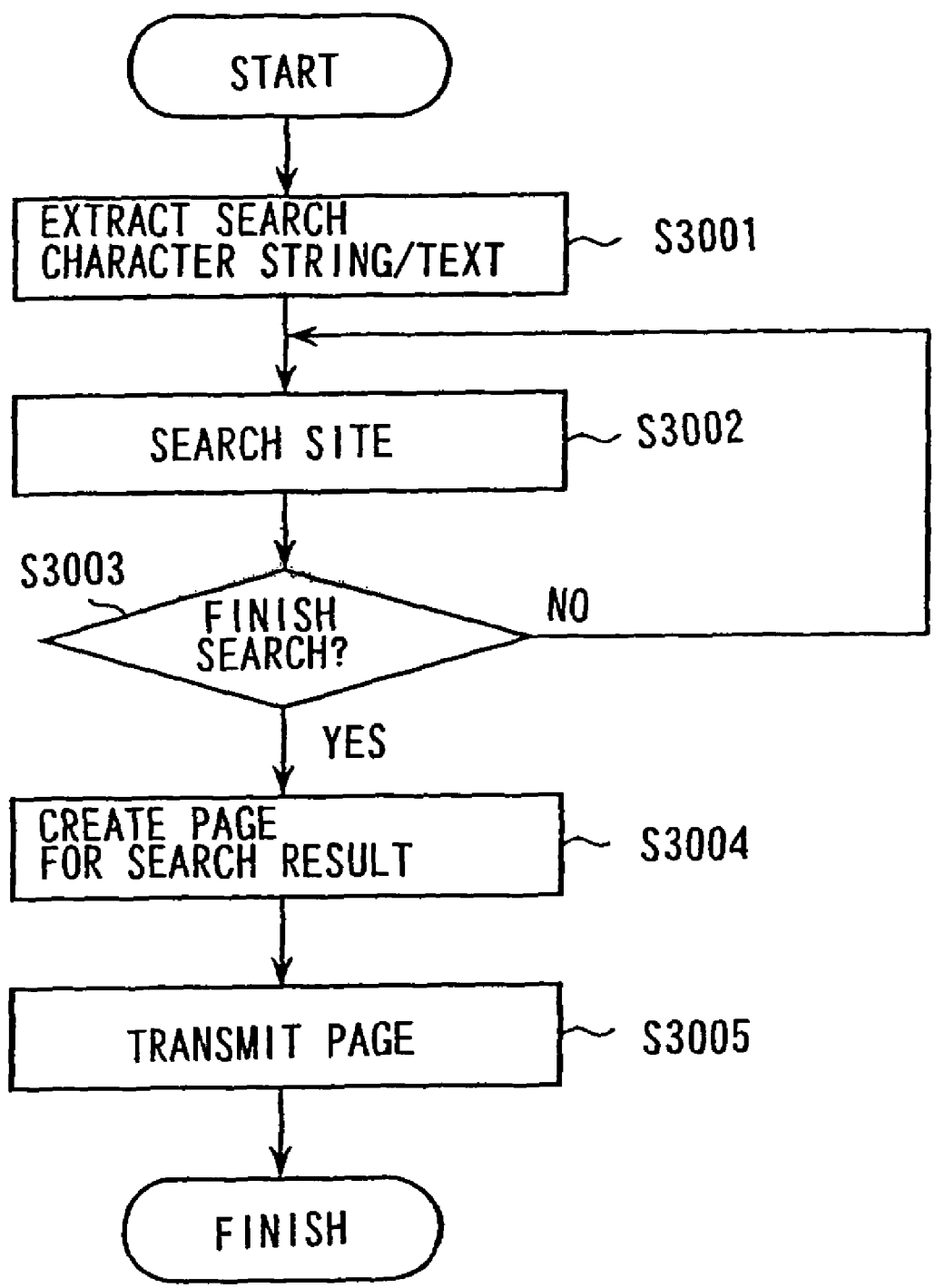
FIG. 67 represents a flow chart explaining how a search command is processed.

FIG. 67 represents a flow chart explaining a flow of a search process performed by the server of the service user. A process of FIG. 67 starts up when "Related expert search" button 63A on the page screen of FIG. 63 is clicked on. In step S3001, the server extracts the character string or the text represented by the tags on the displayed page screen and proceeds to step S3002. In step S3002, the server searches through a database storing information about an expert by regarding the extracted character string or text as the search string. On this occasion, the page screen now on view is not a target of a search.

In step S3003, the server judges whether or not the search is finished. The server gives a positive judgment to step S3003 when the search of all information about an expert is finished and proceeds to step S3004, but when the search is not, the server gives a negative judgment to step S3003 and the search is continued, getting back to step S3002.

In step S3004, the server rearranges what the search has a hit in order of rating and proceeds to step S3005, creating a search result page screen displaying the search result in order of a rating. The server transmits data of the search result page screen to a terminal of a service user and the process of FIG. 67 is finished. Accordingly, the search result screen is displayed on a monitor of the service user's terminal. The rating is that, for instance, a service user with a lot of points and well reputations earned from questioners is highly rated, but a service user with low points and bad reputations from questioners is lowly rated on a scale of the point and the reputation. The higher ranked expert a questioner selects, the more likely it is possible to get a satisfied answer.

According to the search performed on content of this embodiment, a following effect will be gained.

(1) With regard to the search text written into search text writing box 60A or the search word written into search word writing box 60B, the search is performed within a ticked range in search range checkbox 60C. When searching through a plurality of content and displaying the number of hit every each of content, the top five in the hit rank is displayed in order of similarity among the search strings or the texts on each of content and further when button 62A to display every hit is clicked on, every hit is displayed on content with more than six hits. Thus, the service user can check out what each of content has a hit without scrolling a display screen.

(2) When the camera model name is displayed on the page screen (FIG. 63) of the bulletin board, the search process is performed, regarding the model name as the search word. Content for the website service of this embodiment provides information and the service about a camera and camera-related things, so a more useful search service can be available for the service user.

(3) In the page screen (FIG. 65) introducing product information, the service provider describes the search strings relating to the description of this page screen beforehand in HTML file and a click operation of "Related search" button 65A provided on the page screen by the service user activates the search with no need to enter the search strings. Therefore, the service user can perform a search relating to the page screen now on view (now being displayed) rapidly.

(4) In the page screen (FIG. 63) introducing information about an expert, the service provider describes the search strings relating to the description of the page screen beforehand in HTML file and a click operation of "Related expert search" button 63A provided on the page screen by the service user activates the search with no need to enter the search strings. Therefore, the service user can rapidly search for another expert who has the same shooting field or the same camera model as an expert now on view (now being displayed).

The search string, in addition to the foregoing, may be described in HTML file by way of catching a text between body tags (<BODY></BODY>) or making all the words in HTML page subject to the search. When all the words are subject to the search, it should be noted that the search might bring increase in a noise (a great number of hits beyond a reasonable level). And, a description of the search strings may be changed per page. For instance, a page of content describing "Product information" makes the search string caught between the title tags subject to the search and a page describing "Article" makes the search string caught between the title tags and the text caught between the body tags subject to the search.

AVAILABILITY OF INDUSTRIAL USE

A service provider provides a web service such as an electronic shopping service, a website search service and an electronic bulletin board service and a service user receives the service via a terminal connectable to the Internet. The service user works, in addition to a personal computer, a cellular phone, a PDA (Personal Digital Assistance or Assistant) and the like. Other than an electronic shop dealing with a camera-related things, merchandise dealt in by a electronic shop such as a vehicle, an electronic appliance and sports goods electronic shop is not limited to a vehicle, a home electronic appliance and a sports goods and much more than these.

What is claimed is:

1. A method for searching a plurality of content registered onto a website comprising:
   including information about a search text or a search character string in advance into information for creating a page screen;
   transmitting the information for creating the page screen to a client terminal;
   extracting the search text or the search character string from the information for creating the page screen in response to information indicative of a predetermined search instruction transmitted from the client terminal;

searching for the extracted search text or the extracted search character string on each of a plurality of the content;

classifying information indicative of a registration location of a retrieved text or character string per each of the content;

rearranging information that was classified per each of the content;

extracting a given number of information in high order per each of the content with regard to post-rearranged information classified per each of the content; and transmitting extracted information to the client terminal.

2. The method for searching the plurality of content set forth in claim 1, wherein information about the search text or the search character string is created in relation to content of the page screen and included into the information for creating the page screen.

3. The method for searching the plurality of content set forth in claim 1, wherein content to be searched for is selected out of the plurality of the content.

4. The method for searching the plurality of content set forth in claim 3, wherein a given number is determined in response to a selected number of search content and the given number of information per each of selected content is extracted and transmitted to the user.

5. The method for searching the plurality of content set forth in claim 1, wherein a given description is performed in advance in a page so as to enable to specify the search text or the search character string.

6. The method for searching the plurality of content set forth in claim 5, wherein the page is written in Hyper Text Markup Language and a text or a character string of a search keyword is caught between given tags.

7. The method for searching the plurality of content set forth in claim 1, wherein:

button information is included into the information for creating the page screen together with the search text or the search character string, the button information displaying a button in the page screen for a client to instruct searching by using the search text or the search character string included in the information for creating the page screen; and the information indicative of the predetermined search instruction is transmitted from the client terminal when the client designates the displayed button at the client terminal.

8. A method for searching a plurality of content registered onto a website comprising:

including a text or a character string related to a provider of the content into information for creating a page screen;

transmitting the information for creating the page screen to a client terminal;

extracting the text or the character string as a search text or a search character string from the information for creating the page screen in response to information indicative of a predetermined search instruction transmitted from the client terminal;

searching for the extracted search text or the extracted search character string on the content respectively;

classifying information indicative of a registration location of a retrieved search text or character string per each of the content;

rearranging information classified per each of the content;

extracting a given number of information in high order per each of the content with regard to rearranged information classified per each of the content; and transmitting extracted information to the client terminal.

9. The method for searching the plurality of content set forth in claim 8, wherein:

button information is included into the information for creating the page screen together with the text or the character string related to a provider of the content, the button information displaying a button in the page screen for a client to instruct searching by using the text or the character string included in the information for creating the page screen; and the information indicative of the predetermined search instruction is transmitted from the client terminal when the client designates the displayed button at the client terminal.

10. A method for searching a plurality of content registered onto a website comprising:

including information about a search text or a search character string in advance into information for creating a page screen;

transmitting the information for creating the page screen to a client terminal;

extracting the search text or the search character string from the information for creating the page screen in response to information indicative of a search instruction transmitted from the client terminal;

searching for the extracted search text or the extracted search character string on each of a plurality of the content;

classifying information indicative of a registration location of a retrieved text or character string per each of the content;

transmitting to the client terminal information that was classified per each of the content.

11. The method for searching the plurality of content set forth in claim 10, wherein information about the search text or the search character string is created in relation to content of the page screen and included into the information for creating the page screen.

12. The method for searching the plurality of content set forth in claim 10, wherein:

button information is included into the information for creating the page screen together with the search text or the search character string, the button information displaying a button in the page screen for a client to instruct searching by using the search text or the search character string included in the information for creating the page screen; and the information indicative of the predetermined search instruction is transmitted from the client terminal when the client designates the displayed button at the client terminal.

* * * * *